(12) United States Patent
Horie et al.

(10) Patent No.: US 7,073,087 B2
(45) Date of Patent: Jul. 4, 2006

(54) TRANSITION SIGNAL CONTROL UNIT AND DMA CONTROLLER AND TRANSITION SIGNAL CONTROL PROCESSOR USING TRANSITION SIGNAL CONTROL UNIT

(75) Inventors: Kimito Horie, Tokyo (JP); Koichi Takeda, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 596 days.

(21) Appl. No.: 10/195,458

(22) Filed: Jul. 16, 2002

(65) Prior Publication Data

US 2003/0095556 A1    May 22, 2003

(30) Foreign Application Priority Data

Nov. 16, 2001   (JP)   ............... 2001-351069

(51) Int. Cl.
*G06F 1/04*   (2006.01)
(52) U.S. Cl. ............... 713/600; 713/375; 713/400; 713/500; 326/93; 326/98; 326/104; 327/334; 327/365; 710/22; 710/308
(58) Field of Classification Search ............... 713/159, 713/500, 600; 326/93, 98, 104; 327/334, 327/365; 710/22, 308
See application file for complete search history.

(56) References Cited

U.S. PATENT DOCUMENTS

| | | | |
|---|---|---|---|
| 4,841,436 A * | 6/1989 | Asano et al. ............... 710/54 |
| 5,646,554 A | 7/1997 | Kim et al. |
| 5,732,233 A * | 3/1998 | Klim et al. ............... 712/200 |
| 5,737,614 A * | 4/1998 | Durham et al. ............. 713/322 |
| 5,758,139 A | 5/1998 | Sutherland et al. |
| 5,918,042 A | 6/1999 | Furber |
| 6,023,430 A | 2/2000 | Izumikawa |
| 6,038,259 A * | 3/2000 | Nanya ............... 375/254 |
| 6,308,229 B1 * | 10/2001 | Masteller ............... 710/52 |
| 6,486,700 B1 | 11/2002 | Fairbanks et al. |
| 6,922,090 B1 * | 7/2005 | Takeda et al. ............. 327/141 |

FOREIGN PATENT DOCUMENTS

| JP | 06090165 A | 3/1994 |
|---|---|---|
| JP | 06096019 A | 4/1994 |

(Continued)

OTHER PUBLICATIONS

S. L. Lu, "Improved design of CMOS multiple-input Muller C-elements", IEEE vol. 29, No. 19, published, Sep. 1993.*

(Continued)

*Primary Examiner*—Thuan N. Du
*Assistant Examiner*—Nitin C. Patel
(74) *Attorney, Agent, or Firm*—Volentine Francos&Whitt PLLC

(57) ABSTRACT

Transition signal control for creating asynchronous timing is provided using a transition signal control circuit, which includes Muller C elements each with an inverter. The control device is constituted by a machine ring including n-stages of transition signal control circuits, a state ring including k-stages of transition signal control circuits, and a synchronous circuit for synchronizing with the machine ring by receiving a vector which is output from the state ring. When the output vector of the state ring is received, the synchronous circuit outputs a vector to the machine ring. The output vector of the machine ring and the output vector of the state ring create timings for controlling the processor, for example, asynchronously, and these timings are input to the instruction decoder, for example.

21 Claims, 31 Drawing Sheets

FOREIGN PATENT DOCUMENTS

| | | |
|---|---|---|
| JP | 9-244890 | 9/1997 |
| JP | 11003206 A | 1/1999 |

OTHER PUBLICATIONS

Tzsy-Yung Wuu and Sarma B. K. Vrudhula, "A design of a Fast and Area efficient multi-input Muller C-elements", IEEE vol. 1, No. 2, published, Jun. 1993.*

Z. Jihn Deng, Nobuyoki Yoshokawa, Stephen R. Whiteley, and Theodore Van Duzer, "Self-Timing and Vector Processing in RSFQ Digital Circuit Technology", IEEE vol. 9, No. 1, published, Mar. 1999.*

Y. F. Yang, W. I. Wang, and E. S. Yang, "state holding circuit using heterojunction bipolar transistors and resonant tunnelling diodes", IEEE vol. 30, No. 1, published Jan. 1994.*

Z. Jihn Deng, Nobuyoki Yoshokawa, Jose A. Tierno, Stephen R. Whiteley, and Theodore Van Duzer, "Asynchronous Circuits and Systems in Superconduc", Advanced Research in Asynchronous Circuits, 1998 proceedings Fourth symposium on Mar.-Apr. 1998.*

K. Eshraghian, S. W. Lachowicz, J. F. Lopez and R. Sarmiento, "Efficient design of gallium arsenide Muller-C-element", IEEE vol. 33, No. 9, published Apr. 1997.*

Sutherland, Ivan E., "bit" Magazine, Kyoritsu Publishing, vol. 22, No. 3 pp. 246-268.

* cited by examiner

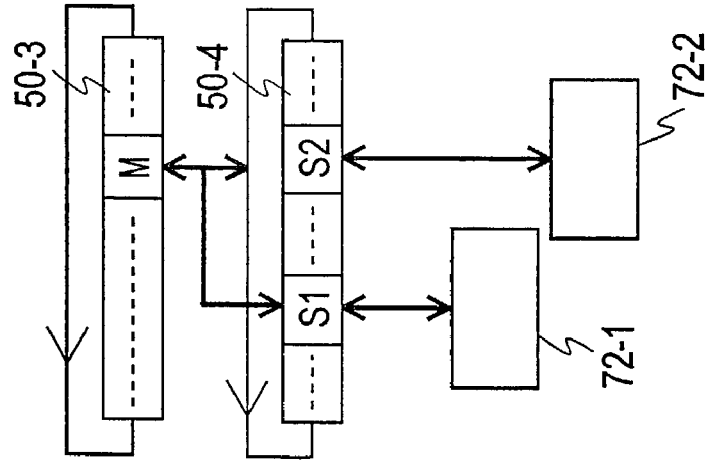
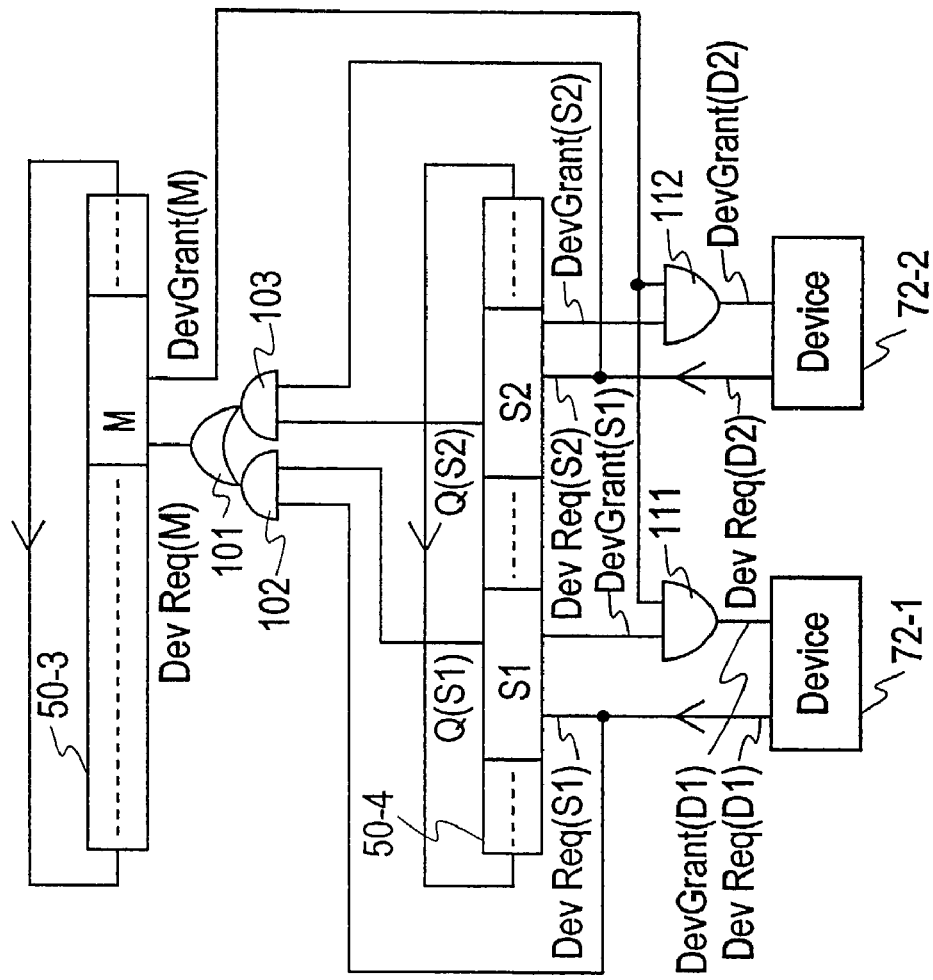
FIG. 18(A)
FIG. 18(B)

TRANSITION SIGNAL CONTROL UNIT AND DMA CONTROLLER AND TRANSITION SIGNAL CONTROL PROCESSOR USING TRANSITION SIGNAL CONTROL UNIT

BACKGROUND OF THE INVENTION

1. Field of the Invention

The present invention relates to a transition signal control unit constructed using a ring control circuit, which is created by connecting a plurality of transition signal control circuits comprised of Muller C elements with inverter in a ring shape or in a cascade connection, and a DMA (Direct Memory Access) controller and transition signal control processor which are constructed using this transition signal control unit.

2. Description of Related Art

Prior art related to such a field is, for example, those stated in the following documents.

Document 1: Magazine "bit", Vol. 22, No. 3, published by Kyoritsu Publishing, pp. 246–268; Paper from Commemorative Lecture on Winning 1998 ACM Turing Prize (Ivan E. Sutherland: Micro-pipelines, CACM, Vol. 32, No. 6, pp. 720–378)

Document 2: Japanese Patent Laid-Open No. 6-90165

Document 3: Japanese Patent Laid-Open No. 6-96019

Document 4: Japanese Patent Laid-Open No. 9-244890 (corresponding to U.S. Pat. No. 5,918,042)

Document 5: Japanese Patent Laid-Open No. 11-3206

For example, as Document 1 states, a concept called "transition signaling" used for controlling a pipeline recently emerged as a concept which counters conventional clocked logic. This is a field of asynchronous design methodologies.

Conventional clocked logic is based on the premise that all signals are binary and the time thereof can be discrete. This means that Boolean logic, which is a logic to express the input conditions of a logic circuit and the result by algebraic expressions, can be applied, therefore circuit design is easier even for a relatively large scale circuit. In asynchronous design methodologies as well, all signals are binary, but the time thereof is not discrete, which is different from conventional clocked logic. As a result, the following three advantages are noteworthy.

The first advantage is that problems due to clock skew, such as the generation of a glitch in a large scale circuit, can be controlled.

The second advantage is that the power consumption of a logic circuit can be controlled in the case of asynchronous design methodologies since only the part of a logic circuit required for calculation need be operated, while in the case of clocked logic, the clock operation is continuously active for parts unnecessary for logic operation, so the power consumption of a logic circuit is high.

The third advantage is that the average speed of logic processing can be secured in the case of asynchronous design methodologies, but in the case of clocked logic, the speed of all logic processing can be controlled by the critical path (latest path).

The transition signaling circuit is comprised of modules which process the logical combination of events. In transition signaling (that is, the signaling for transferring the event), the transition of the logical value of the signal to both direction, that is, the rise transition and the fall transition of the signal, have the same meaning, and this rise transition and fall transition are called an "event". In the transition signaling method, the rise transition and the fall transition are not distinguished, but both edges of rise and fall are used as a trigger event, so potentially a two-times faster speed can be implemented compared with a conventional clock control method.

As Document 1 states, the Muller C element, for example, is one of the transition signaling circuits, providing an AND function for a transition event. Other transition signaling circuits include an XOR element, which provides an OR function of a transition event, and a TOGGLE element.

FIGS. 29(A) and (B) are block diagrams of examples of a conventional Muller C element with an inverter, which is one transition signaling circuit, where FIG. 29(A) is a logical symbol diagram and FIG. 29(B) is a logical circuit diagram.

In the Muller C element with an inverter 10, transition signals, such as the two request signals ReqIn1 and ReqIn2, are supplied to the two input terminals thereof as input signals, and the request signal ReqOut1, which is a transition signal, is output from the output terminal thereof. This Muller C element with an inverter 10 is comprised of the inverter circuit 11 for signal inversion, the first, second and third two input type AND gate circuits 12, 13 and 14, and a three input type OR gate 15.

Request signal ReqIn2 to be input is inverted by the inverter circuit 11, and the second and third AND gate circuits 13 and 14 are connected to the output terminal. The request signals ReqIn1 and ReqOut1 are input to the first AND gate circuit 12. The request signal ReqIn1 and the output signal of the inverter circuit 11 are input to the AND gate circuit 13. The output signal of the inverter circuit 11 and the request signal ReqOut1 are input to the AND gate circuit 14. These AND gate circuits 12, 13 and 14 are connected to the OR gate 15, and the request signal ReqOut1 is output from the output terminal of the OR gate 15 circuit. The AND gate circuit 12 and the OR gate circuit 15 constitute a latch circuit, and the AND gate circuit 14 and the OR gate circuit 15 also constitute a latch circuit.

In the case of such a Muller C element with an inverter 10, when the two input request signals ReqIn1 and ReqIn2 have different values (e.g. logic level "H" and "L") from each other, a value the same as the request signal ReqIn1 is output from the OR gate circuit 15 as an output request signal ReqOut1, and the value of this output is maintained in the latch circuit comprised of the AND gate circuit 12 and the OR gate circuit 15, or in the latch circuit comprised of the AND gate circuit 14 and the OR gate circuit 15, even if one of the input request signals ReqIn1 and ReqIn2 changes later. When the two input request signals ReqIn1 and ReqIn2 have the same value (e.g. logic level "H" and "H", or logic level "L" and "L") and if one of the inputs changes later, a value the same as the request signal ReqIn1 is output from the OR gate circuit 15 as an output request signal ReqOut1.

It is not assumed that both of the two input request signals ReqIn1 and ReqIn2 change simultaneously, which is the same as the case of a Reset-Set (RS) flip-flop (hereafter RS-FF).

As mentioned above, transition signals, such as request signals ReqIn1, ReqIn2 and ReqOut1, can be regarded as an event for a logical unit, and the Muller C element operates as an AND gate circuit for the event. The Muller C element with an inverter, on the other hand, transfers an event only when events having different logic from each other occur to both of the inputs. Fundamentally this creates a directional flow of events.

As Document 1 states, a pipeline is referred to as a device configuration to process data in a work flow. In the pipeline, data is stored and processed. The pipeline is operated by clock control (each section is operated according to a clock distributed from the outside) or is driven by an event (each section is independently operated each time a local event is generated).

Some kinds of pipelines are inelastic, where the data volume inside the pipeline is fixed. In the case of an inelastic pipeline, the speed of input and the speed of output of a signal must accurately match, therefore this pipeline operates just like a shift register when processing logic is excluded.

In the case of an elastic pipeline, on the other hand, the data volume inside the pipeline is variable, and the speed of input and the speed of output of a signal constantly changes depending on the buffering. The elastic pipeline operates as an FIFO (First-In-First-Out) memory when the processing logic is excluded. An elastic pipeline with a simple configuration driven by an event (regardless the presence and absence of the requirements of internal processing) is called a "micro-pipeline".

FIG. 30 is a conceptual diagram depicting a control circuit of the conventional micro-pipeline stated in Document 1.

This control circuit of the micro-pipeline has the left side block 20-1 and the right side block 20-2 shown in FIG. 30. The left side block 20-1 has a Muller C element with an inverter 10-1 having the same configuration as shown in FIG. 29 where the request signal Req(1), which is a transition signal, and the response signal Ack(2), which is a transition signal from the right side block 20-2, are input. From the output terminal of this Muller C element with an inverter 10-1, the response signal Ack(1), which is a transition signal, is output. The delay element 21-1 which delays the response signal Ack(1) for the delay time DELAY 1 and outputs the request signal Req(2), which is a transition signal, is connected to the output terminal of the Muller C element with an inverter 10-1.

In the same way, the right side block 20-2 has a Muller C element with an inverter 10-2, the same as shown in FIG. 29, where the request signal Req(2), which is a transition signal, and the response signal Ack(3), which is a transition signal, are input. The Muller C element with an inverter 10-1 and the delay element 21-2 are connected to this output terminal. The delay element 21-2 inputs the response signal Ack(2), which is a transition signal output from the Muller C element with an inverter 10-2, delays this for the delay time DELAY 2, and outputs the request signal Req(3), which is a transition signal.

In FIG. 30, the logic circuit to be controlled by the control circuit of the micro-pipeline is omitted, but the data flow (from the input data Din to the output data Dout), which passes through the logic circuit, is indicated by the dashed line. In Document 1, a latch circuit, decoding circuit, and multiplication circuit are shown as an example of the logic circuit to be controlled.

FIG. 31 is a timing waveform diagram depicting the operation of the control unit of the micro-pipeline in FIG. 30.

Now the operation of the control circuit of the micro-pipeline in FIG. 30 will be described with reference to FIG. 31.

As described above, the control circuit of the micro-pipeline in FIG. 30 is comprised of a combination of two blocks, where both the left side block 20-1 and the right side block 20-2 have the same circuit configuration.

For example, when a request signal Req(1) is generated at the left side block 20-1 (corresponding to the logical level "H"), if the right side block 20-2 has not yet been activated and the response event Ack(2) has also not yet been generated (corresponding to the logic level "L"), then the response signal Ack(1) is generated from the Muller C element with an inverter 10-1, and control for the logic circuit, which is not illustrated, is acquired. (This link is indicated by L1 in FIG. 31.) The response signal Ack(1) is delayed for a predetermined delay time DELAY 1 by the delay element 21-1, and becomes the request signal Req(2) for the right side block 20-2. (This link is indicated by L2 in FIG. 31.)

Then the response signal Ack(2) is also generated from the Muller C element with an inverter 10-2 in the right side block 20-2 based on the same logic, and the response signal Ack(2) is fed back to the Muller C element with an inverter 10-1, so the response signal Ack(1) loses the control thereof. (This link is indicated by L3 and L5 in FIG. 31.)

In other words, the response signal Ack(1) generated from the Muller C element with an inverter 10-1 acquires control for the logic circuit, which is not illustrated, only during a predetermined delay time DELAY 1 of the delay element 21-1, and then the control is transferred to the response signal Ack(2) generated from the Muller C element with an inverter 10-2.

The request signal Req(1) itself also disappears after the delay time DELAY 0 of the delay element, which is not illustrated, in the left side block 20-0, which is not illustrated. (This is indicated by the link L4 in FIG. 31.) In the same way, the request signal Req(2), which is output from the delay element 21-1, disappears after the delay time DELAY 1 in the left side block 20-1. (This is indicated by the link L4 in FIG. 31.)

When the request signal Req(1) is generated in the left side block 20-1, however, the response signal Ack(1) does not change at all due to the nature of the Muller C element with an inverter 10-2 if the right side block 20-2 has already been activated, and if the response signal Ack(2) has been generated. This is indicated by the link L3 (broken line) which became invalid in the response signal Ack(2) #1 and in the response signal Ack(1) #1 generated in the link L7 in FIG. 31.

Disappearance of the response signal Ack(2) is also the same as the disappearance of the response signal Ack(1), which disappears in the link L8 in FIG. 31 when the response signal Ack(3) to be input to the Muller C element with an inverter 10-2 is received.

The meaning of the delay times DELAY 0, DELAY 1, and DELAY 2 in FIG. 31 is quite significant. If the delay times DELAY 0, DELAY 1 and DELAY 2 do not exist, then the delay time of the logic circuit to be controlled, which is not illustrated, cannot be secured. Therefore the request signals Req(1), . . . and the response signals Ack(1), . . . , which are transition signals, take charge, and as a result, asynchronous transition signaling cannot be implemented.

As Document 1 states, the control circuit in FIG. 30 operates according to a simple stage state rule. In other words, if the state of the first block 20-2, which is a preceding block, and the next block 20-1, which is a succeeding block, are different, the state of the first block is transferred to the next block 20-1, otherwise the current state is maintained. This stage state rule is digitally equal to a differential equation to define ocean waves and electromagnetic waves. Actually, in the control circuit of the micro-pipeline in FIG. 30, one of the inverters of the Muller C elements with an inverter 10-1 and 10-2 is included in the loop where an event cycles around, so each loop oscillates, the request signal Req(1) propagates to the right side in FIG. 31, and the response signal Ack(1) propagates to the left side in FIG. 31.

For example, according to the timing waveform in FIG. 31, the response signal Ack(1) transits to the response signal Ack(2). In the control circuit in FIG. 30, an event generated in the left side block 20-1 is transferred to the right side block 20-2, so this operation is similar to an FIFO. Here, events are accumulated according to FIFO, and events which end in the left side block 20-1 are sequentially transferred to the right side block 20-2, . . . Generally this operation is suitable for the control of a micro-pipeline.

However, the conventional asynchronous design method described in Document 1, for example, has more disadvantages as explained in the following (a) and (b), than the above mentioned advantages, which hinders the popularization of this method.

(a) If the conventional asynchronous design method is used, the design of relatively large-scale circuit is difficult. While in the case of a synchronous circuit using clock signals, for example, timing using flip-flip (hereafter FF) can be disposed relatively easily, and under this timing, large-scale circuit can be appropriately controlled. However, with the conventional asynchronous design method, the respective circuits, which constitute the large-scale circuit, operate with no relationship to other circuits (asynchronously), where there are no such advantages. In the conventional asynchronous design method, timing is adjusted depending only on a so-called causal relationship. Complicated processing is required to match the causal relationship of a circuit with the causal relationship of other circuits.

(b) In the case of the micro-pipeline control circuit shown in FIG. 30, which is configured using the conventional asynchronous design method, for example, this theory requires rather sophisticated understanding, since the theory never existed before, so the operation is difficult to understand and the application range of the asynchronous transition signal control is narrow.

SUMMARY OF THE INVENTION

It is an object of the present invention to solve the problems of the above mentioned prior art, and to provide a transition signal control unit which can execute asynchronous transition signal control in a wide application range using a transition signal control circuit which operation is relatively easy to understand, and a DMA controller and a transition signal control processor using this transition signal control unit.

To solve the above mentioned problems, the present invention configures a ring control circuit (TRC: Takeda's Token Ring Controller) using a plurality of transition signal control circuits (TAC: Takeda's Asynchronous Controller), which operation is relatively easy to understand, and which is comprised of Muller C elements with inverter, and based on these transition signal control circuits and ring control circuit, a new ring control technology (HRCT: Horie's Ring Control Technology) is introduced. This ring control technology introduces timing into the asynchronous design method, so that timing similar to a clock synchronous circuit can be configured, even for the asynchronous design method.

Using such a ring control technology, the present invention according to claim 1 is a transition signal control unit comprises a transition signal control circuit where a loop holding a token is created using a plurality of Muller C elements with inverter and gate circuits, wherein the transition signal control circuit uses a device request signal DevReq to be input as a clock signal, and one of the plurality of Muller C elements with inverter included in the transition signal control circuit transfers the token being held to the subsequent circuit according to the input of the device request signal DevReq or device response signal DevGrant.

Such transition signal control unit can acquire various characteristics, when the plural of the transition signal control circuits connected each other.

BRIEF DESCRIPTION OF THE DRAWINGS

The foregoings and other objects, features and advantages of the present invention will be better understood from the following description taken in connection with the accompanying drawings, in which:

FIGS. 18(A) and (B) are block diagrams of a transition signal control unit depicting the subordinates of a plurality of transition signal control circuits on a slave ring according to an embodiment of the present invention;

FIG. 17 and FIG. 18 are applied;

DESCRIPTION OF THE PREFERRED EMBODIMENTS (Transition Signal Control Circuit)

(1) Configuration

Figure 2A:
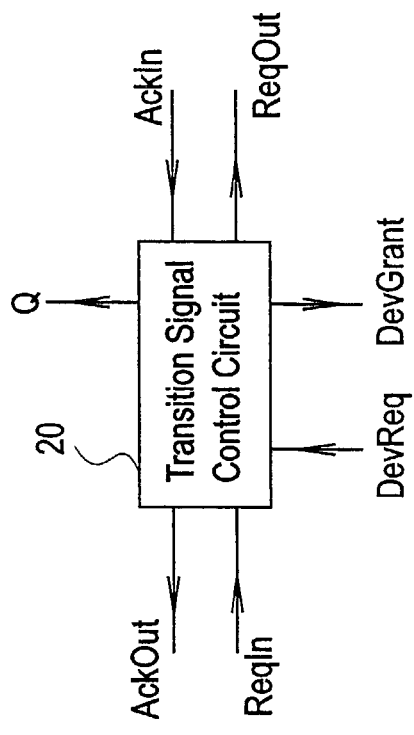
FIGS. 2(A) and (B) are block diagrams of a transition signal control circuit depicting an embodiment of the present invention.
Figure 2B:
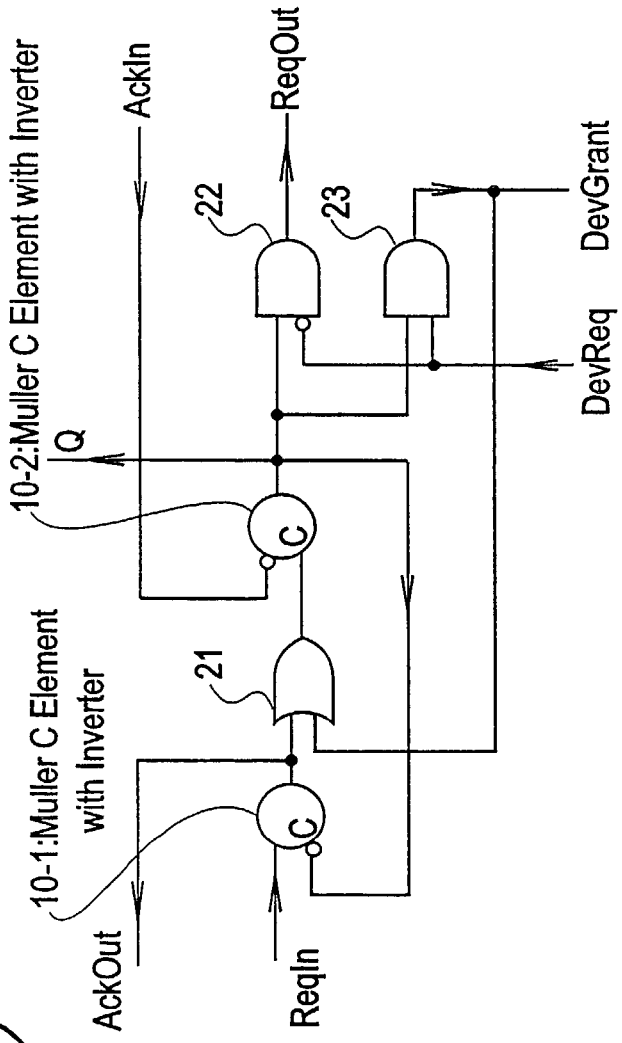

FIGS. 2(A) and (B) are block diagrams of a transition signal control circuit depicting an embodiment of the present invention, where FIG. 2(A) shows a simplified diagram (symbols), and FIG. 2(B) is a circuit diagram.

The transition signal control unit according to the present invention comprises a transition signal control circuit where a loop holding a token is created using a plurality of Muller C elements with inverter and gate circuits, wherein the transition signal control circuit uses a device request signal DevReq to be input as a clock signal, and one of the plurality of Muller C elements with inverter included in the transition signal control circuit transfers the token being held to the subsequent circuit according to the input of the device request signal DevReq or device response signal DevGrant.

Such transition signal control circuits when connected to each other can create a control circuit group with various characteristics.

Here, a control circuit group means a circuit group which includes a ring control circuit where the transition signal control circuits are arranged in a ring shape or a control circuit array where the transition signal control circuits are arranged in an array. Depending on the configuration, a ring control circuit may include a control circuit array.

Figure 29B:
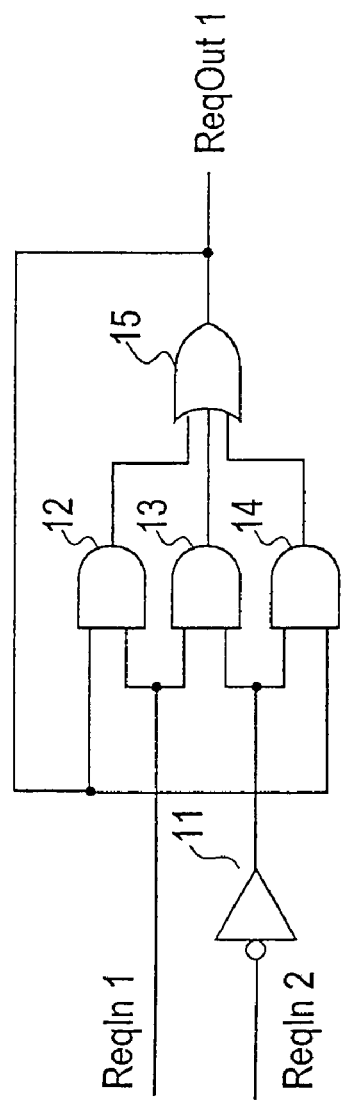
FIGS. 29(A) and (B) are block diagrams of a conventional Muller C element with inverter.
Figure 29A:
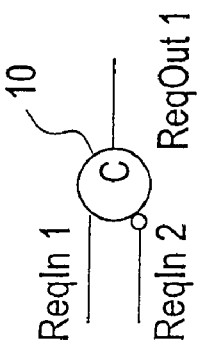
Figure 30:
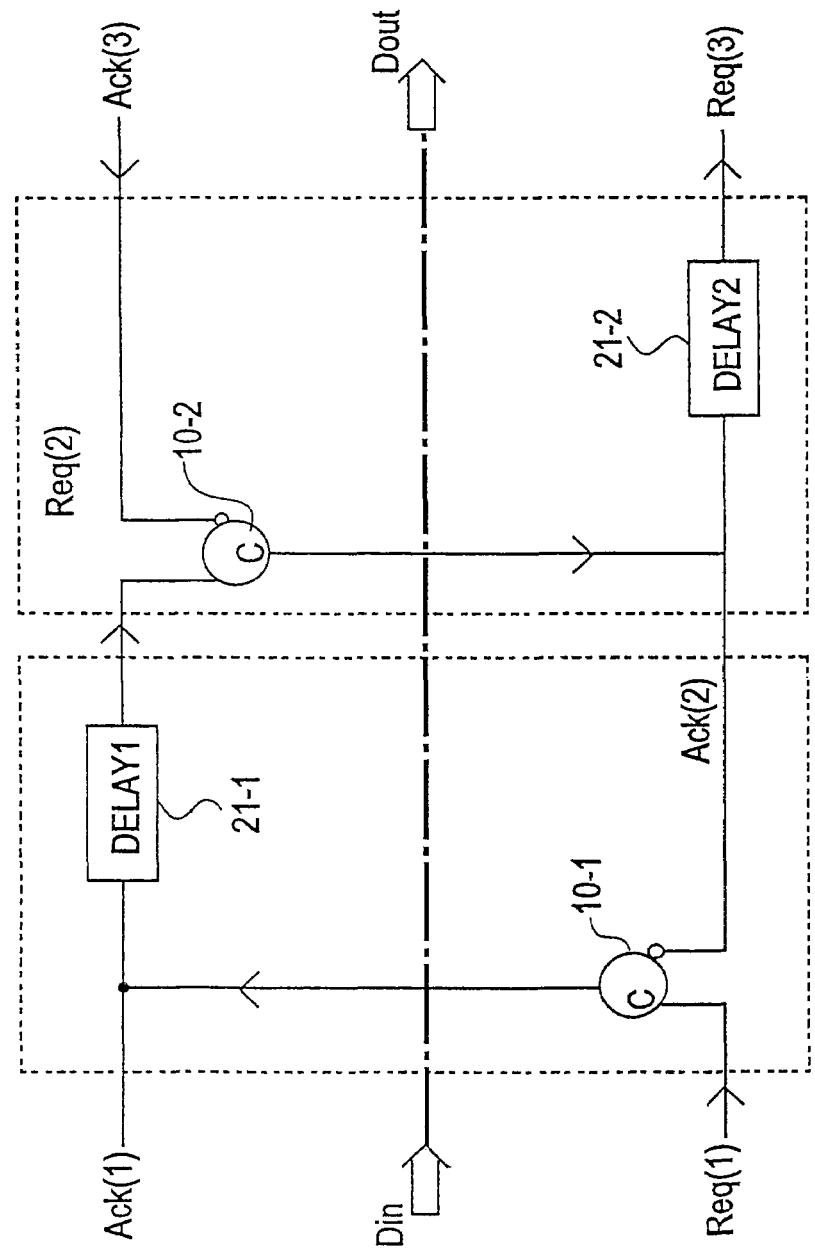
FIG. 30 is a conceptual diagram of a control circuit of a conventional micro-pipeline.
Figure 31:
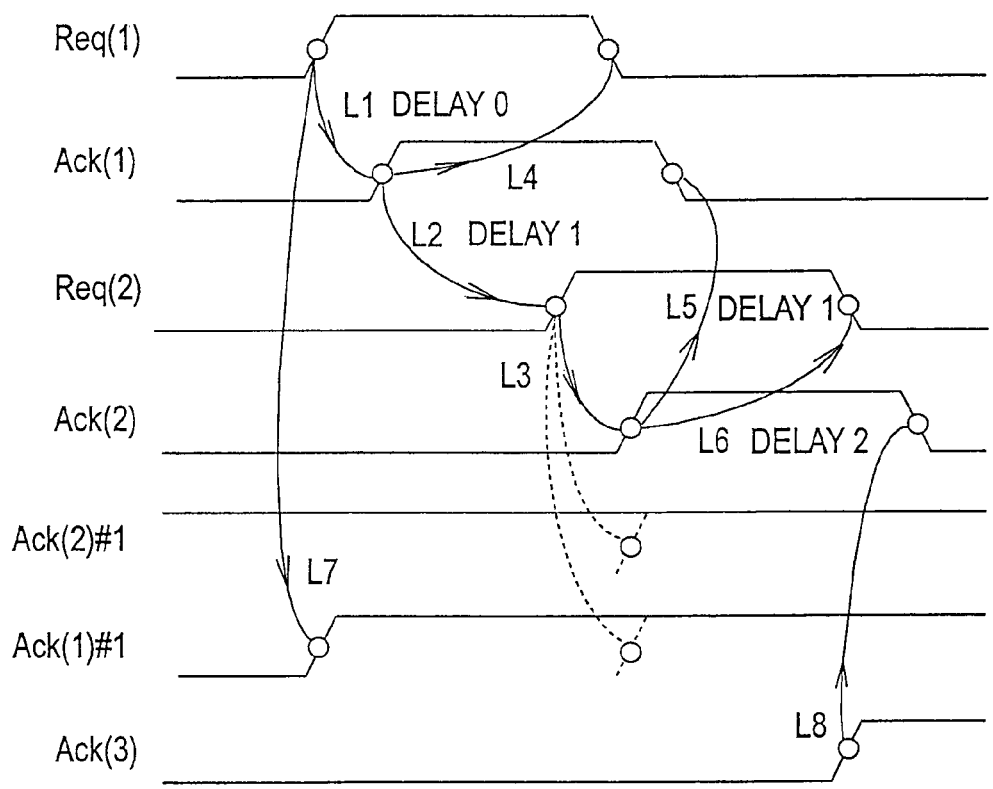
FIG. 31 is a timing chart of the operation in FIG. 30.

The transition signal control circuit 20 is comprised of the two Muller C elements with inverter 10-1 and 10-2 shown in FIG. 29, and three gate circuits (e.g. 2 input OR gate 21 and 2 input AND gates 22 and 23).

In the Muller C element with inverter 10-1, a request signal ReqIn, which is a transition signal, is input to the positive input terminal, an output signal Q, which is a transition signal, is fed back and is input to the negative input terminal, and a response signal AckOut, which is a transition signal, is output from the output terminal. The first input terminal of the OR gate 21 is connected to the output terminal of the Muller C element with inverter 10-1, the first control signal (e.g. device response signal) DevGrant, which is a transition signal, is input to the second input terminal of the OR gate 21, and the output terminal is connected to the positive input terminal of the Muller C element with inverter 10-2. In the Muller C element with inverter 10-2, a response event AckIn, which is a transition signal, is input to the negative input terminal and an output signal Q is output from the output terminal.

The output terminal of the Muller C element with inverter 10-2 is connected to the negative input terminal of the Muller C element with inverter 10-1, and is also connected to the positive input terminal of the AND gate 22 and the first input terminal of the AND gate 23. In the AND gate 22, a second control signal (e.g. device request signal from a device not illustrated) DevReq, which is a transition signal, is input to the negative input terminal, and a request signal ReqOut, which is a transition signal, is output from the output terminal. In the AND gate 23, the device request signal DevReq is input to the second input terminal, and the device response signal DevGrant is output from the output terminal. The device response signal DevGrant is fed back and input to the second input terminal of the OR gate 21, and is also sent to the device, which is not illustrated.

The Muller C element with inverter 10-2, the OR gate 21 and the AND gate 23 constitute a loop which holds a token. Even after the request signal ReqIn is canceled, and the Muller C element with inverter 10-1 cancels the output of the response signal AckOut, the token is held by the OR gate 21, which is inserted into this loop, as long as the device response signal DevGrant is output from the AND gate 23. When the device request signal DevReq is not output from the device, however, the output signal Q, which is output from the Muller C element with inverter 10-2, is input to the AND gate 22, and which is output from the AND gate 22 as the request signal ReqOut, the device response signal DevGrant is no longer output from the AND gate 23 at this time. Then the above mentioned loop is canceled, and as a result, the token is transferred to another transition signal control circuit connected to the request signal ReqOut side.

(2) Operation

The operation of the transition signal control circuit 20 in FIG. 2 is relatively simple. When the Muller C element with inverter 10-1 receives the request signal ReqIn, the Muller C element with inverter 10-1 returns the response signal AckOut as the response. If the Muller C element with inverter 10-1 receives the request signal ReqIn when the transition signal control circuit 20 does not hold a token (Q="L"), this transition signal control circuit 20 can receive the request signal ReqIn as a token (Q="H"). This token is transferred to another transition signal control circuit connected to the output terminal of the AND gate 22 as the request signal ReqOut.

This, however, is limited to the case when the device request signal DevReq is not output (DevReq="L") from the device, which is not illustrated, and if the device request signal DevReq is output (DevReq="H") from the device, which is not illustrated, the request signal ReqOut is blocked by the AND gate 22. If the device request signal DevReq is output from the device, which is not illustrated, the device response signal DevGrant is output (DevGrant="H") from the AND gate 23. This means that use is granted to the device, which is not illustrated.

For example, the token is held by feeding back the device response signal DevGrant to the OR gate 21. In other words, if the device request signal DevReq is output from the device, the token is held by the loop of the Muller C element with inverter 10-2, AND gate 23 and OR gate 21, and the token is not able to transfer to the next transition signal control circuit as the request signal ReqOut. In this way, the device request signal DevReq functions as a control signal for the token.

The loop holding the token includes the Muller C elements with inverter 10-1 and 10-2 as a latch circuit for an event, so this configuration is similar to an FF, where two latches are combined in the clock synchronous circuit. In other words, the transition signal control circuit 20 functions as an FF for an event, and the device request signal DevReq, which performs this control, corresponds to the clock signal in the clock synchronous circuit.

Figure 3:
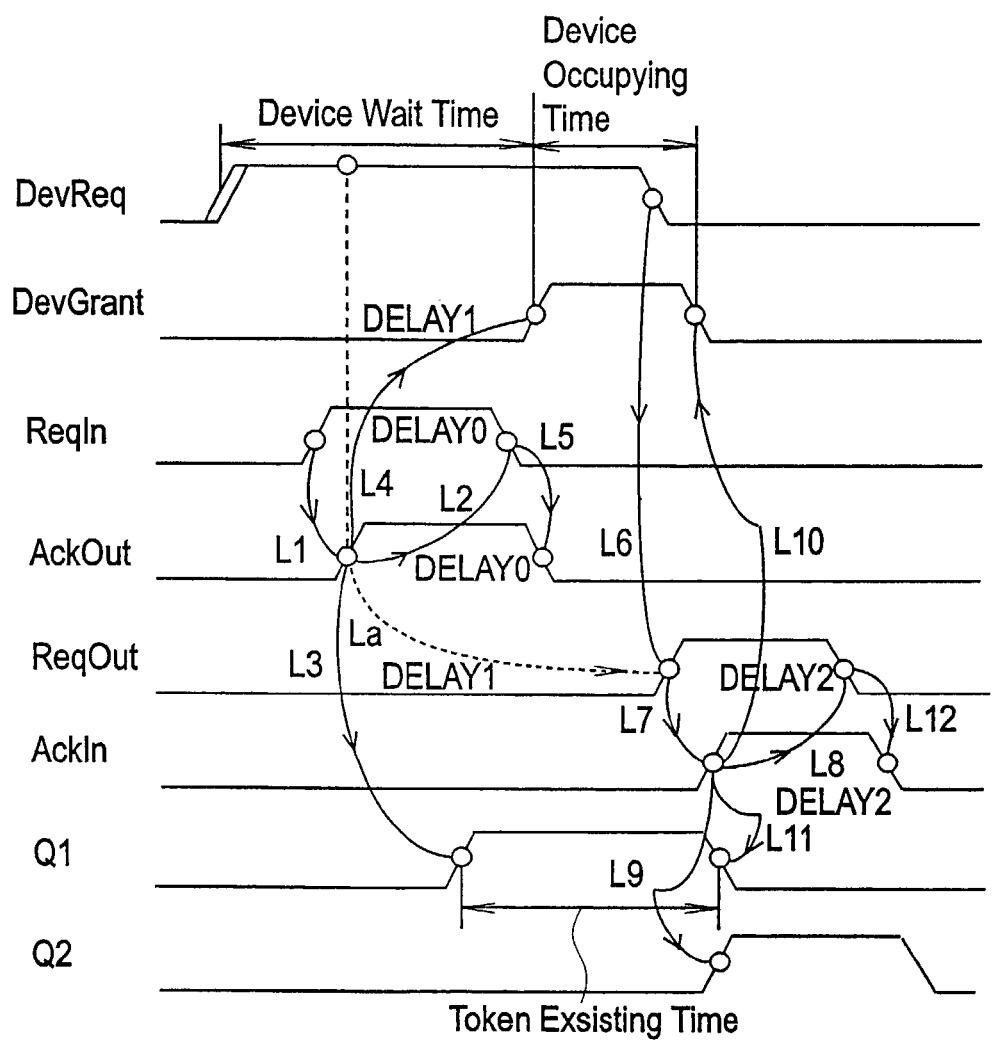
FIG. 3 is a timing chart of the operation in FIG. 2.

FIG. 3 is a timing chart of the operation in FIG. 2.

The operation of the transition signal control circuit 20 in FIG. 2 will now be described in detail with reference to FIG. 3.

When the request signal ReqIn is input from the left side of the transition signal control circuit 20 to the Muller C element with inverter 10-1 (ReqIn="H"), the response signal AckOut rises (AckOut="H") as the response by the link L1. The delay time DELAY 1 of the link L1 is the transit time td (C1) of the Muller C element with inverter 10-1. If the device request signal DevReq is being output and the device, which is not illustrated, is requesting use (DevReq="H") at this time, as shown by the dashed line in FIG. 3, the output signal Q1 rises (Q1="H") by the link L3, and the token is held. The delay time of the link L3 is the sum of the transit time td (G1) of the OR gate 21 and the transit time td (C2) of the Muller C element with inverter 10-2.

When the response signal AckOut is fed back to the Muller C element with inverter 10-1 as the request signal ReqIn (ReqIn="L") by the link L2 via the circuit at the left side, which is not illustrated, the delay time is assumed to be DELAY 0. If the circuit at the left side, which is not illustrated, is also a transition signal control circuit, then the delay time DELAY 0 is the sum of the transit time td (C2) of the Muller C element with inverter 10-2 and the transit time td (G2) of the AND gate 22. As a result, the response signal AckOut falls (AckOut="L") by the link L5, and the delay time of the link L5 becomes the same as that of the link L1. When the device request signal DevReq is being output and the device requests use (DevReq="H"), the rise of the response signal AckOut raises the device response signal DevGrant (DevGrant="H") by the link L4. The delay time of the link L4 is the sum of the transit time td (G1) of the OR gate 21, the transit time td (C2) of the Muller C element with inverter 10-2, and the transit time td (G3) of the AND gate 23.

When the device requests use (DevReq="H"), the time, until the device response signal DevGrant as the response thereof from the AND gate 23 rises (DevGrant="H"), becomes the wait time for the device. The period while the device occupies control is the time when the device response signal DevGrant is up. When the device releases control, the device request signal DevReq falls (DevReq="L"). Then the request signal ReqOut, which is output from the AND gate 22, rises (ReqOut="H") by the link L6.

If the device has not requested use from the beginning (DevReq="L"), the response signal AckOut, which is output from the Muller C element with inverter 10-1, rises, then the request signal ReqOut rises (ReqOut="H") by the link La shown by the dashed line in FIG. 3. In this case, the delay time DELAY 1 by the link La is the sum of the transit time td (G1) of the OR gate 21, the transit time td (C2) of the Muller C element with inverter 10-2, and the transit time td (G2) of the AND gate 22.

In this way, when the device request signal DevReq falls (DevReq="L") or when the device has not requested use from the beginning (DevReq="L"), the request signal ReqOut rises (ReqOut="H"). As a result, the response signal AckIn rises (AckIn="H") by the link L7 via the circuit at the right side, which is not illustrated. If the circuit at the right side, which is not illustrated, is a transition signal control circuit, then the delay time of the link L7 is the transit time td (C1) of the Muller C element with inverter 10-1.

The response signal AckIn causes the fall of the device response signal DevGrant (DevGrant="L") by the link L10. The response signal AckIn also causes the fall of the output signal Q1 (Q1="L") by the link L11, and ends the holding of the token by this transition signal control circuit 20. Therefore the time when the token existed in this transition signal control circuit 20 is given by the time while the output signal Q1 is up (Q1="H").

The link L9 is the same as the link L3. And the link L8 is the same as the link L2. However, the delay time thereof is the DELAY 2. And the link L12 is the same as the link L5.

(3) Effect

According to the transition signal control circuit 20 of the present embodiment, a latch circuit for control events, which conventional asynchronous transition signal control circuits lack, can be configured. This transition signal control circuit 20 is based on the concept that an event does not directly control the logic circuit, but the control itself transits by transferring the token (output signal Q). In this sense, the device request signal DevReq and the device response signal DevGrant are regarded as signals for controlling events. Therefore, the transition signal control circuit 20 in FIG. 2 can be applied to various circuits and devices, such as DMA controllers and transition signal control processors.

(Control Example of Logic Circuit by Transition Signal Control Circuit)

FIGS. 4(A) and (B) are block diagrams of the transition signal control unit depicting control examples of the logic circuit by the transition signal control circuit 20 in FIG. 2, where FIG. 4(A) shows a simplified diagram of control A and control B, and FIG. 4(B) is a circuit diagram.

In FIG. 4(A), the control method shown by the triangle mark in the logic circuit shows the case of the control A, and a double circle with a filled center shows the control B.

As FIG. 4(A) shows, when the logic circuit 32 is controlled by the transition signal control circuit 20, the output signal Q, which is a transition signal to be output from the transition signal control circuit 20, is used. The output signal Q controls the logic circuit 32 only when the token exists in the transition signal control circuit 20 (Q="H"), and the output signal Q is not output (Q="L") in other cases. Therefore, the output signal Q normally has a pulse shape. In the case of the control A, this pulse is regarded as a latch signal.

In the case of the control B, the pulse of the output signal Q is input to the counter with reset terminal 31 (e.g. single counter comprised of a D-FF) as a clock signal. In the single counter 31, the count output signal Qc, which is output from the output terminal of the single counter, is "L" at reset by the reset signal Reset, which is input to the reset terminal R, then is inverted by receiving the clock signal of the output terminal Q, and the count output signal Qc becomes "H".

Figure 26:
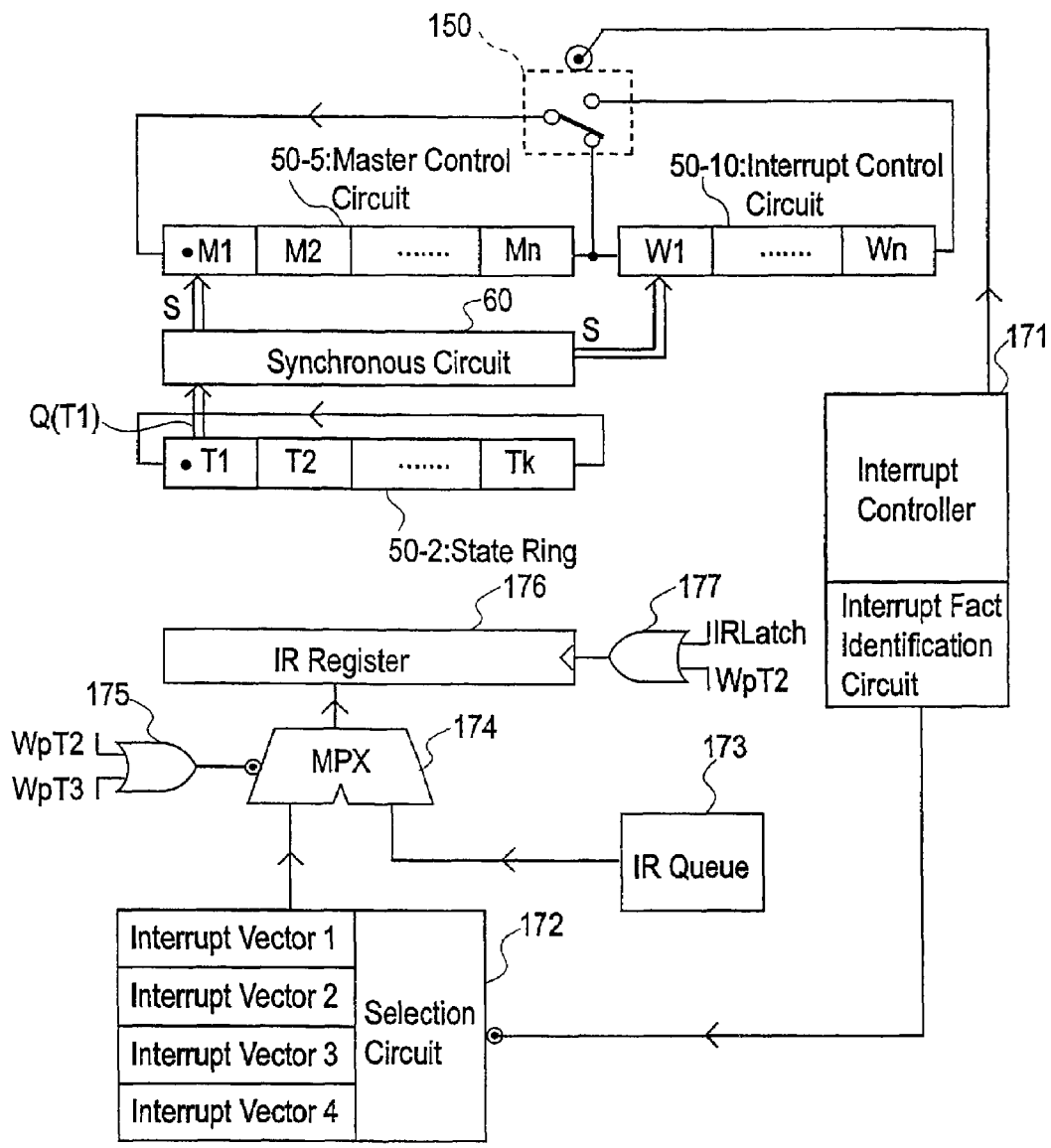
FIG. 26 is a block diagram of a transition signal control unit depicting an example of adding interrupt control according to an embodiment of the present invention.

In the case of the control B, signals are fixed, so that in some cases the status may be needed to be returned to the original status by inputting the clock again. In such a case, it is preferable to determine a start signal and stop signal by the OR gate, for example. FIG. 26 shows a concrete example of this.

Figure 4:
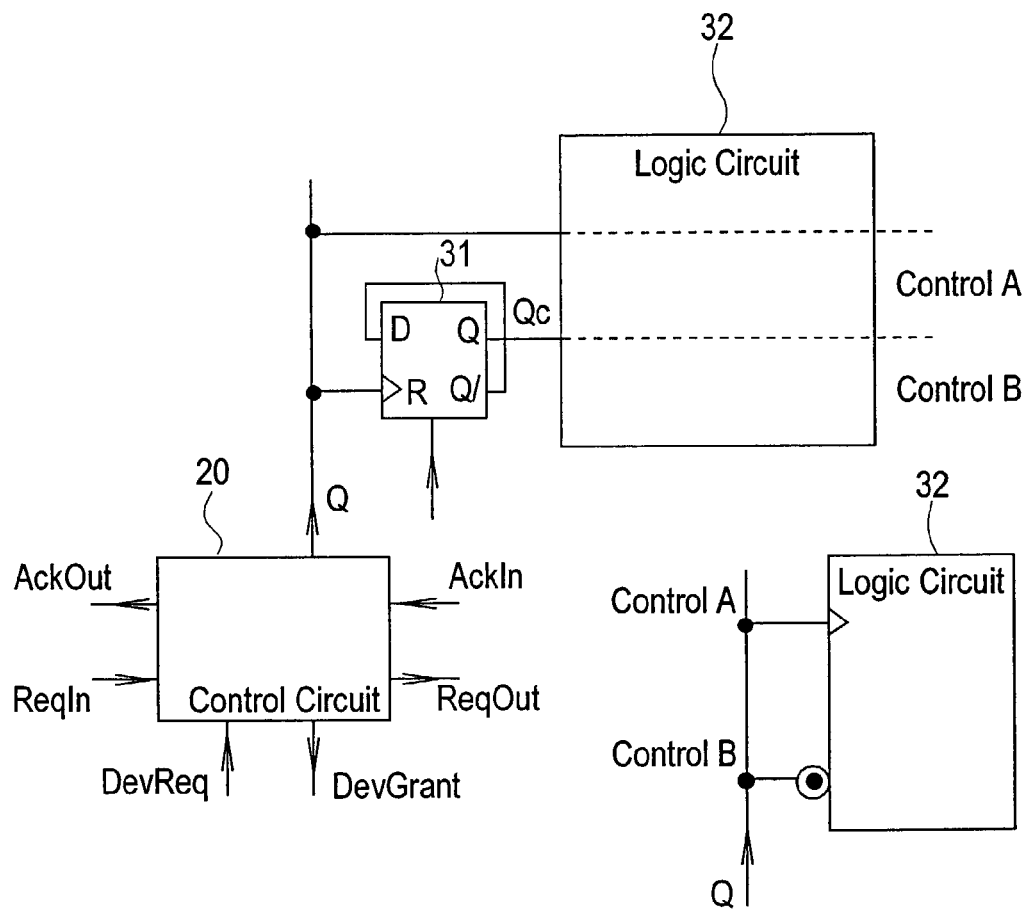
FIGS. 4(A) and (B) are block diagrams of the transition signal control unit depicting control examples of the logic circuit by the transition signal control circuit 20 in FIG. 2.

In the case of the transition signal control unit in FIG. 4, the logic circuit to be the control target is controlled using the output signals of the transition signal control circuit and the counter with a reset, so the logic circuit can be accurately controlled asynchronously.

(Control Example of Device Replacement by Transition Signal Control Circuit)

FIGS. 5(A) and (B) are block diagrams of the transition signal control unit depicting control examples of the device replacement by the transition signal control circuit 20 in FIG. 2, where FIG. 5(A) shows a simplified diagram of the control C and the control D, and FIG. 5(B) is a circuit diagram.

In this transition signal control unit, a delay inversion means (e.g. a circuit where a delay element 34 for delaying the device response signal DevGrant, which is the first control signal, for a predetermined time Td, and an inverter 35 for signal inversion, are cascade-connected) is connected between the device response signal DevGrant terminal and the device request signal DevReq terminal of the transition signal control circuit 20. The logic circuit 33 to be the control target, and the clock terminal of the counter with reset terminal 31 (e.g. single counter comprised of a D-FF with reset terminal) are connected to the device response signal DevGrant terminal of the transition signal control circuit 20, so that the count output signal Qc, which is output from the output terminal Q of the single counter 31, is input to the logic circuit 33.

In this transition signal control unit, the token remains in the transition signal control circuit 20 while the device request signal DevReq of the transition signal control circuit 20 is "H".

In the transition signal control circuit 20, when a token does not exist at the beginning, the device response signal DevGrant is "L", and responding to this, the device request signal DevReq becomes "H". Even if the token is taken into the transition signal control circuit 20, the device request signal DevReq does not immediately become "L", but maintains "H" during a predetermined time Td due to the delay element 34. Therefore, at least during this predetermined time Td, the device response signal DevGrant remains "H", and this can be used as the control signal (control C and control D) of the logic circuit 33.

In other words, the device response signal DevGrant, which is normally output from the transition signal control circuit 20, has a pulse shape. The control C uses this pulse as a latch signal. In the case of the control D, this pulse is input to the single counter 31 as a clock signal, and the count output signal Qc, which is output from the output terminal Q of this single counter 31, is supplied to the logic circuit 33.

The device request signal DevReq and the device response signal DevGrant of the transition signal control circuit 20 are originally used for the device, but can also be used to create the control signals (C, D) for controlling the logic circuit 33, just like in the case of FIG. 4. In the transition signal control circuit 20, the device response signal DevGrant is not longer output after the token is transferred, so the device request signal DevReq returns to "H" again.

Figure 5:
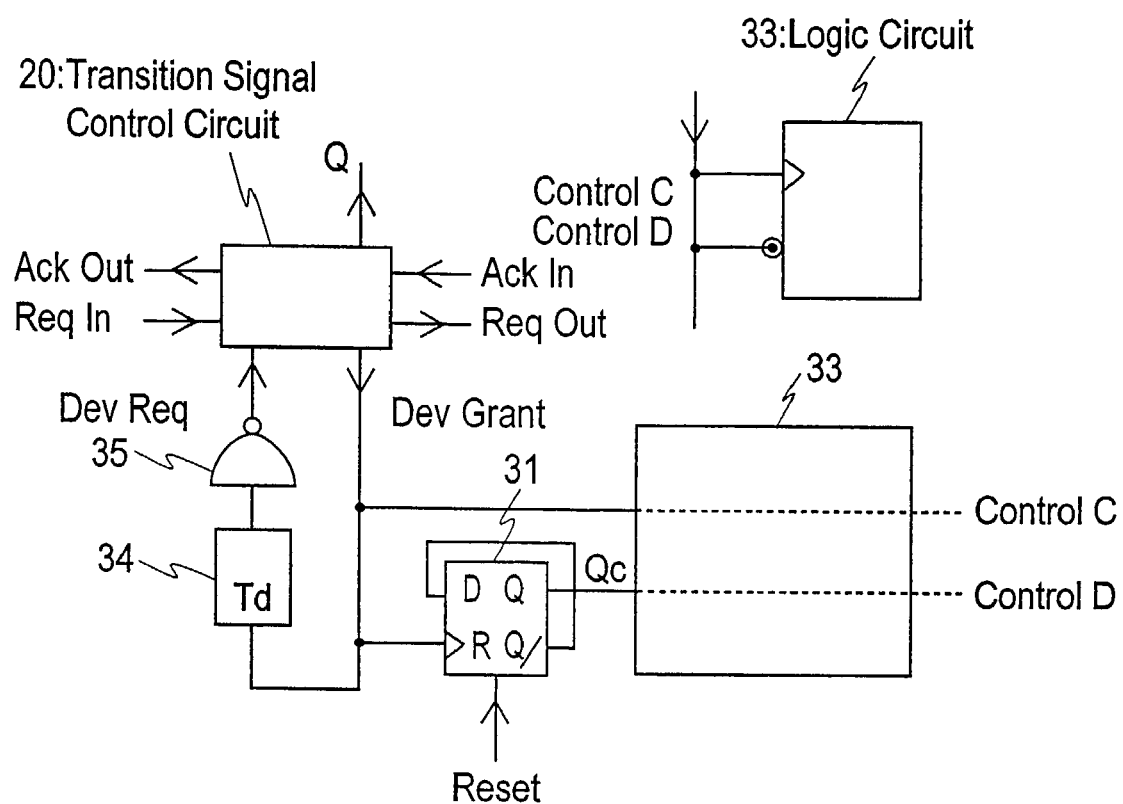
FIGS. 5(A) and (B) are block diagrams of a transition signal control unit depicting control examples of a device replacement by the transition signal control circuit depicting an embodiment of the present invention.

In the case of the transition signal control unit in FIG. 5, the logic circuit to be the control target is controlled using the output signals of the delay inversion means, the transition signal control circuit, and the counter with a reset, so the logic circuit can be accurately controlled asynchronously.

(Ring Control Circuit)

Figure 6:
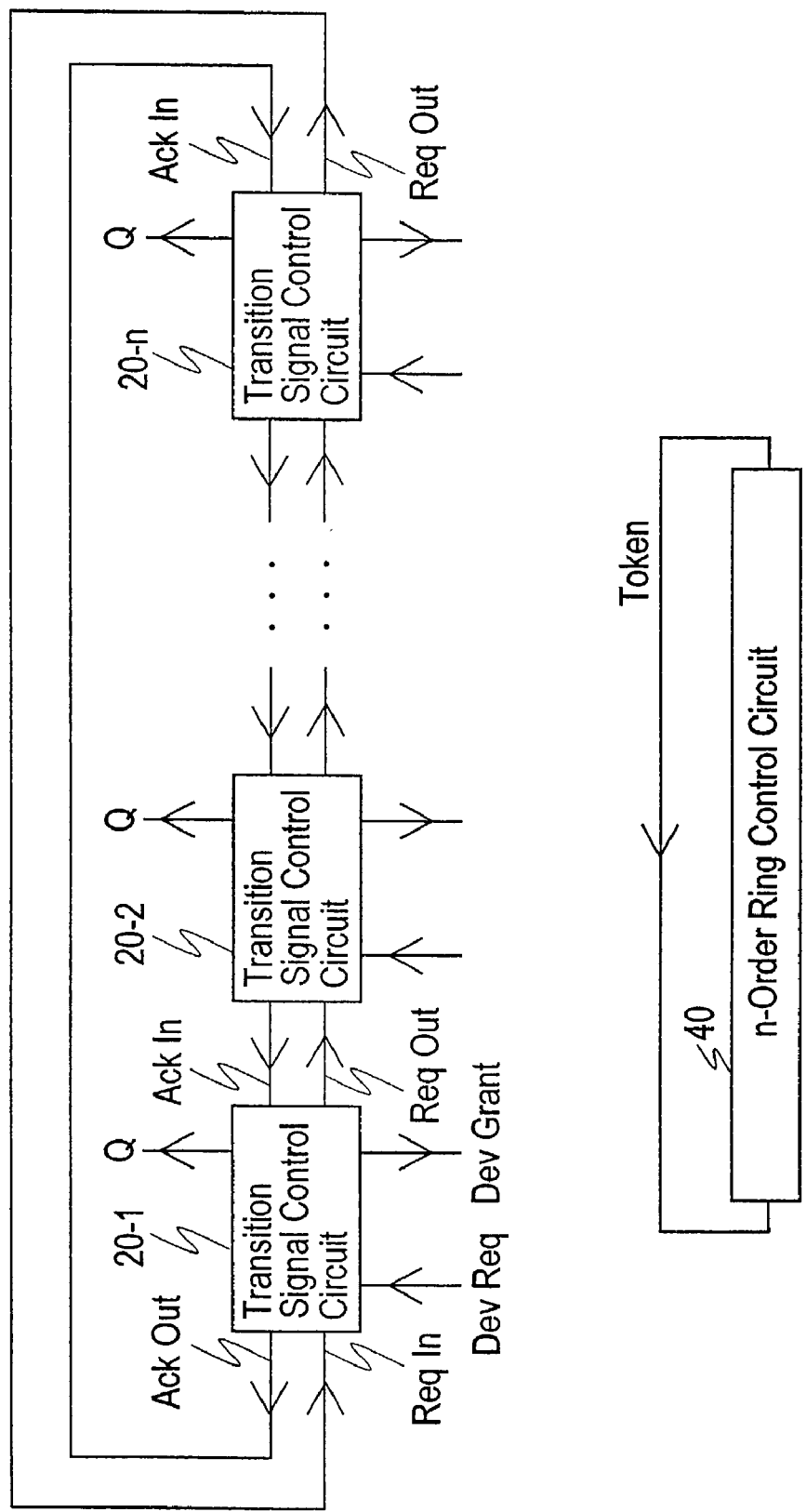
FIGS. 6(A) and (B) are block diagrams of a ring control circuit used for an embodiment of the present invention.

FIGS. 6(A) and (B) are block diagrams of the ring control circuit to be used for an embodiment of the present invention, where FIG. 6(A) is a circuit diagram, and FIG. 6 (B) shows a simplified diagram.

The n-order ring control circuit 40 has a plurality n number of transition signal control circuits 20-1 to 20-n, which are cascade-connected in n-stages to be a complete ring shape. In other words, the response signal AckOut terminal and the request signal ReqIn terminal of the transition signal control circuit 20-1 in the first stage are connected to the response signal AckIn terminal and the request signal ReqOut terminal of the transition signal control circuit 20-n in the last stage, and the response signal AckIn terminal and the request signal ReqOut terminal of the transition signal control circuit 20-1 in the first stage are connected to the response signal AckOut terminal and the request signal ReqIn terminal of the transition signal control circuit 20-2 in the second stage. In the same manner, from the transition signal control circuit 20-3 in the third stage to the transition signal control circuit 20-n in the last stage is cascade-connected.

As the simplified diagram in FIG. 6(B) shows, the request signal ReqIn (that is, a token) is transferred in the counter-clockwise direction of the ring control circuit 40. Therefore various transition signal control devices can be configured using the ring control circuit 40.

(Configuration of n-Order Ring Control Circuit Having a Token)

Figure 7B:
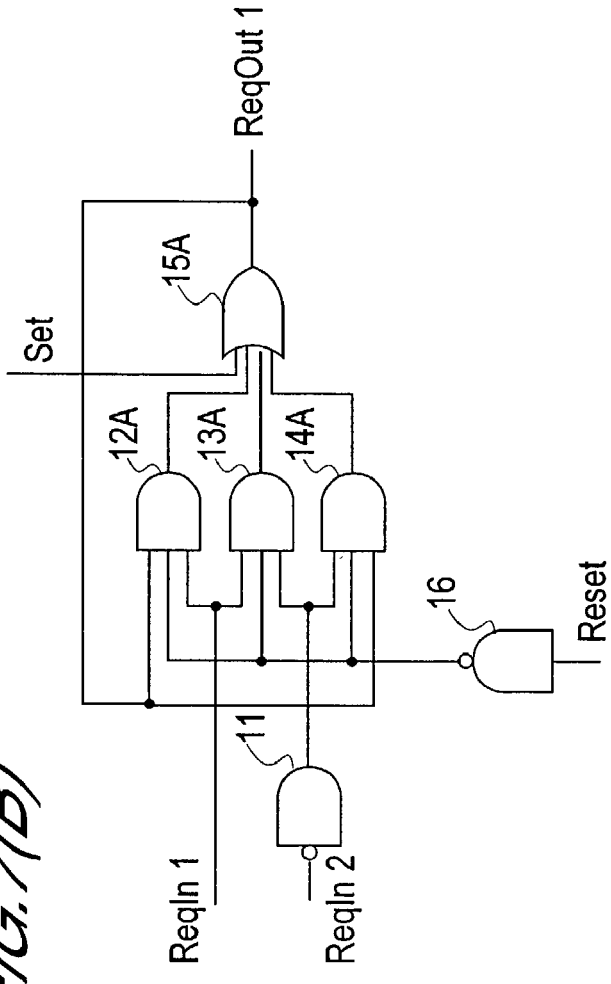
FIG. 7 (including 7(A)–7(C)) are diagrams of a configuration of an n-order ring control circuit having a token according to an embodiment of the present invention.
Figure 7A:
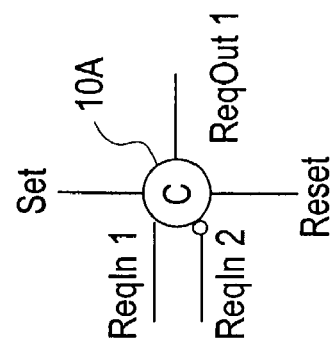
Figure 7C:
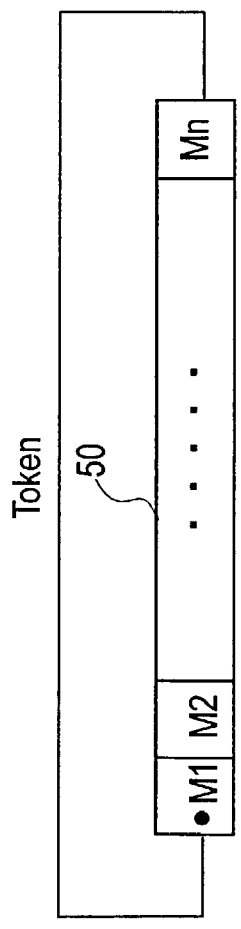

FIGS. 7(A) to (C) are diagrams of the configuration of an n-order ring control circuit having a token, where FIG. 7(A) is a diagram to indicate the logic symbols of the Muller element with inverter which has a set terminal and a reset terminal, FIG. 7(B) shows a configuration example of the Muller C element with inverter, and FIG. 7(C) shows a simplified diagram of the n-order ring control circuit having a token.

The Muller C element with inverter 10A, which has the set terminal and the reset terminal shown in FIGS. 7(A) and (B), is comprised of an inverter 11, which is similar to that of the Muller C element with inverter 10 in FIG. 29, 3 input AND gates 12A to 14A, which are disposed instead of the 2 input AND gates 12 to 14 in FIG. 29, 4 input OR gate 15A, which is disposed instead of the 3 input OR gate in FIG. 29, and an inverter 16 for inverting the reset signal Reset.

According to this configuration, the Muller C element with inverter 10A can be defined to be initial status by the reset signal Reset or by the set signal Set. In other words, no matter what the values are for the request signal ReqIn1 and ReqIn2 of the input, the reset signal Reset is inverted by the inverter 16 and is input to the AND gates 12A to 14A, for the reset signal ReqOut of the output to be "L". For the request signal ReqOut of the output to be "H", on the other hand, it is sufficient to simply input the set signal Set to the OR gate 15A.

If the n-order ring control circuit 50 shown in FIG. 7 (C) is comprised of n-stages of the transition signal control circuits M1 to Mn using such a Muller C element with inverter 10A which has a set terminal and a reset terminal and the Muller C element with inverter 10 in FIG. 29, then it can be set such that the token can be given to only one transition signal control circuit (e.g. M1), and not to others.

Here it is considered whether it is sufficient if the set signal Set terminal is disposed in only the Muller C element with inverter 10-2, or should the set signal Set terminal also be disposed in the Muller C element with inverter 10-1 in the transistor signal control circuit 20, which holds the token in FIG. 2 at reset.

If the set signal Set terminal is disposed in only the Muller C element with inverter 10-2 in the transition signal control circuit 20 in FIG. 2, the request signal ReqIn is "L" at reset, since the previous transition signal control circuit has no token, and this "L" reaches the positive input terminal of the Muller C element with inverter 10-2 via the OR gate 21 if the device request signal DevReq is not output. As a result, the output signal Q becomes "L" immediately after reset is cleared, and a sufficient pulse width may not be secured for the request signal ReqOut. Therefore, it is necessary to dispose the set signal Set terminal for both the Muller C elements with inverter 10-1 and 10-2 at least in the transition signal control circuit 20, which has a token.

Whereas in the case of the transition signal control circuit 20 which has no token at reset, the reset signal Reset terminal must be disposed for both the Muller C elements with inverter 10-1 and 10-2 in only the next transition signal control circuit before the transition signal control circuit which holds a token for the same reason as stated above. For other cases, it is sufficient to dispose the reset signal Reset terminal in only the Muller C element with inverter 10-2.

In the n-order ring control circuit 50, which has a token in FIG. 7(C), the arrow mark on the ring indicates the direction in which the token flows. The black dot of the transition signal control circuit M1 at the first stage, which constitutes this ring control circuit 50, indicates that the transition signal control circuit M1 has the token at reset. No block dots are indicated for the other transition signal control circuits M2 to Mn, so there is only one token on the ring, and this token moves on the ring counterclockwise, as shown in FIG. 7(C).

Therefore, the Muller C elements with inverter 10-1 and 10-2 shown in FIG. 2 in the transition signal control circuit M1 in the first stage can be a Muller C element with inverter which has the set signal Set terminal, and the Muller C elements with inverter 10-1 and 10-2 in the transition signal control circuit M2 at the second stage can be a Muller C element with inverter which has the reset signal Set terminal, and for other transition signal control circuits, only the Muller C element with inverter 10-2 can be a Muller C element with inverter which has the reset signal Reset terminal.

(Transition Signal Control Unit Using Ring Control Circuit)

(1) Configuration

Figure 1B:
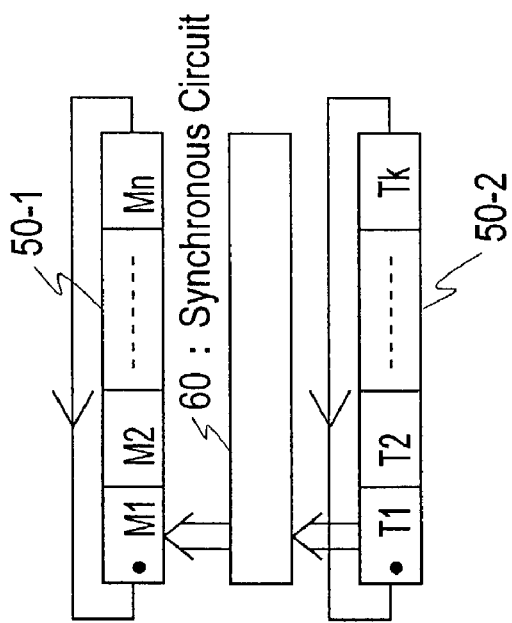
FIGS. 1(A) and (B) are block diagrams of a transition signal control unit depicting an embodiment of the present invention.
Figure 1A:
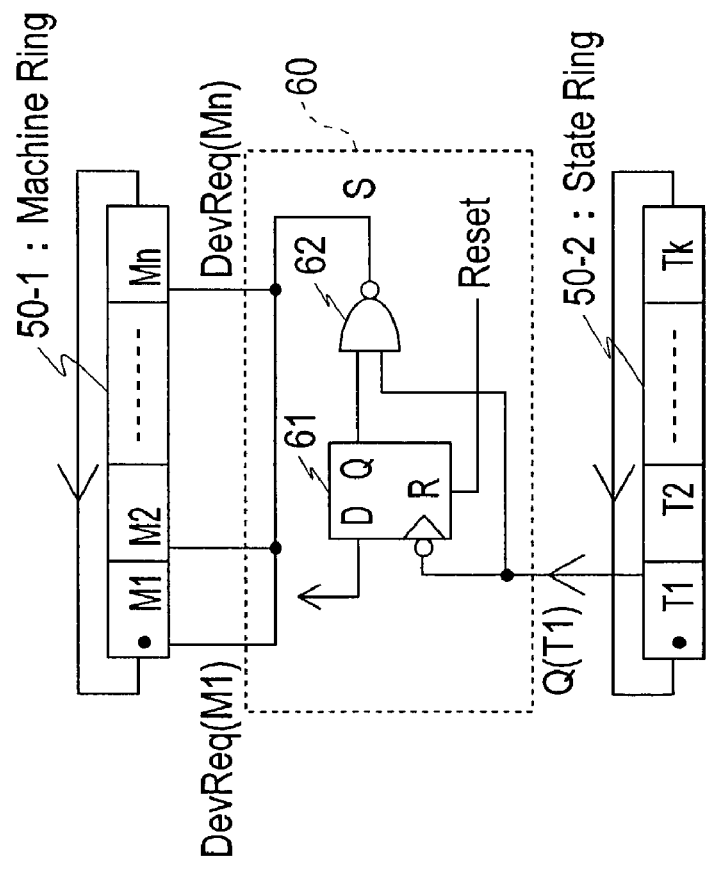

FIGS. 1(A) and (B) are block diagrams of the transition signal control unit depicting an embodiment of the present invention, where FIG. 1(A) is a circuit diagram, and FIG. 1(B) shows a simplified diagram.

This transition signal control unit is comprised of a machine ring 50-1, which is a first ring control circuit having the same configuration as the n-order ring control circuit 50 in FIG. 7(C), a state ring 50-2, which is a second ring control circuit, and a synchronous circuit 60 for synchronizing with the machine ring 50-1 by receiving the vector Q(T1), which is the transition signal to be output from the state ring 50-2.

The machine ring 50-1 is further comprised of the n-stages of transition signal control circuits M1 to Mn. The state ring 50-2 is further comprised of the k-stages of transition signal control circuits T1 to Tk. For example, the vector Q(T1), which is output from the transition signal control circuit T1 at the first stage of the state ring 50-2, is input to the synchronous circuit 60, and the vector S, which is a synchronous signal, is generated by this synchronous circuit 60. And this vector S is input to the respective device request signal DevReq terminal, which is the terminal of the second control signal, of each of the transition signal control circuits M1 to Mn, which constitute the machine ring 50-1, as the respective device request signals DevReq(M1), DevReq(M2), . . . DevReq(Mn).

Here, the vector S to be supplied to all the transition signal control circuits M1 to Mn, which constitute the machine ring 50-1, need not be common to all the transition signal control circuits M1 to Mn, but transition signal control circuits which do not synchronize may exist. For a transition signal control circuit which does not synchronize, a state is not created within the machine cycle (corresponding to M1, M2, . . . , ). A signal to be the base of synchronization is not especially limited, but vector Q(T1), which is output from the transition signal circuit T1 in the first stage of the state ring 50-2, is preferable, since the existence of a token at reset is convenient for control.

So by receiving the vector Q(T), which is output from the state ring 50-2, the synchronous circuit 60 outputs the vector S, which is a synchronous signal, to the machine ring 50-1. And the vector Q(T), which is output from the state ring 50-2, and the vector Q(M), which is output from the machine ring 50-1, create a timing signal to control a processor, for example, which is input to an instruction decoder and other components. Here, T=(T1, T2, . . . , Tk); M=(M1, M2, . . . , Mn); S=(S1, S2, . . . , Sn); Q(T)=(Q1(T1), Q2(T2), . . . , Qk(Tk)); and Q(M)=(Q1(M1), Q2(M2), . . . , Qn(Mn)).

The synchronous circuit 60 is disposed primarily for initial control at reset (that is, to prevent the machine ring 50-1 from running uncontrollably immediately after the state ring 50-2 is reset). The synchronous circuit 60 is comprised of a D-FF 61 with the reset signal Reset terminal, and a 2 input negative-AND (hereafter "NAND") gate 62. The D-FF 61 has a data terminal D where "H" is applied, a clock terminal to which the inversion signal of the vector Q(T1), which is output from the transition signal control circuit Ti in the first stage of the state ring 50-2, is input, a reset terminal R, to which the reset signal Reset is input, and an output terminal Q. The output signal of the D-FF 61 and the vector Q(T1) are input to the NAND gate 62, and the vector S, which is a synchronous signal, is output from the output terminal of the NAND gate 62.

In the transition signal control unit in FIG. 1, the basic concept is that the signal, after the output vector Q(T1) of the state ring 50-2 to be the foundation is inverted, is applied to the device request signal DevReq terminal of each transition signal control circuit M1 to Mn in the machine ring 50-1.

If the signal when the vector Q(T1) is inverted is directly applied to the device request signal DevReq terminal of each transition signal control circuit M1 to Mn in the machine ring 50-1, then the token exists in the transition signal control circuit T1 in the first stage of the state ring 50-2 at reset, and as a result, the device request signal DevReq terminal of the transition signal control circuit M1 in the first stage of the machine ring 50-1 is "L" immediately after reset is cleared, so the token immediately transits from the transition signal control circuit M1 in the first stage to the transition signal control circuit M2 in the second stage, and creating the state of the machine cycle (corresponding to M1) fails.

To prevent such a state, the D-FF 61 with reset terminal is disposed in the synchronous circuit 60, the data terminal D is set to "H", and the output terminal Q of the D-FF 61 at reset is set to "L". As a result, the vector S, which is a synchronous signal to be output from the NAND gate 62, also becomes "H" at reset. The D-FF 61 sets the output terminal Q to "H" at the fall of the vector Q(T1) to be input to the clock terminal, this state does not change thereafter. Therefore, the vector Q(T1), to be the foundation of synchronization, is blocked by the NAND gate 62 only immediately after reset.

Inter-ring synchronization in the transition signal control unit is FIG. 1 is based on the assumption that the device response signals DevReq terminal of each transition signal control circuit M1 to Mn in the machine ring 50-1 can control the token. When a token exists in the transition signal control circuit (e.g. M1) in the machine ring 50-1, if the device request signal DevReq terminal is "L", the token immediately transits to the next transition signal control circuit M2. Whereas the token remains in the transition signal control circuit M1 as long as the device request signal DevReq terminal of the transition signal control circuit M1 is "H".

The present invention is a transition signal control unit comprising a first ring control circuit, a second ring control circuit which has the same configuration as the first ring control circuit, and a synchronous circuit which synchronizes the first and second ring control circuits by inputting a vector Q(T) which is output from the second ring control circuit, outputting a vector S at a predetermined timing, and inputting the vector S to the first ring control circuit as a second control signal DevReq.

The first ring control circuit is further comprised of Muller C elements with inverter and a gate circuit, and has a plurality of transition signal control circuits for inputting a request signal ReqIn, response signal AckIn, and a second control signal DevReq, and outputting a request signal ReqOut, response signal AckOut, a first control signal DevGrant, and an output signal Q. If the request signal ReqIn is input when the second control signal DevReq is not input and a token is not held, each of the transition signal control circuits receives the request signal ReqIn as a token, and outputs this token as the request signal ReqOut, and if the second control signal DevReq is input, the transition signal control circuit outputs the first control signal DevGrant without outputting the request signal ReqOut, and holds the token.

And the plurality of transition signal control circuits are connected in a ring shape so that the output of the request signal ReqOut of the transition signal control circuit in a previous stage, out of the plurality of transition signal control circuits, becomes the input of the request signal ReqIn in the transition signal control circuit in the subsequent stage, and the output of the response signal AckOut of the transition signal control circuit in the subsequent stage becomes the input of the response signal AckIn of the transition signal control circuit in the previous stage, and the token exists in only one of the plurality of transition signal control circuits by connecting the plurality of transition signal control circuits in a ring shape and setting the initial value of the Muller C element with inverter.

In the transition signal control unit of the present invention, the vector Q(T), which is output from the second ring control circuit, is input to the synchronous circuit, and the vector S is output from this synchronous circuit at a predetermined timing. This vector S is input to the first ring control circuit as the second control signal DevReq, so as to synchronize the first and second ring control circuits. By the vectors Q(M) and Q(T), which are output from the first and second ring control circuits, timing to control a processor, for example, is created, which is input to an instruction decoder, for example.

(2) Operation

Figure 8:
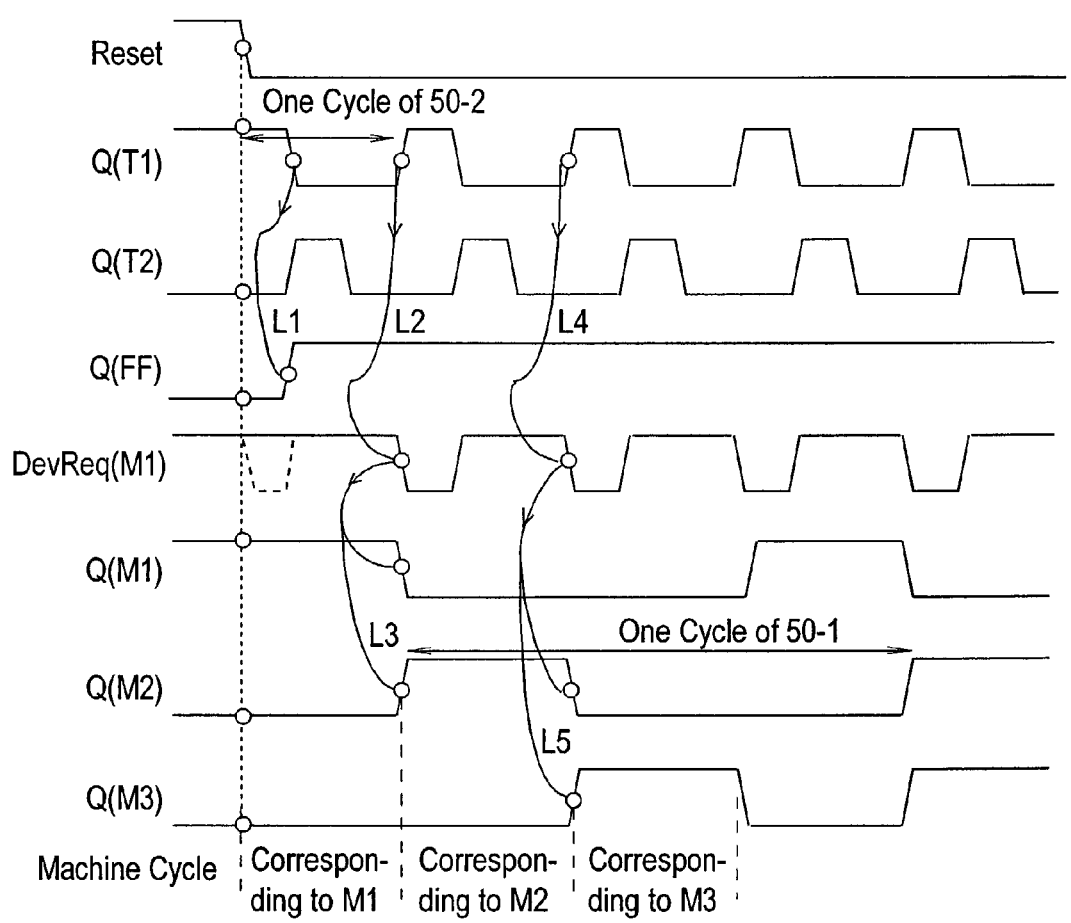
FIG. 8 is a timing chart of inter-ring synchronization in FIG. 1.

FIG. 8 is a timing chart of the inter-ring synchronization in the transition signal control unit in FIG. 1. This timing chart shows an example of timing when there are three transition signal control circuits in the machine ring 50-1 (n=3), and four transition signal control circuits in the state ring 50-2 (k=4).

When the reset signal Reset falls from "H" to "L", the vector Q(M1), which is output from the transition signal control circuit M1 in the first stage, and the vector Q(T1), which is output from the transition signal control circuit T1 in the first stage, are "H", and other vectors Q(M2), Q(T2), are "L". This means that the token exists only in the transition signal control circuit M1 in the first stage of the machine ring 50-1 and in the transition signal control circuit T1 in the first stage of the state ring 50-2 at reset, and no token exists in other transition signal control circuits M2, T2, . . . .

The vector Q(T1), which is output from the transition signal control circuit T1, is "H" immediately after reset, which means that the transition signal control circuit T1 is in the state (corresponding to T1) of the machine cycle (corresponding to M1) in terms of an example of a processor. At this time, the device request signal DevReq(M1), to be a synchronous signal for the transition signal control circuit M1, is "H". As a result, the token remains in the transition signal control circuit M1, and the vector Q(M1), which is output from the transition signal control circuit M1, maintains the machine cycle (corresponding to M1). The link L1 sets the output terminal Q(FF) of the D-FF 61 in the synchronous circuit 60 to "H", synchronizing the first fall of the vector Q(T1), which is output from the transition signal control circuit T1. The gradient of the fall of the reset signal Reset should be sharp to create accurate timing.

When the token is transferred around the state ring 502, and the vector Q(T1), which is output from the transition signal control circuit T1 in the first stage, becomes "H" next, the device request signal DevReq(M1), to be the synchronous signal for the transition signal control circuit M1 in the first stage, becomes "L" by the link L2. This causes a transition from the machine cycle (corresponding to M1) to the machine cycle (corresponding to M2) by the link L3. In other words, the vector Q(M1), which is output from the transition signal control circuit M1, falls, and the vector Q(M2), which is output from the transition signal control circuit M2 in the second stage, rise. In the case of the example of the processor, the state changes from the state (corresponding to T4) of the machine cycle (corresponding to M1) to the state (corresponding to T1) of the machine cycle (corresponding to M2).

The machine cycle advances in the same way in links L4 and L5, and becomes the machine cycle (corresponding to M3). In the present embodiment, the transition signal control circuits in the machine ring 50-1 are only M1, M2 and M3, so after this the machine cycle returns to the transition signal control circuit M1.

When the delay time unique to the circuit of each transition signal control circuit M1, T1, . . . , in the machine ring 50-1 and the state ring 50-2 is Td, if the token passes through the state ring 50-1 for one round, then the delay time is n×Td. Therefore in the present embodiment, the timing, when the state is Td and the machine cycle is n×Td, can be configured in terms of the example of the processor. If a device is connected to each transition signal control circuit M1, T1, . . . , however, both the length of the state and the length of the machine cycle change since the transition signal control circuits M1, . . . , operate asynchronously. The length of these times merely show the minimum state time and the machine cycle time.

To create accurate timing, it is preferable to use a delay element to create the delay time Td.

(3) Effect

In the present embodiment, the following effects (a) and (b) can be implemented.

(a) In the transition signal control unit in FIG. 1, a timing circuit similar to a clock synchronous circuit can be created by an asynchronous transition signal control unit. In this case as well, Boolean logic can be provided. This is because in Boolean logic, no time concept is introduced, and only the generation of an event is included as a causal relationship. Therefore, the present invention introduces timing for the first time to an asynchronous transition signal control unit, expanding the basis of the asynchronous design method, and contributes to the popularization of the asynchronous design method. Considering that the present invention allows high-speed operation as long as transition signal control is possible, the present invention can be applied only to arbitrators and other devices, can be applied to various circuits and devices, such as an asynchronous timing/control circuit and ultra-high-speed processor.

(b) In the ring control technology of the present embodiment, the pulse width and the delay time are important. The speed when the token passes around the machine ring 50-1 and the state ring 50-2 depends on the delay time by the OR gate 21 . . . in FIG. 2 in each transition signal control circuit M1, T1, . . . . Therefore, the token passes around the machine ring 50-1 and the state ring 50-2 at high-speed as the ring oscillator self-advances. As a result, the speed, which depends on temperature and other factors, is not constant. And the pulse width of the control signal, such as the vector Q(M) which controls the logic circuit, naturally becomes the minimum. In such a case, if the vector S, which is the synchronous signal in FIG. 1, does not have sufficient pulse width, then control may be lost.

In inter-ring synchronization, the rings have almost the same configuration, just like the relationship of the machine ring 50-1 and the state ring 50-2, and the vector S, which is the synchronous signal, can provide sufficient pulse width to control the machine ring 50-1. However, some devices to be connected to the transition signal control circuits M1, . . . , may run at high-speed (e.g. cache memory) In this case, the device request signal DevReq may not have sufficient pulse width. As a result, the pulse width of the request signal ReqOut is also decreased, as shown in the circuit configuration of the transition signal control circuit 20 in FIG. 2. In this case, some means must be undertaken to correct this situation.

Now the case when the vector S, which is a synchronous signal, has an unnecessarily long pulse width, which is the opposite of the above case, is considered. In the transition signal control unit in FIG. 1, the vector S, which is a synchronous signal, is common to all the transition signal control circuits M1, . . . in the machine ring 50-1, so the token may shift from the transition signal control circuit M1 to the next circuit M2, for example, while the device request signal DevReq is not output (DevReq="L"). Therefore, it is demanded here as well that the pulse width of the vector S and the transition time of the token be about the same.

In the synchronous circuit 60 in FIG. 1, the link L1 sets the output terminal Q(FF) of the D-FF 61 of the synchronous circuit 60 to "H" synchronizing with the first fall of the vector Q(T1), as shown in the timing chart in FIG. 8. However, it is possible that the change of the output terminal Q(FF) of the D-FF 61 is slow compared with the transition time of the token. This slowness is because the D-FF 61 itself is comprised of some gates. However the NAND gate 62 uses both the output terminal Q(FF) of the D-FF 61 and the vector Q(T1) as input, so vector S is created even if the fall of the vector Q(T1) becomes effective first. Therefore, the slow change of the output terminal Q(FF) of the D-FF 61 causes no special problems here.

(Inter-Ring Synchronization and Connection of Device)

Figure 9:
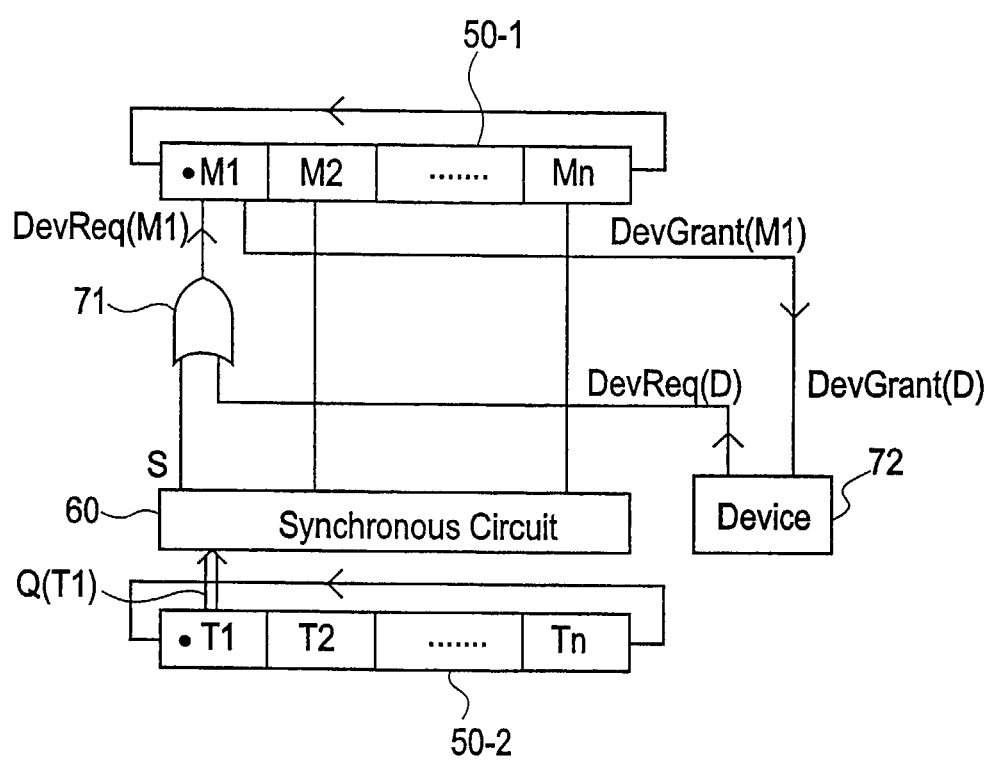
FIG. 9 is a block diagram of a transition signal control unit depicting an inter-ring synchronization and device connection example according to an embodiment of the present invention.

FIG. 9 is a block diagram of a transition signal control unit depicting inter-ring synchronization and a connection example of a device. FIG. 9 shows a method to support the connection of a device while the rings are synchronized.

In this transition signal control unit, a new gate circuit (e.g. 2 input OR gate) 71 and a device 72 are disposed, in addition to the machine ring 50-1, which is the first ring control circuit, the state ring 50-2, which is the second ring control circuit, and the synchronous circuit 60, the same as in FIG. 1. The vector S, which is a synchronous signal, to be output from the synchronous circuit 60, and the device request signal DevReq(D), to be output from the device 72, are input to the OR gate 71, and the output signal of this OR gate 71 is input to the transition signal control circuit M1 in the first stage of the machine ring 50-1 as the device request signal DevReq(M1), which is the second control signal. The device response signal DevGrant(M1), which is the first control signal to be output from the transition signal control circuit M1, is input to the device 72 as the device response signal DevGrant(D).

The transition signal control unit depicting an embodiment of the present invention is a transition signal control unit comprising a first and second ring control circuits which are the same as the other invention, a synchronous circuit for inputting the vector Q(T), which is output from the second ring control circuit, and outputting the vector S at a predetermined timing, and a gate circuit where a drive request signal DevReq(D), which is output from a control target device, and the vector S, which is output from the synchronous circuit, are input, open/close is controlled by the device request signal DevReq(D), the vector S is output, and vector S is supplied to the first ring control circuit as the second control signal DevReq in open state, and the vector S is shut off in close state. And the transition control of the device is executed by using the first control signal DevGrant, which is output from the first ring control circuit, as the device response signal DevGrant(D) of the device.

In the transition signal control unit depicting an embodiment of the present invention, the vector Q(T), which is output from the second ring control circuit, is input to the synchronous circuit, and the vector S is output from this synchronous circuit at a predetermined timing. When the device request signal DevReq(D) is output from the control target device, the open/close of the gate circuit is controlled by the device request signal DevReq(D). When the gate circuit is in open state, the vector S from the synchronous circuit is input and is output as is, and this is supplied to the first ring control circuit as the second control signal DevReq. When the gate circuit is in close state, the vector S, from the synchronous circuit, is shut off, and this vector S is not supplied to the first ring control circuit. When the first control signal DevGrant is output from the first ring control circuit, this is supplied to the device as the device response signal DevGrant(D), so as to execute transition control of this device.

Now the operation of the transition signal control unit will be described.

The vector S, which is output from the synchronous circuit 60, and the device request signal DevReq(D), which is output from the device 72, are input to the OR gate 71, and the output signal of this is input to the transition control circuit (e.g. M1) in the machine ring 50-1, corresponding to the target machine cycle, as the device request signal DevReq(M1). If the device 72 does not output the request (DevReq(M1)="L"), the machine cycle-continues only during the above mentioned n×Td. If the device 72 outputs the request (DevReq(M1)="H"), the machine cycle is extended until this device 72 releases the control (DevReq(D)="L").

While the device 72 outputs the request, the OR gate 71 is closed by the device request signal DevReq(D), and the vector S, which is output from the synchronous circuit 60, is ignored. Therefore during this time, the machine cycle does not transit even if the vector S becomes "L". The machine cycle transition occurs only when the device 72 releases the control (DevReq(D)="L"), and the vector S becomes "L".

As described above, according to the transition signal control unit in FIG. 9, the device 72 can be controlled at timing similar to the clock synchronous circuit, even if the control is asynchronous transition signal control. Therefore an effect similar to the transition signal control unit in FIG. 1 is implemented.

(Generation of an Inhibit Signal for Inhibiting a Redundant Pulse)

(1) Configuration

Figure 10:
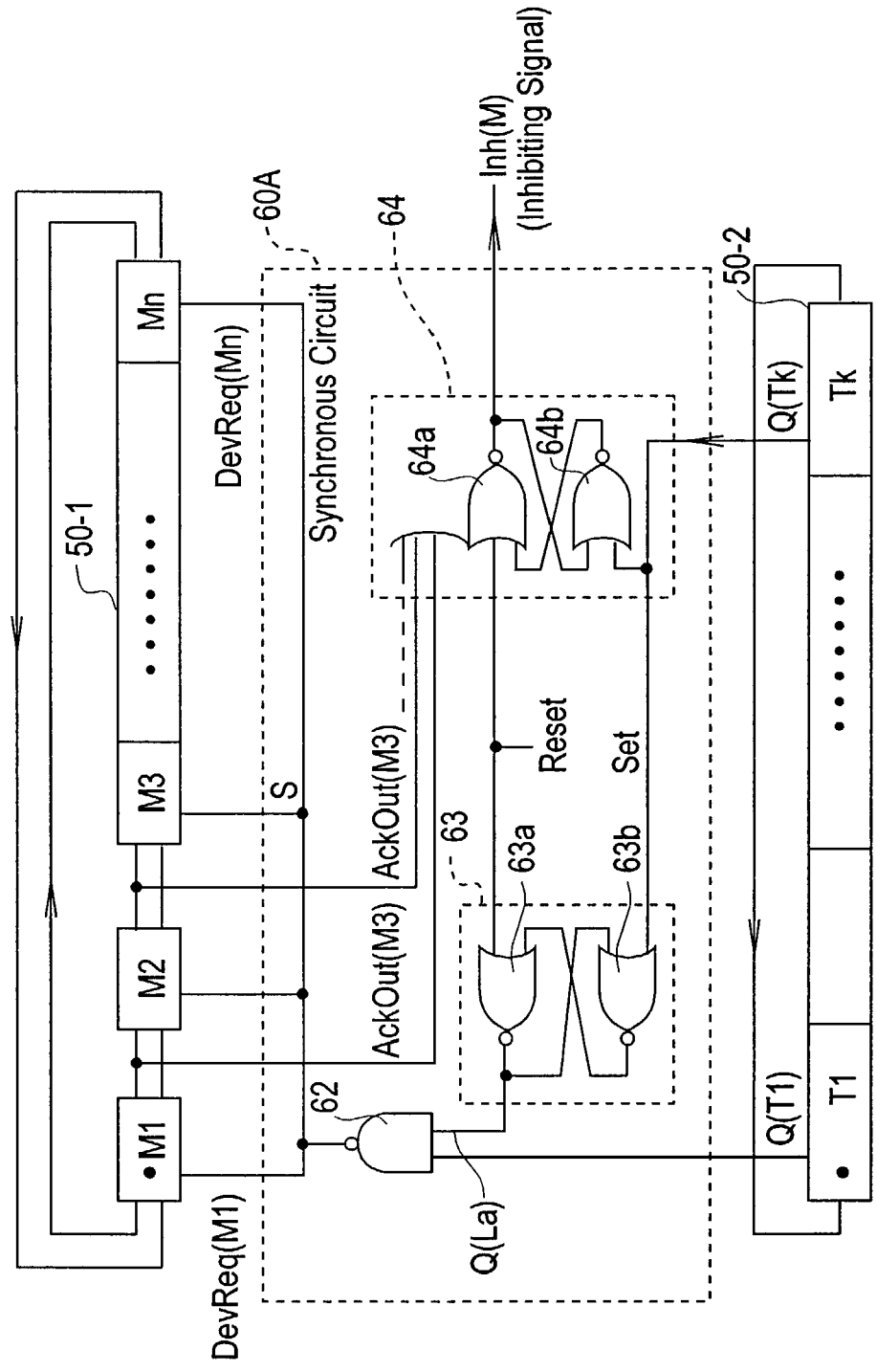
FIG. 10 is a block diagram of a transition signal control unit depicting a redundant pulse inhibiting signal generation example of an inhibit signal for a redundant according to an embodiment of the present invention.

FIG. 10 is a block diagram of a transition signal control unit depicting a generation example of an inhibit signal for inhibiting the redundant pulse.

In the case of the synchronous circuit 60 in FIG. 1(A), the D-FF 61 is used for initial control, but in the case of the transition signal generation unit in FIG. 10, the circuit, which is comprised of the latch circuits 63 and 64 with a set terminal and a reset terminal in the synchronous circuit 60A, is used for initial control. In other words, the latch circuits 63 and 64, each with a set terminal and a reset terminal, for generating an inhibit signal for inhibiting the redundant pulse Inh(M), are disposed in the synchronous circuit 60A to solve the problem when the machine cycle is extended by connecting a device.

The synchronous circuit 60A is comprised of the latch circuits 63 and 64, each having a set terminal for inputting the set signal Set and a reset terminal for inputting the reset signal Reset, and the 2 input NAND gate 62. The latch circuit 63 has two NOR gates 63a and 63b for two inputs to input the set signal Set and the reset signal Reset, and these two gates are crossed and connected. The output signal from the latch circuit 63 and the vector Q(T1), which is output from the transition signal control circuit Ti in the first stage of the state ring 50-2, are input to the NAND gate 62. The output signal from the NAND gate 62 is input to each transition signal control circuit M1 to Mn in the machine ring 50-1 as the device request signal DevReq(M1) to DevReq(Mn) respectively.

The latch circuit 64 has a multi-input NOR gate 64a for inputting the response signal AckOut(M2), which is output from the transition signal control circuits M1, . . . , and the reset signal Reset, and a 2 input NOR gate 64 for inputting the vector Q(Tk), which is output from the transition signal control circuit Tk in the last stage of the state ring 50-2, as a set signal Set. From the output terminal of this latch circuit 64, the inhibiting signal Inh(M), for detecting the case when the token does not transit, is output.

(2) Operation

Figure 11:
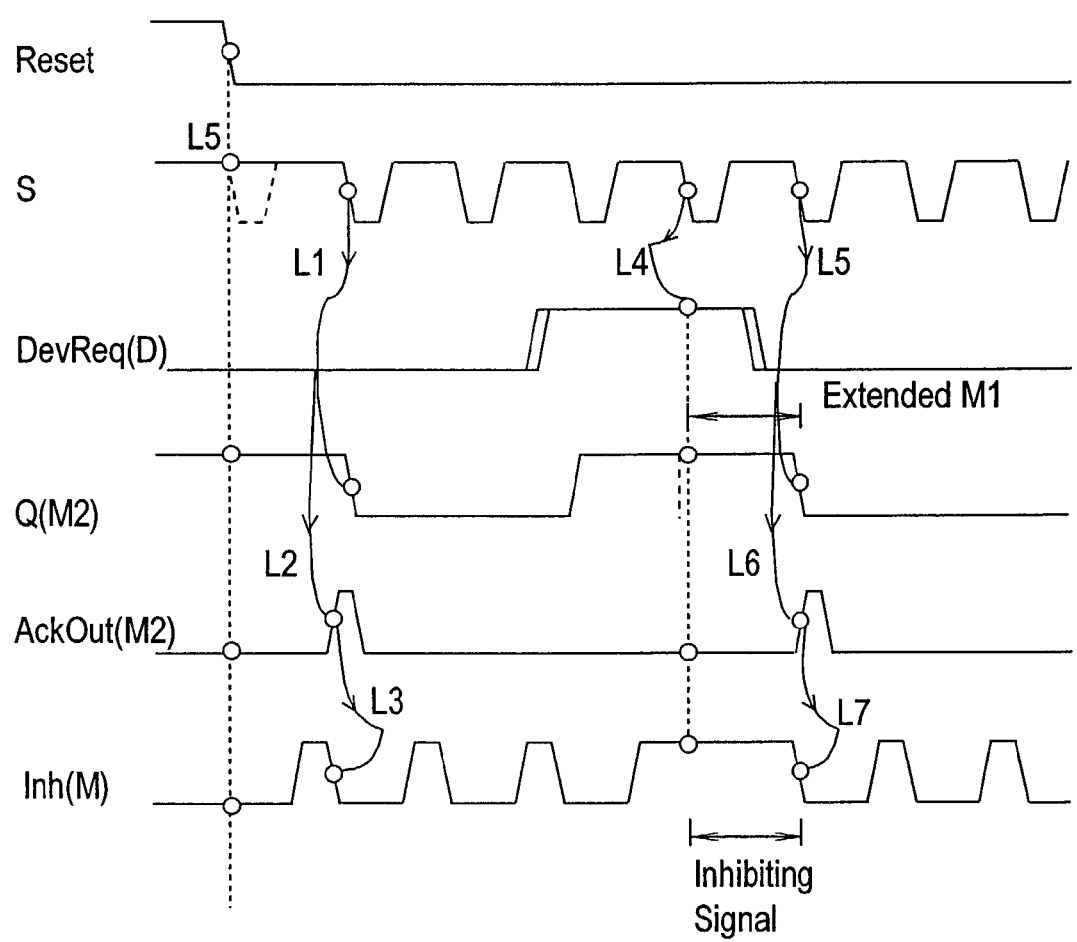
FIG. 11 is a timing chart of the operation in FIG. 10.

FIG. 11 is a timing chart of the operation of the transition signal control unit in FIG. 10 where n=3 and k=4.

The operation of the transition signal control unit in FIG. 10 will now be described with reference to the timing chart in FIG. 11.

Immediately after the reset signal Reset is cleared, the machine cycle starts with the transition signal control circuit M1 in the first stage of the machine ring 50-1. The vector S, which is a synchronous signal to be output from the NAND gate 62, is not output immediately after reset, but is normally output at the beginning of the machine cycle of the transition signal control circuit M2 in the second stage. This is indicated by the link L1 or the link L5 in FIG. 11. Just before the transition of the machine cycle, the response signal AckOut(M2) is output from the transition signal control circuit M1, and the transition of the token is confirmed. This is indicated by the link L2 or the link L6.

When the device requests for use and outputs the device request signal DevReq(D), however, the token does not transit, and the machine cycle (corresponding to M1) is extended for the period when the machine cycle is multiplied by an integer. This is indicated by the link L4. Since the state ring 50-2 continuously transits the token even during the extended period, the vectors Q(T1), . . . , which are output from the transition signal control circuits T1, . . . , do not stop. This operation does not necessarily interfere with the operation of the transition signal control circuits M1 to Mn, because in a same machine cycle, similar processing (e.g. in the later mentioned DMA ring) may be executed repeatedly. However, some logic circuits to be controlled, which are not illustrated, may malfunction if the vectors Q(T1), . . . , are output from the transition signal control circuits T1, . . . repeatedly. So the inhibit signal Inh(M) for inhibiting redundant vectors Q(T1, . . . ), which are output from the transition signal control circuits T1, . . . , are output from the latch circuit 64.

In the case of the synchronous circuit 60A in FIG. 10, initial control using the latch circuits 63 and 64, is used rather than the D-FF 61, which is used for the synchronous circuit 60 in FIG. 1(A). The latch circuit 63 with a set terminal and a reset terminal, which is comprised of NOR gates 63a and 63b, assigns priority to the reset signal Reset over the output signal Q(La). In this case, the vector Q(Tk), which is output from the transition signal control circuit Tk in the last stage, is used for the set signal Set. The latch circuit 64 with a set terminal and a reset terminal, for generating the inhibit signal for inhibiting the redundant pulse Inh(M), is comprised of OR gates 64a and 64b, and in this case as well, the circuit is configured such that priority is assigned to the reset signal Reset at the input side.

The inhibit signal Inh(M), which is output from the latch circuit 64, is set by the vector Q(Tk), which is output from the transition signal control circuit Tk, and is reset by the response signal AckOut(M2), for example, which is output from the transition signal control circuit M1, which is generated by the transition of the token. This is indicated by the link L3 or the link L7. Therefore, if the machine cycle (corresponding to M1) is extended as shown in FIG. 11, the inhibiting signal Inh(M) is output.

(3) Effect

The transition signal control unit in FIG. 10, which has effects similar to the effects (a) and (b) of the transition signal control unit in FIG. 1, operates more reliably than the transition signal control unit in FIG. 1.

(Configuration Similar to Clock Synchronous Circuit)

Figure 12A:
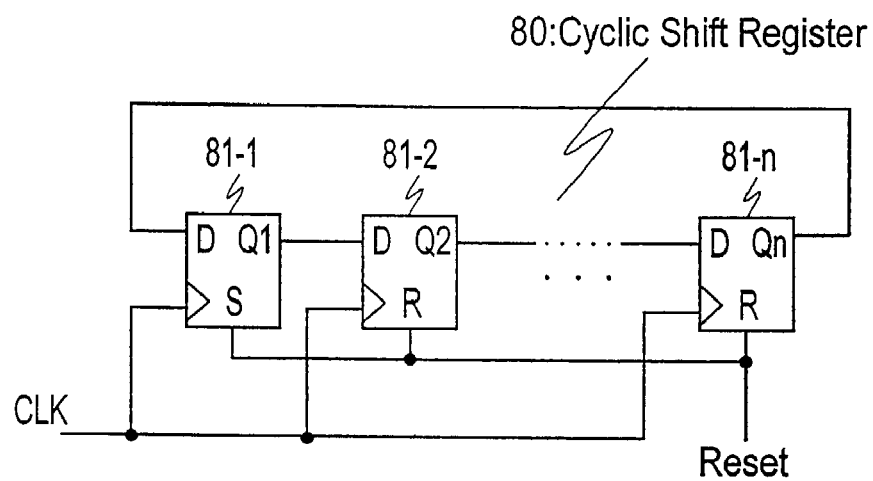
FIGS. 12(A) and (B) are block diagrams of the similarities with a clock synchronous circuit.
Figure 12B:
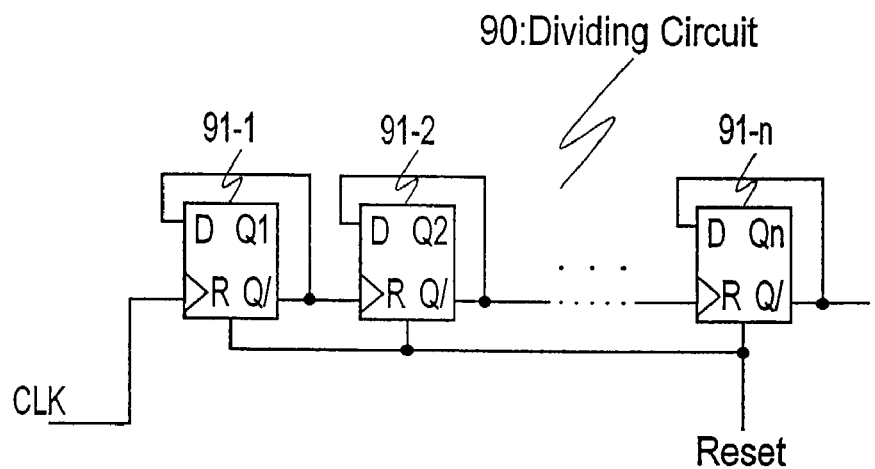

FIGS. 12(A) and (B) are block diagrams of the similarities with a clock synchronous circuit, where FIG. 12 (A) is a block diagram of a cyclic shift register, and FIG. 12(B) is a block diagram of a dividing circuit.

The machine ring 50-1 and the state ring 50-2 used for the transition signal control unit according to the present embodiment are similar to a cyclic shift register or a dividing circuit in a clock synchronous circuit, for example.

The cyclic shift register 80 in FIG. 12(A) has cascade-connected n-stages of D-FF 81-1 to 81-n, for example, where the D-FF 81-1 in the first stage is comprised of a D-FF with a set terminal, and the remaining D-FF 81-2 to 81-n are comprised of D-FFs each with a reset terminal.

In this cyclic shift register 80, data is shifted synchronizing with the clock signal CLK, only the D-FF 81-1 in the first stage is set, and the remaining D-FF 81-2 to 81-n are reset at reset by the reset signal Reset. The machine ring 50-1 and the state ring 50-2 of the present embodiment generally function as an FF for events, and the device request signal DevReq for executing this control corresponds to the clock signal CLK in the clock synchronization circuit.

The dividing circuit 90 in FIG. 12(B) is comprised of cascade-connected n-stages of D-FFs each with a reset terminal 91-1 to 91-n, and executes a dividing operation with the clock signal CLK as the original oscillation. The inter-ring synchronization of the present embodiment is not similar to that of the dividing circuit 90, but is similar in terms of functions.

For example, when the state ring 50-2 in FIG. 1 is the original oscillation, the machine ring 50-1 corresponds to the waveforms after dividing by the dividing circuit 90. The dividing circuit 90 for clock synchronization divides the clock signal CLK into $1/2^n$. In the case of the inter-ring synchronization in FIG. 1, however, the vector Q(T1) is divided into 1/n, as the timing chart in FIG. 8 shows. For example, when continuous synchronization among three ring control circuits is executed using the machine ring 50-1 and the state ring 50-2 shown in FIG. 1, this dividing ratio is in proportion to the product of the respective dividing ratio.

Because of this similarity, it is possible to use the cyclic shift register 80 or the dividing circuit 90 for synchronization with the ring control circuit, as described later.

(Synchronization by Clock of Ring)

Figure 13:
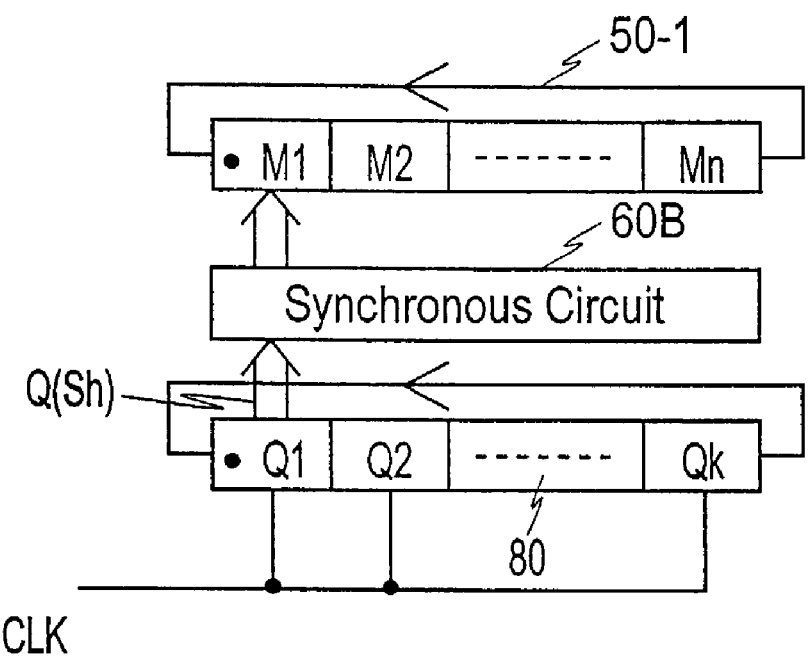
FIG. 13 is a block diagram of a transition signal control unit where a clock synchronous circuit coexists according to an embodiment of the present invention.

FIG. 13 is a block diagram of a transition signal control unit where a clock synchronous circuit coexists, showing use of the cyclic shift register for synchronization with a ring.

In this transition signal control unit, the synchronous circuit 60B is connected between the machine ring 50-1 in FIG. 1 and the cyclic shift register 80 in FIG. 12(A). The synchronous circuit 60-B (this itself need not have clock synchronization), which received the output vector Q(Sh)= (Q1(Sh), Q2(Sh), ..., Qk(Sh)) of the cyclic shift register 80 where the clock signal CLK is input, sends the vector, which is a synchronous signal, to the machine ring 50-1 for dividing in order to generate timing.

No device is connected to the cyclic shift register 80, so the time of this output vector Q(Sh) is determined by the clock signal CLK. Therefore, a problem may occur when the cyclic shift register 80 is synchronized with the machine ring 50-1. Because, as described in FIG. 1, a token transits at high-speed in the machine ring 50-1, and the device request signal DevReq to be used for synchronization must have a similar pulse width. It is also possible that the pulse width fluctuates due to temperature fluctuation, and synchronization deviates.

Now the advantages (a) to (c) when a clock synchronous circuit, such as the cyclic shift register 80, is built in to an asynchronous circuit, such as the machine ring 50-1, will be described.

(a) In the case of such an asynchronous circuit as the machine ring 50-1, this speed depends on the delay time unique to the circuit element. Therefore the speed changes by the change in the temperature. For a circuit where such a change is not desired, it is advantageous if a clock synchronous circuit is used only for that part.

(b) In the case of such an asynchronous circuit as the ring 50-1, a pre-condition is that the speed of the logic circuit is faster than that of the control signal. It is advantageous to use such a clock synchronous circuit as the cyclic shift register 80 for the part where such a precondition cannot always be guaranteed.

(c) A clock signal with a fixed frequency is critical for time measurement using a timer.

Therefore, the entire transition signal control unit can be optimized if such a clock synchronous circuit as the cyclic shift register 80 is partially used for a general asynchronous system, or if an asynchronous circuit is partially used for a general synchronous system.

In other words, the transition signal control unit is comprised of a combination of the ring control circuit, cyclic shift register and synchronous circuit, so practical transition signal control with the advantages of a clock synchronous circuit is possible. Also if a processor, where a high-speed transition signal and low speed clock signal are combined, is created, an energy saving type processor can be implemented.

(Synchronization by Clock of Ring)

(1) Configuration

Figure 14:
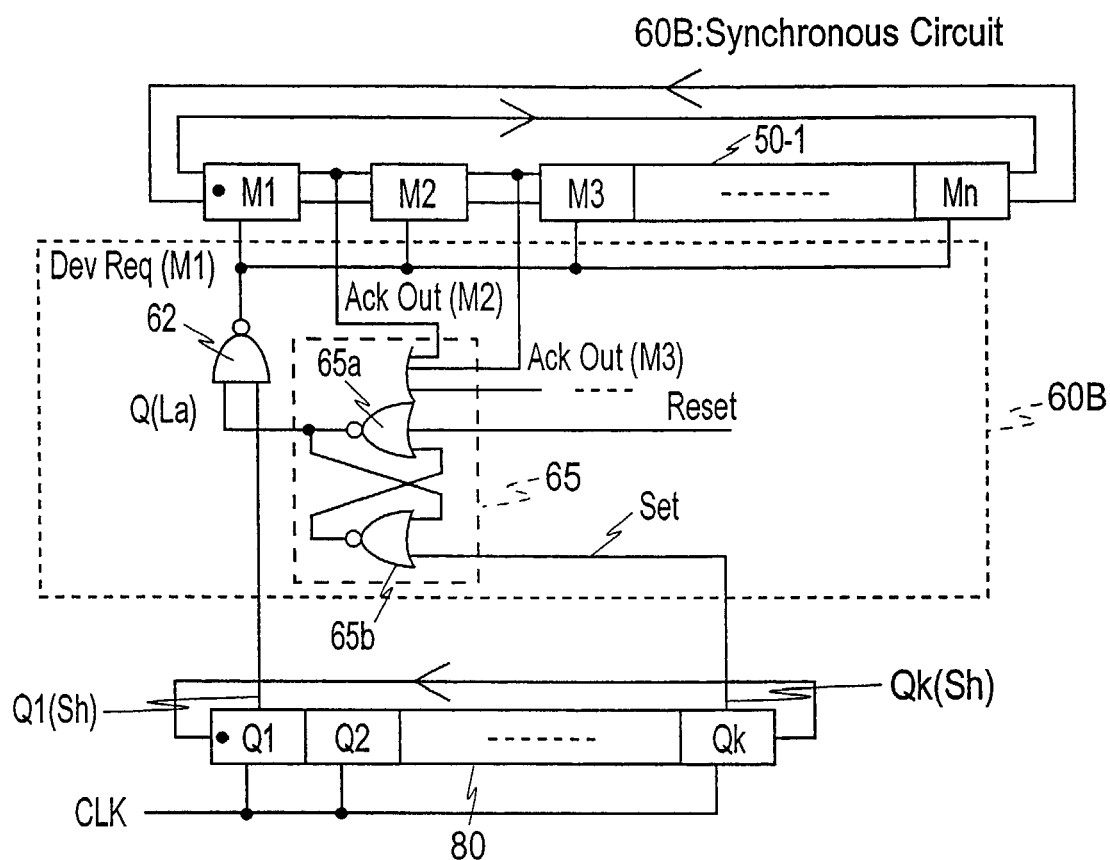
FIG. 14 is a block diagram of a transition signal control unit for synchronizing with a machine ring by slow clock signals according to an embodiment of the present invention.

FIG. 14 is a block diagram of a transition signal control unit for synchronizing with a machine ring by a slow clock signal, which shows synchronization by the clock signal of the ring.

In this transition signal control unit, the synchronous circuit 60B is connected between the machine ring 50-1 in FIG. 1 and the cyclic shift register 80 in FIG. 13.

The synchronous circuit 60B is comprised of a latch circuit 65 with a set terminal and a reset terminal, and a 2 input NAND gate 62, which are connected to the output side of the latch circuit 65. The latch circuit 65 has a multi-input NOR gate 65a to input the reset signal Reset and the response signals AckOut(M2), AckOut(M3), ..., which are output from the transition signal control circuits M1, M2 ... in the machine ring 50-1, and a 2 input NOR gate 65b to input the vector Qk(Sh), which is output from the last stage of the cyclic shift register 80, as the set signal Set, and these two NOR gates 65a and 65b are crossed and connected. The output signal Q(La) of the latch circuit 65 and the vector Q1(Sh), which is output from the first stage of the cyclic shift register 80, are input to the 2 input NAND gate 62, and the device response signal DevReq(M1), which is the second control signal to be output from the NAND gate 62, is input to the transition signal control circuits M1 to Mn of each stage in the machine ring 50-1.

Normally a token passes through the machine ring 50-1 at high-speed, but in the cyclic shift register 80, which operates by synchronizing with the clock signal CLK, the token merely transits by clock synchronization. If the output vector Q(Sh) of the cyclic shift register 80 is simply used as the synchronous signal, then the token in the machine ring 50-1 may move uncontrollably, since the pulse width of the output vector Q(Sh) is long.

When the state ring 50-2 is used rather than the cyclic shift register 80, as shown in FIG. 1, the above problem does not occur since the state ring 50-2 operates at a speed which is the same as the machine ring 50-1. However, a deviation of synchronization must always be monitored since the inter-ring synchronization in FIG. 1 does not depend on a causal relationship. Whereas the synchronous circuit 60B in FIG. 14 is characterized in that some causal relationship is provided using the response signal AckOut of the transition signal control circuits M1 to Mn in the machine ring 50-1.

In the transition signal control unit in FIG. 14, the synchronous circuit 60B, which received the output vectors Q1(Sh) and Qk(Sh) of the cyclic shift register 80, outputs the device request signals DevReq(M1) to DevReq(Mn), which are synchronous vectors, to the machine ring 50-1, and the machine ring 50-1 returns the response signal AckOut to the synchronous circuit 60B so as to implement reliable synchronization. The device response signal DevReq to be input to the machine ring 50-1 matches with the pulse width of the state ring 50-2 in the inter-ring synchronization in FIG. 1, but the pulse width of the output vectors Q1(Sh) and Qk(Sh) of the cyclic shift register 80 in FIG. 14 are sufficiently long, so the token in the machine ring 50-1 cannot be stopped when the token transits out of control. However, the response signal AckOut quickly limits the pulse width of the device request signal DevReq, so this pulse width is almost the same as the pulse width in inter-ring synchronization.

At the center of the synchronous circuit 60B, the latch circuit 65 with a set terminal and a reset terminal is disposed, and is further comprised of the NOR gates 65a and 65b. Clearly the output signal Q(La) of the latch circuit 65 has a configuration which assigns priority to the reset signal Reset over the set signal Set, and the output signal Q(La) falls by the response signals AckOut(M2), . . . which are the input signals of the latch circuit 65, and the pulse width of the device request signal DevReq is limited by the NAND gate 62.

(2) Operation

Figure 15:
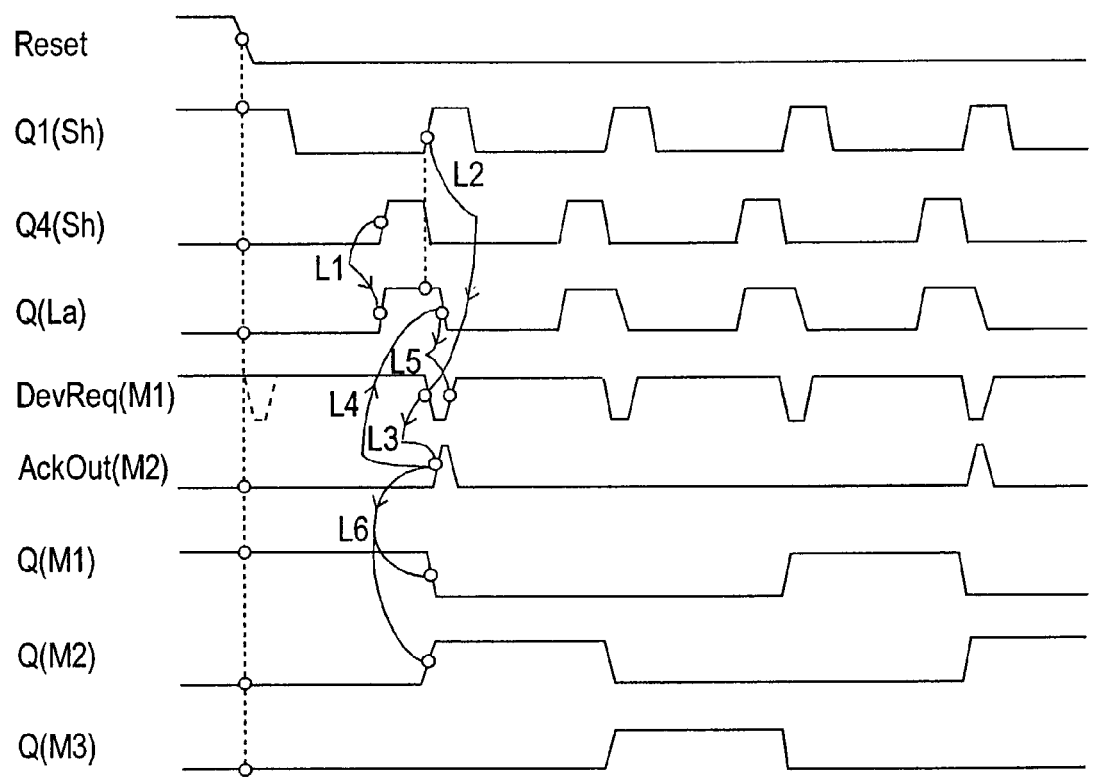
FIG. 15 is a timing chart of the operation in FIG. 14.

FIG. 15 is a timing chart depicting the operation in FIG. 14, where n=3 and k=4. The clock signal CLK is omitted.

Immediately after the reset signal Reset is cleared, the token in the machine ring 50-1 exists in the transition signal control circuit M1 in the first stage, and the reset signal Reset is input to the NOR gate 65a, so the output signal Q(La) of the NOR gate 65a is maintained at "L". As a result, the device request signal DevReq(M1) to be output from the NAND gate 62 is maintained at "H", and the token remains in the transition signal control circuit M1 in the first stage. However, when the token in the cyclic shift register 80 reaches the k-th FF in the last stage, and the output vector Qk(Sh) becomes "H", the latch circuit 65 is set, and as a result, the NAND gate 62 opens. This relationship is indicated by the link L1.

When the token in the cyclic shift register 80 comes to the FF in the first stage at the beginning of the next machine cycle (corresponding to M2), the output vector Q1(Sh) becomes "H". As a result, the device response signal DevReq(M1) to be output from the NAND gate 62 becomes "L". This relationship is indicated by the dashed line and the link L2 in FIG. 15.

Then the token in the transition signal control circuit M1 in the first stage transits to the transition signal control circuit M2 in the second stage, and at this time, the response signal AckOut(M2) becomes "H". This relationship is indicated by the link L3 and the link L6. Then the output signal Q(La) of the latch circuit 65 is reset, and the pulse width of the device request signal DevReq(M1) to be output from the NAND gate 62 is limited. This relationship is indicated by the link L4 and the link L5.

Since the pulse width of the device request signal DevReq (M1) is limited in this way, the transition of the token in the machine ring 50-1, from the transition signal control circuit M2 in the second stage to the transition signal control circuit M3 in the third stage, is blocked, and the token remains in the transition signal control circuit M2 in the second stage.

(3) Effect

Even if the clock signal CLK is slow, synchronization with the machine ring 50-1 can be accurately implemented by the synchronous circuit 60B.

(Synchronization by Clock Signal of Ring)

Figure 16:
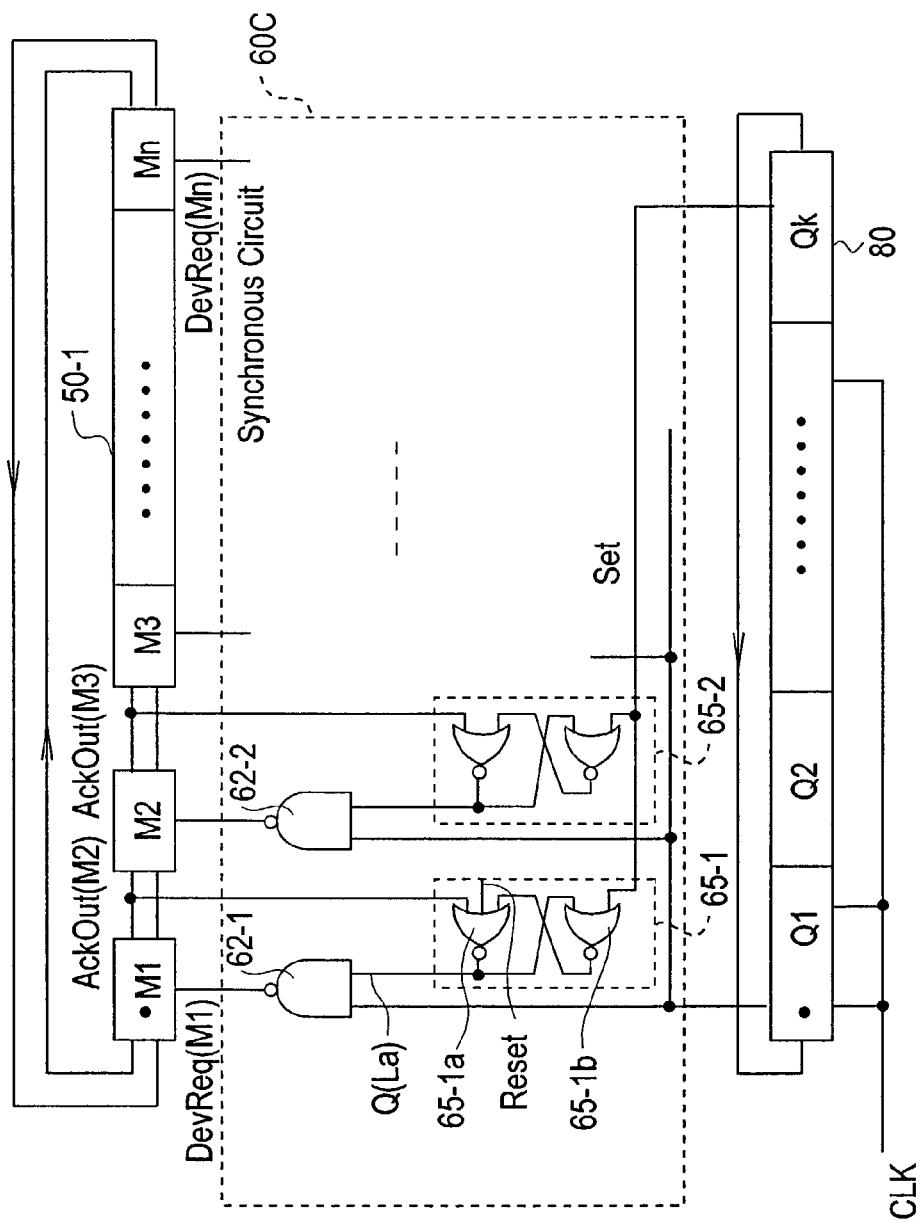
FIG. 16 is a block diagram of a transition signal control unit having a synchronous circuit, which is faster than the one in FIG. 14.

FIG. 16 is a block diagram of a transition signal control unit having a synchronous circuit, which is faster than that in FIG. 14.

The synchronous circuit 60C of this transition signal control unit has latch circuits 65-1 to 65-n each with a set terminal and a reset terminal corresponding to the transition signal control circuits M1 to Mn in each stage of the machine ring 50-1 and inputs the response signal AckOut (N2) which is output from each transition signal control circuits M1 to Mn to each latch circuit 65-1, . . . , so as to provide a causal relationship with the response signal AckOut, which is the difference from the synchronous circuit 60B in FIG. 14.

At the output side of each latch circuit 65-1, , the 2 input NAND gates 62-1, . . . , are connected, so that the device response signal DevReq(M1), . . . , which is the second control signal to be output from the NAND gates 62-1, . . . , is input to the transition signal control circuits M1 to Mn in each stage.

The configuration shown in FIG. 16 is used due to considering that the switch speed may suddenly drop since many response signals AckOut are input to the NOR gate 65a in the synchronous circuit 60B in FIG. 14, and as a result, the token may transit out of control.

Each latch circuit 65-1, is comprised of two NOR gates 65-1a, 65-1b, respectively, and the reset signal Reset is input only to the latch circuit 65-1 with a set terminal and a reset terminal in the first stage. For the other latch circuits 65-2, each with a set terminal and a reset terminal, the set signal Set is input at the k-th FF in the last stage of the cyclic shift register 80, so input of the reset signal is unnecessary.

In the transition signal control unit in FIG. 16, the out of control transition of the token can be prevented by increasing the speed of the synchronous circuit 60C.

(Inter-Ring Coupling Without Forced Synchronization)

Figure 17B:
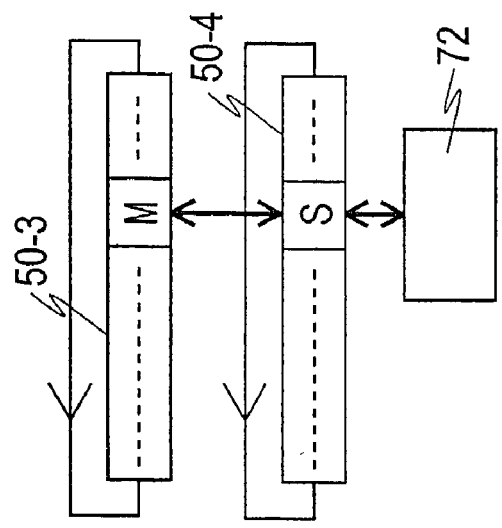
Figure 17A:
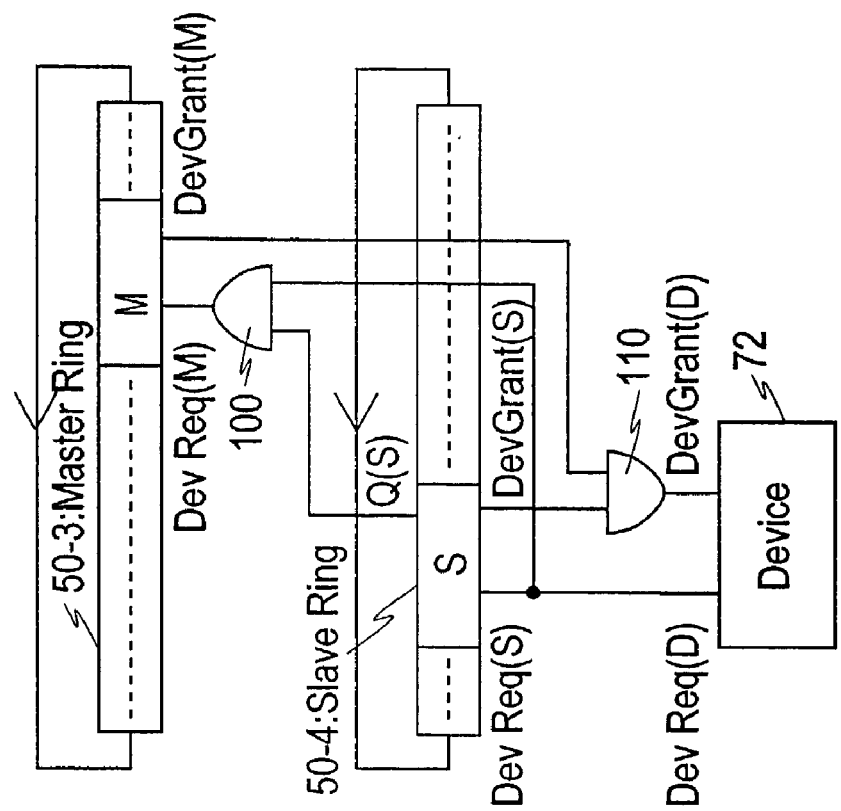
FIGS. 17(A) and (B) are block diagrams of a transition signal control unit depicting master-slave coupling of the ring according to an embodiment of the present invention.

FIGS. 17(A) and (B) are block diagrams of a transition signal control unit depicting master-slave coupling, which is inter-ring coupling without forced synchronization, where FIG. 17(A) is a circuit diagram, and FIG. 17(B) shows a simplified diagram.

In this transition signal control unit, a master ring 50-3, which is the first ring control circuit, and a slave ring 50-4, which is the second ring control circuit, are coupled by the first gate circuit (e.g. 2 input AND gate) 100 and the second gate circuit (e.g. 2 input AND gate) 110, and the device 72 is connected to this slave ring 50-4.

In other words, the master ring 50-3 is comprised of a plurality of stages of transition signal control circuits M. The slave ring 50-4 is comprised of a plurality of stages of transition signal control circuits S. The vector Qa(S), which is output from one of the transition signal control circuits S in the slave ring 50-4, and the device request signal DevReq (D), which is supplied from the device 72 to one of the transition signal control circuits S in the slave ring 50-4, are input to the AND gate 100, and the device request signal DevReq(M), which is output from the AND gate 100, is input to one of the transition signal control circuits M in the master ring 50-3. The device response signal DevGrant(M), which is output from this transition signal control circuit M, and the device response signal DevGrant(S), which is output from one of the transition signal control circuits S in the slave ring 50-4, are input to the AND gate 110, and the device response signal DevGrant(D), which is output from the AND gate 110, is supplied to the device 72.

Now the operation of the transition signal control unit in FIG. 17 will be described.

When the device 72 outputs the device request signal DevReq(D) to request use, this device request signal DevReq(D) is input to the device request signal DevReq(S) terminal of one of the transition signal control circuits S in the slave ring 50-4. Then even if the token comes to this transition signal control circuit S and the vector Q(S) and the device response signal DevGrant(S) to grant use are output from this transition signal control circuit S, the device response signal DevGrant(S) is blocked by the AND gate 110, and the device 72 cannot receive the device response signal DevGrant(D). This is because the device response signal DevGrant(M) has not been output in the transition signal control circuit M in the master ring 50-3 yet.

Because the device response signal DevGrant(M), to be output from the transition signal control circuit M, is output as a grant signal if the token reaches the transition signal control circuit M when both the device request signal DevReq(D) of the device 72 and the vector Q(S), which is output from the transition signal control circuits S for which the token came, rise, the output signal of the AND gate 100 is applied to the device request signal DevReq(M) terminal of the transition signal control circuit M to request use of the device 72.

Such an inter-ring coupling has the relationship where the master ring 50-3 is the master and the slave ring 50-4 is the slave thereof if viewed from the device 72. In other words, the master-slave coupling of the rings is created using the first and second ring control circuits and the first and second gate circuits, so a subordinate relationship between rings can be created. This transition signal control unit can be applied to various circuits and devices, such as an arbitrator with priority processing.

(Inter-Ring Coupling Without Forced Synchronization)

FIGS. 18(A) and (B) are block diagrams of a transition signal control unit depicting the subordinates of a plurality of transition signal control circuits on the slave ring, where FIG. 18(A) is a circuit diagram, and FIG. 18 (B) shows a simplified diagram.

This transition signal control unit has a master-slave coupling where one transition signal control circuit M in the master ring 50-3, which is the first ring control circuit, is the master, and two transition signal control circuits S1 and S2 in the slave ring 50-4, which is the second ring control circuit, are the slaves thereof. The slave ring 50-4 is connected to the master ring 50-3 via the first gate (e.g. 2 input OR gate 101 and 2 input AND gates 102 and 103), and the devices 72-1 and 72-2 are connected to this slave ring 50-4 via the second gate circuit (e.g. 2 input AND gates 111 and 112).

In other words, the device request signal DevReq(D1), which is output from the device 72-1, is input to the device request signal DevReq(S1) terminal of the transition signal control circuit S1 in the slave ring 50-4. And the device request signal DevReq(D1) and the vector Q(S1), which is output from the transition signal control circuit S1, are input to the 2 input AND gate 102. The device request signal DevReq(D2), which is output from the device 72-2, is input to the device request signal DevReq(S2) terminal of the transition signal control circuit S2 in the slave ring 50-4. Also the device request signal DevReq(D2) and the vector Q(S2), which is output from the transition signal control circuit S2, are input to the 2 input AND gate 103. The output signals of the AND gates 102 and 103 are input to the 2 input OR gate 101, and this output signal is input to the device request signal DevReq(M) terminal of the transition signal control circuit M in the master ring 50-3.

The device response signal DevGrant(M), which is output from the transition signal control circuit M, and the device response signal DevGrant(S1), which is output from the transition signal control circuit S1, are input to the 2 input AND gate 111, and the device response signal DevGrant(D1), which is output from this AND gate 111, is input to the device 72-1. The device response signal DevGrant(M), which is output from the transition signal control circuit M, and the device response signal DevGrant(S2), which is output from the transition signal control circuit S2, are input to the 2 input AND gate 112, and the device response signal DevGrant(D2), which is output from the AND gate 112, is input to the device 72-2.

Now the operation of the transition signal control unit in FIG. 18 will be described.

The device request signal DevReq(D1), which is output from the device 72-1, is input to the device request signal DevReq(S1) terminal of the transition signal control circuit S1, and is also input to the AND gate 102, and is input to the device request signal DevReq(M) terminal of the transition signal control circuit M via the OR gate 101. Therefore the device request signal DevReq(D1) of the device 72-1 is not received until the token in the slave ring 50-4 reaches the transition signal control circuit S1, and the output vector Q(S1) thereof becomes "H". Also the device response signal DevGrant(M) is output from the transition signal control circuit M only when the token in the master ring 50-3 reaches the transition signal control circuit M. As a result, use of the device 72-1 is granted in the AND gate 111 when the OR with the device response signal DevGrant(S1), which is output from the transition signal control circuit S1, becomes "H".

This relationship is the same as the AND gate 103, where the device request signal DevReq(S2) of the device 722 and the output vector Q(S2) of the transition signal control circuit S2 are input, and is also the same as the AND gate 112, where the device response signal DevGrant(M) of the transition signal control circuit M and the device response signal DevGrant(S2) of the transition signal control circuit S2 are input.

Since there is only one token in the slave ring 50-4, the vectors Q(S1) and Q(S2), which are output from the transition signal control circuits S1 and S2, will never become "H" simultaneously, therefore the devices 72-1 and 72-2 will never be in contention.

In FIG. 18, the master-slave coupling, when the transition signal control circuit M in the master ring 50-3 is the master, and the two transition signal control circuits S1 and S2 in the slave ring 50-4 are slaves thereof, was described, but the master-slave coupling, when the transition signal control circuit S1 and the transition signal control circuit S2 in a different plurality of slave rings are slaves, is also based on the same concept as the case in FIG. 18. In this case, however, it is possible that both request signals may be received, and the resource, such as a common bus, may be occupied simultaneously.

(Application Example of Master-Slave Coupling of Rings)

Figure 19:
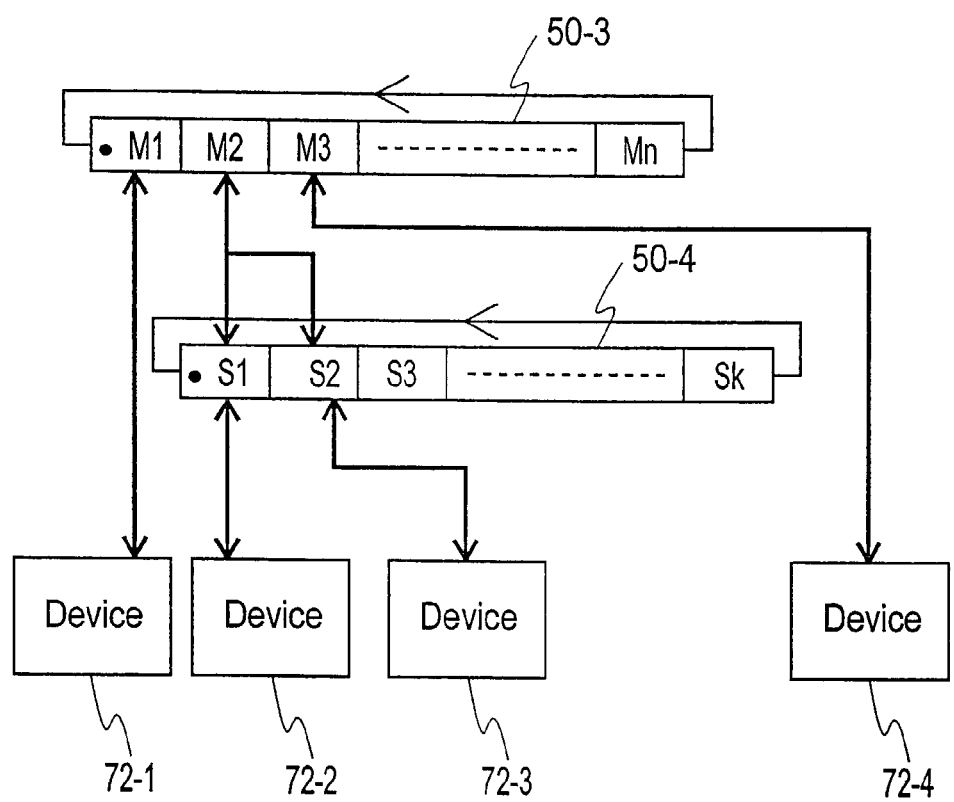
FIG. 19 is a block diagram of an arbitrator with priority processing where

FIG. 19 is a block diagram of an arbitrator with priority processing, where the master-slave coupling of rings in FIG. 17 and FIG. 18 is applied.

The arbitrator with priority processing is used to grant use to one of the devices 72-1 to 72-4 when the devices 72-1 to 72-4 request use (e.g. use of a common bus used by these devices).

In this arbitrator with priority processing, the device 72-1 is connected to the transition signal control circuit M1 at the first stage in the master ring 50-3, the device 72-2 is connected to the transition signal control circuit S1 in the first stage of the slave ring 50-4, the device 723 is connected to the transition signal control circuit S2 at the second stage, and the device 72-4 is connected to the transition signal control circuit M3 in the third stage. The transition signal control circuit M2 in the second stage is coupled as a master-slave with the transition signal control circuit S1 in the first stage and the transition signal control circuit S2 in the second stage.

Since the token is in the transition signal control circuits M1 and S1 in the first stage at reset, the priority level is higher as the device becomes closer to the token. In the case of master-slave coupling, when the token does not come to the transition signal control circuit in the master ring 50-3, the device loses the opportunity to receive the grant of use even if the token comes to the transition signal control circuit in the slave ring 50-4, and must wait until the token makes one pass through the master ring 50-3, so the master ring 50-3 has priority. Therefore, the priority is higher in the sequence of devices 72-1, 72-2, 72-3 and 72-4, until the priority level in the ring becomes almost equal after the token cycles around the ring many times.

(Diverging and Converging of Tokens in Inter-Ring Coupling)

Figure 20:
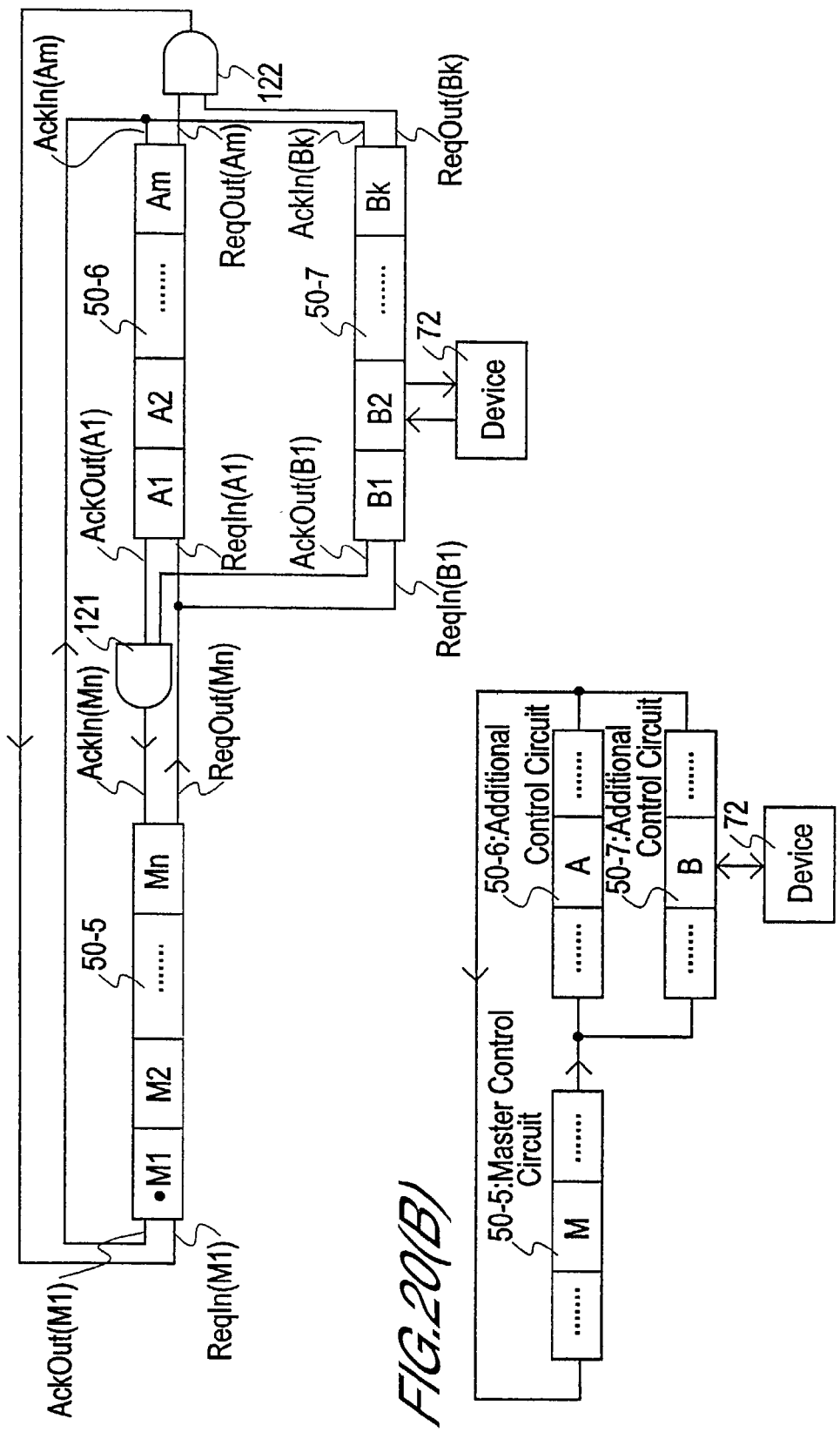
FIGS. 20(A) and (B) are block diagrams of a transition signal control unit depicting the diverging and converging of tokens according to an embodiment of the present invention.

FIGS. 20(A) and (B) are block diagrams of a transition signal control circuit depicting the diverging and converging of tokens in inter-ring coupling, where FIG. 20 (A) is a circuit diagram, and FIG. 20(B) shows a simplified diagram.

In the transition signal control unit, an additional control circuit 50-7, which is the third control circuit array, is added to the initial ring comprised of only the master control circuit 50-5, which is the first control circuit array, and the additional control circuit 50-6, which is the second control circuit array.

This transition signal control unit is comprised of a master control circuit 50-5, which is further comprised of n stages of cascade-connected transition signal control circuits M1 to Mn, an additional control circuit 50-6, which is further comprised of m stages of cascade-connected transition signal control circuits A1 to Am, an additional control circuit 50-7, which is further comprised of k stages of cascade-connected transition signal control circuits B1 to Bk, a first gate circuit (e.g. 2 input AND gate) 121, and a second gate circuit (e.g. 2 input AND gate) 122.

The request signal ReqOut(Mn), which is output from the transition signal control circuit Mn at the last stage in the master control circuit 50-5, is input to the request signal ReqIn(A1) terminal of the transition signal control circuit A1 in the first stage of the additional control circuit 50-6, and the request signal ReqIn(B1) terminal of the transition signal control circuit B1 in the first stage of the additional control circuit 50-7 respectively. The response signal AckOut(A1), which is output from the transition signal control circuit A1 in the first stage of the additional control circuit 50-6, and the response signal AckOut(B1), which is output from the transition signal control circuit B1 in the first stage of the additional control circuit 50-7, are input to the AND gate 121, and the output signal of the AND gate 121 is input to the response signal AckIn(Mn) terminal of the transition signal control circuit Mn in the last stage of the master control circuit 50-5.

The response signal AckOut(M1), which is output from the transition signal control circuit M1 in the first stage of the master control circuit 50-5, is input to the response signal AckIn(Am) terminal of the transition signal control circuit Am in the last stage of the additional control circuit 50-6, and the response signal AckIn(Bk) terminal of the transition signal control circuit Bk in the last stage of the additional control circuit 50-7. The request signal ReqOut(Am), which is output from the transition signal control circuit Am in the last stage of the additional control circuit 50-6, and the response signal ReqOut(Bk), which is output from the transition signal control circuit Bk in the last stage of the additional control circuit 50-7, are input to the AND gate 122, and the output signal of this AND gate 122 is input to the response signal ReqIn(M1) terminal of the transition signal control circuit M1 in the first stage of the master control circuit 50-5.

Now the operation of the transition signal control unit in FIG. 20 will be described.

When the token reaches the transition signal control circuit Mn in the last stage from the transition signal control circuit M1 in the first stage of the master control circuit 50-5, the request signal ReqOut(Mn), which is output from the transition signal control circuit Mn, is input to both the additional control circuits 50-6 and 50-7, so the token diverges to the additional control circuits 50-6 and 50-7 respectively. The response signal AckOut(A1), which is output from the transition signal control circuit A1 in the first stage, and the response signal AckOut(B1), which is output from the transition signal control circuit B1 in the first stage, are input, via the AND gate 121, to the response signal AckIn(Mn) terminal of the transition signal control circuit Mn in the last stage of the master control circuit 50-5. Therefore, after confirming the responses of both the additional control circuits 50-6 and 50-7, the request signal ReqOut(Mn) becomes invalid.

The diverged tokens advance to the additional control circuits 50-6 and 50-7 independently, and when the tokens reach the transition signal control circuits Am and Bk in the last stage, the request signal ReqIn(M1) by the AND gate 122 is not input to the transition signal control circuit M1 while the other token does not reach. Therefore the response signal AckOut(M1), which is the response to the request signal, is not output either, so the token, which reached first waits. As a consequence, tokens are roughly synchronized at diverging and converging.

In such a rough synchronization, when the device 72 is connected to the transition signal control circuit B2 in the second stage of the additional control circuit 50-7, for example, the token which transits in the additional control circuit 50-6 waits at the transition signal control circuit Am in the last stage for as long as necessary, until the device 72 releases control.

As described above, in the transition signal control unit in FIG. 20, the transition signal control unit having additional control by extending the ring is comprised of the first, second and third control circuit arrays 50-5 to 50-7, and the first and second gate circuits 121 and 122, so accurately rough synchronization can be implemented with the additional second and third control circuit arrays 50-6 and 50-7 for diverging and converging tokens. Some disadvantages remain if the control speed is different between the additional control circuits 50-6 and 50-7.

(Branching of Token)

(1) Configuration

Figure 21:
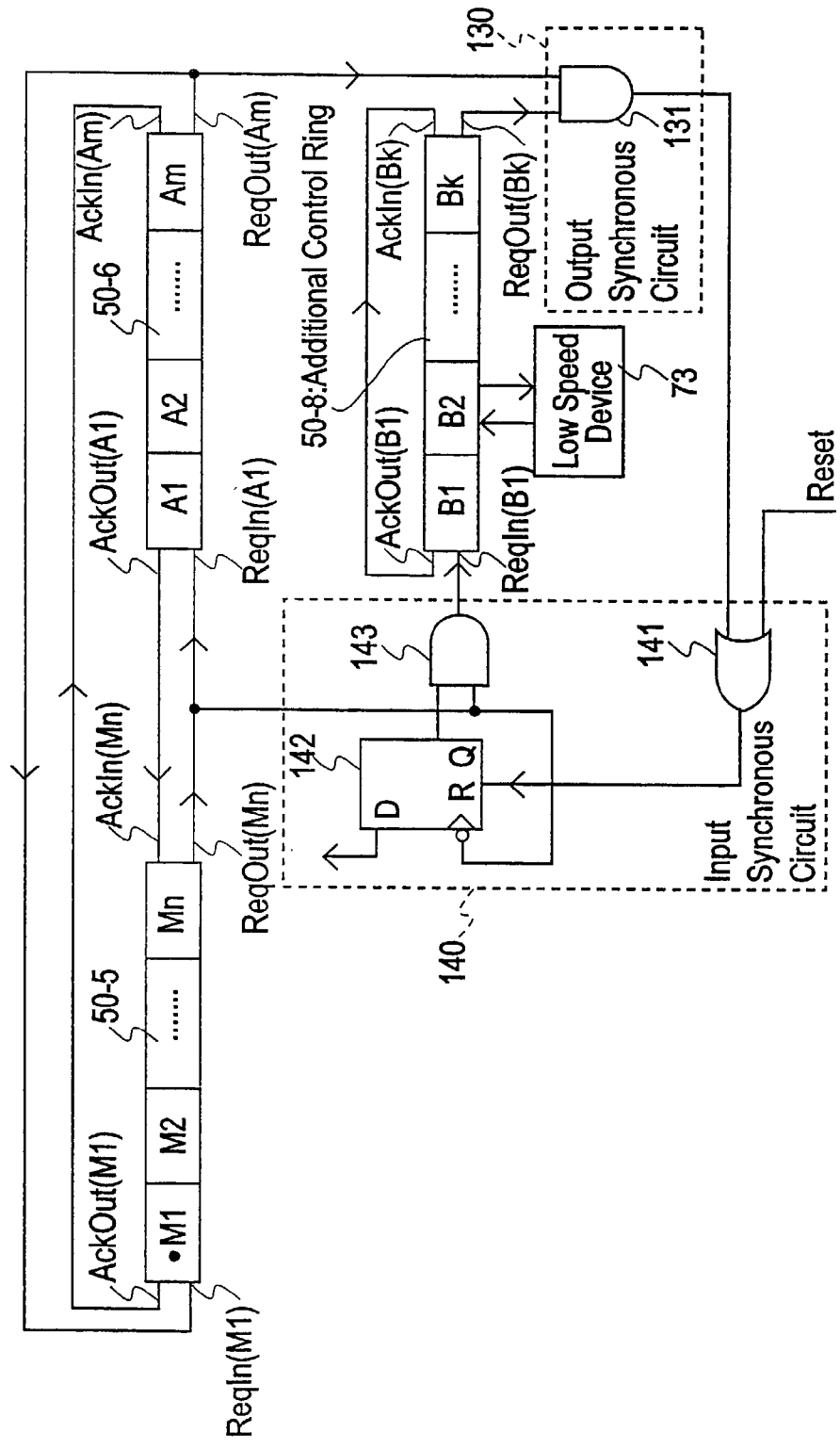
FIG. 21 is block diagram of a transition signal control unit depicting the branching of a token according to an embodiment of the present invention.

FIG. 21 is a block diagram of a transition signal control unit depicting the branching of a token to eliminate the disadvantages due to the diverging and converging of tokens in FIG. 20. Here, "branching" refers to completely separating a token from the master control ring 50-5 once.

In this transition signal control unit, the master ring is comprised of a master control circuit 50-5, which is a first control circuit array, and an additional control circuit 50-6, which is a second control circuit array, and an additional control ring 50-8, which is a new ring control circuit, is added to the master ring, wherein a low speed device 73 is connected to the transition signal control circuit B2 in the second stage, for example, of the additional control ring 50-8. In order to synchronize with the master ring, which is comprised of the master control circuit 50-5 and the additional control circuit 50-6, in a semi-forced way, an output synchronous circuit 130 is connected to the output side of the additional control circuit 50-6 and the additional control ring 50-8, and an input synchronous circuit 140 is connected to the input side of this additional control ring 50-8. The output synchronous circuit 130 is comprised of a 2 input AND gate 131, for example. The input synchronous circuit 140 is comprised of a 2 input NOR gate 141, a D-FF 142 with a reset terminal, and a 2 input AND gate 143, for example.

In the transition signal control unit in FIG. 21, when a token reaches the transition signal control circuit Mn in the last stage of the master control circuit 50-5, the request signal ReqOut(Mn) is output from this transition signal control circuit Mn. The request signal ReqOut(Mn) is input to the request signal ReqIn(A1) terminal of the transition signal control circuit A1 in the first stage of the additional control circuit 50-6, and is also input to the input terminal of the AND gate 143 and the clock terminal of the D-FF 142 in the input synchronous circuit 140. The D-FF 142 is disposed for setting the initial status.

If the request signal ReqOut(Mn), which is output from the transition signal control circuit Mn, is directly input to the request signal ReqIn(B1) terminal of the transition signal control circuit B1 in the first stage of the additional control ring 50-8, the branched token is sent to the transition signal control circuit B1 each time the token circles the master ring and the token reaches the transition signal control circuit Mn in the last stage, where a plurality of tokens circle the master ring and additional control ring at the same time, which causes a malfunction.

To prevent this, the input synchronous circuit 140 is disposed so that the AND gate 143 is opened only when the token first reaches the transition signal control circuit Mn in the last stage of the master control circuit 50-5, then the AND gate 143 is closed until the branched token circling around the additional control ring 50-8, and reaches the transition signal control circuit Bk in the last stage.

The output synchronous circuit 130 is disposed for initializing the input synchronous circuit 140 after the token, transiting through the additional control circuit 506, reaching the transition signal control circuit Am in the last stage. This output synchronous circuit 130 is disposed for the accurate synchronization of the circuit, so this output synchronous circuit 130 may be omitted so that the request signal ReqOut(Bk), which is output from the transition signal control circuit Bk, is directly input to the OR gate 141.

If the configuration shown in FIG. 21 is used, processing in the master ring can proceed independently even when a low speed device 73 is connected to the transition signal control circuit B2 in the second stage of the additional control ring 50-8, for example, and the speed of the low speed device 73 is much slower than the speed of the token in the master ring. And when the low speed device 73 completes processing and the branched token reaches the transition signal control circuit Bk in the last stage of the additional control ring 50-8, the low speed device 73 is initialized and prepares for use again. Since the response signal AckOut(B1), which is output from the transition signal control circuit B1 in the first stage of the additional control ring 50-8, is directly input to the response signal AckIn(Bk) terminal of the transition signal control circuit Bk in the last stage, the token, which reaches this transition signal control circuit Bk in the last stage, transits and disappears when a new response signal ReqIn(B1) is input.

Therefore, disposing the additional control ring 50-8 is suitable for a fixed form of processing, which is subordinate to the control in the transition signal control circuit Mn, for example. Concretely, if this control is a control for an I/O device, such processing as data transfer, display and setting in this I/O device can be benefited by using the additional control ring 50-8.

(2) Operation

Figure 22:
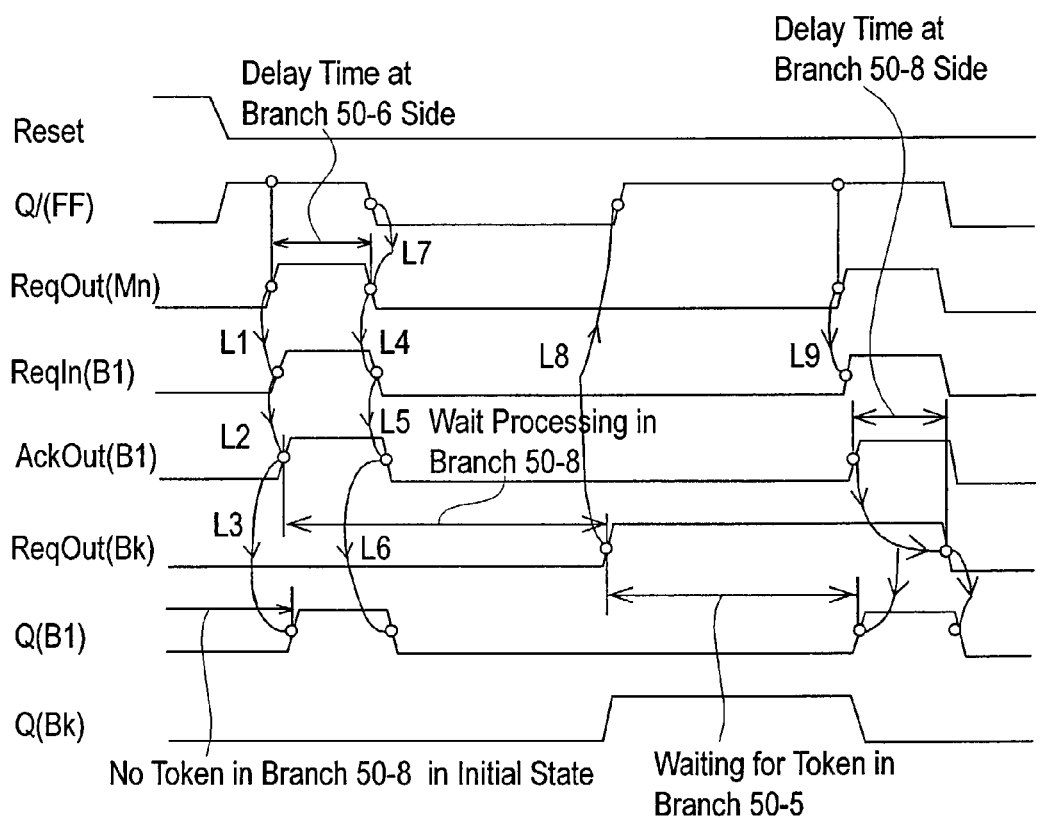
FIG. 22 is a timing chart of an operation at token splitting in FIG. 21.

FIG. 22 is a timing chart of an operation at token branching in FIG. 21.

After the reset signal Reset to be supplied to the OR gate 141 is cleared (Reset="L"), the negative output signal Q/(FF) from the D-FF 142 maintains "H", so the OR gate 141 is in a state to receive the request signal ReqOut(Mn). This rises the request signal ReqIn(B1) to "H" by the link L1. And this response signal is output as the response signal AckOut(B1) by the link L2. As a result, the vector Q(B1), which is output from the transition signal control circuit B1, becomes "H" by the link L3, and the token transits to the transition signal control circuit B1.

On the other hand, only the request signal ReqOut(Mn) is input to the request signal ReqIn(A1) terminal, so the response signal AckOut(A1) thereof exists only in the transition signal control circuit A1, and is output. As a result, the response signal ReqOut(Mn) receives the response signal AckIn(Mn) for the transition signal control circuit Mn, and falls. Because of the fall of the request signal ReqOut(Mn), the request signal ReqIn(B1) rises to "H" by the link L4.

This response signal is output as the response signal AckOut(B1) by the link L5. As a result, the vector Q(B1), which is output from the transition signal control circuit B1, becomes "L" by the link L6, and the token transits to the transition signal control circuit B2. Because of the fall of the request signal ReqOut(Mn), the negative output signal Q/(FF) of the D-FF 142 falls to "L" by the link L7, so the request signal ReqOut(Mn) is blocked by the AND gate 143, and is not input to the transition signal control circuit B1 thereafter until this state returns to the original state.

Then another branched token transits in the additional control ring 50-8, and finally reaches the transition signal control circuit Bk. This branched token cannot move until the response signal AckOut(B1) is received. The flow of the token is slow since the transition signal control circuit B2, having the low speed device 73, is included in the additional control ring 50-8. During this time, the main unit token continues circling the master rings (50-5, 50-6), which are the main units. When the branched token exists in the transition signal control circuit Bk, and the main unit token reaches the transition signal control circuit Am in the additional control circuit 50-6, a synchronous signal is output from the AND gate 131 by the output synchronous circuit 130. This is input to the OR gate 141, the D-FF 142 in the input synchronous circuit 140 is reset, and in this state the request signal ReqOut(Mn) can be received again.

The link L8 indicates that the vector Q(Bk), which is output from the transition signal control circuit Bk, rises since the token exists in the transition signal control circuit Bk, and the D-FF 142 is reset as a result. When the token, which transited through the master rings (50-5, 50-6), reaches the transition signal control circuit Mn again, the branched token returns from the transition signal control circuit Bk to B1 by the links L9, L10 and L11. The token which existed in the transition signal control circuit Bk disappears when the response signal AckOut(B1) is received, and a new token is branched and sent into the transition signal control circuit B1.

Here, the token does not exist in the additional control ring 50-8 in the initial status, since the vector Q(B1), which is output from the transition signal control circuit B1, is "L" at reset. The token, which transited through the master control circuit 50-5, is branched and sent for a separate additional control. As a result, this state is the same as the state where two independent controls are executed as if a coprocessor is running with the main processor. Therefore, caution is required so that these controls do not cause contention.

(3) Effect

In the case of the transition signal control unit in FIG. 21, the transition signal control unit is comprised of a combination of the first and second control circuit arrays 50-5 and 50-6, ring control circuit 50-8 and synchronous circuit 130 and 140, so the disadvantage where a slow device is controlled by the additional ring control circuit 50-8 can be solved by the synchronous circuit 130 and 140. In other words, a disadvantage due to the diverging and converging of the token shown in FIG. 20 can be appropriately solved.

(Addition of Control in Ring)

Figure 23A:
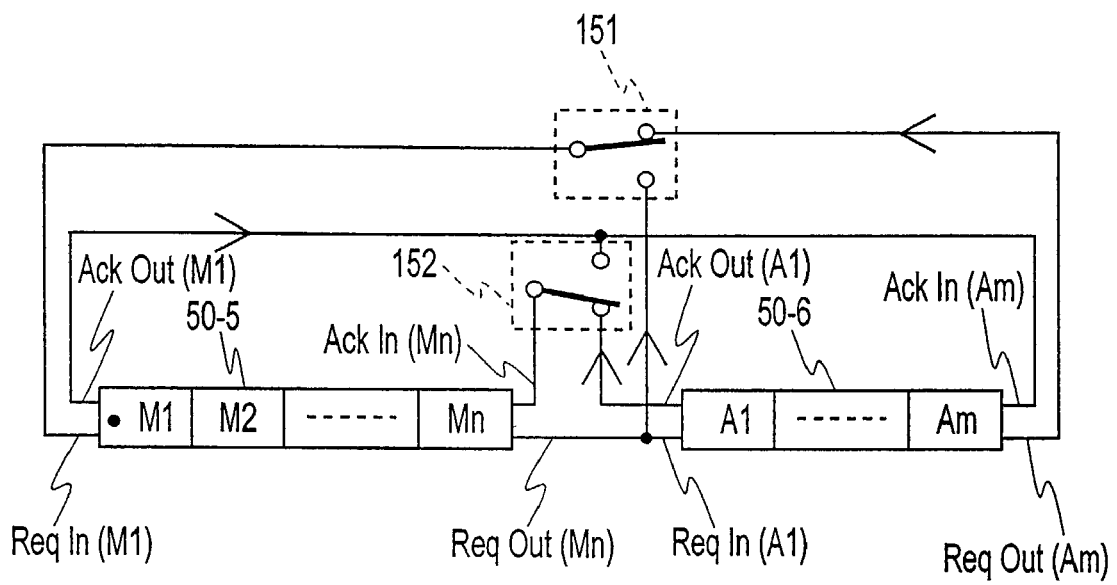
FIGS. 23(A) and (B) are block diagrams of a transition signal control unit depicting an example of adding control to a ring control circuit according to an embodiment of the present invention.

FIGS. 23(A) and (B) are block diagrams of a transition signal control unit depicting an example of adding control to the ring, where FIG. 23(A) is a circuit diagram and FIG.(B) shows a simplified diagram.

In this transition signal control unit, a control circuit array is added or separated by a switch, so the switch 150, for example, controls whether the additional control circuit 50-6, which is the second control circuit array, is added to or separated from the master control circuit 50-5, which is the first control circuit array.

This switch 150 is comprised of two switches, 151 and 152, for example, which operate ON/OFF complementarily. By these two switches, 151 and 152, the request signal ReqOut(Mn) terminal of the transition signal control circuit Mn in the last stage of the master control circuit 50-5 and the request signal ReqIn(A1) terminal of the transition signal control circuit A1 in the first stage of the additional control circuit 50-6 are connected or disconnected, and the response signal AckOut(A1) terminal of the transition signal control circuit A1 and the response signal AckIn(Mn) terminal of the transition signal control circuit Mn are connected or disconnected.

In this transition signal control unit, active control is implemented by dynamically switching the switches 151 and 152 using a control circuit, which is not illustrated. The two switches, 151 and 152, are operated ON/OFF complementarily to prevent contention between I/Os.

Figure 23B:
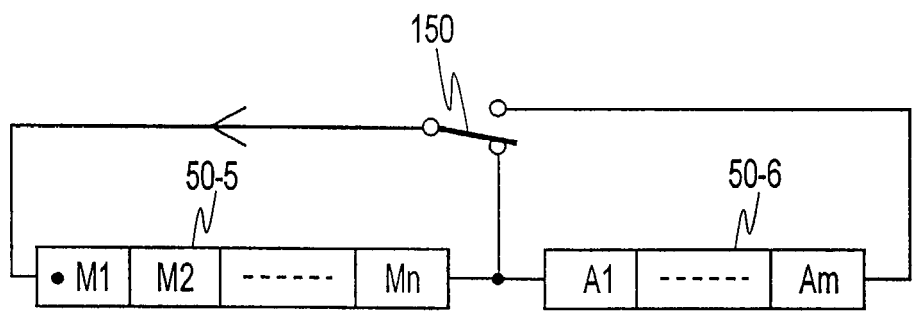

In this way, in the transition signal control unit in FIG. 23, the switches 151 and 152 are disposed, so the dynamic control of the transition signal control unit itself can be implemented by switching the additional control unit by using the switches 151 and 152. Therefore, the present invention can be applied to the dynamic change of machine cycles in the CISC processor and interrupt control.

In FIG. 23, additional control is switched by controlling the two switches 151 and 152, but it is preferable to comprise the switch 150 with four switches, for example, so that all four wires between the master control circuit 50-5 and the additional control circuit 50-6 are switched by the four switches. Then a more accurate switching control can be implemented.

(Switching Additional Control)

Figure 24:
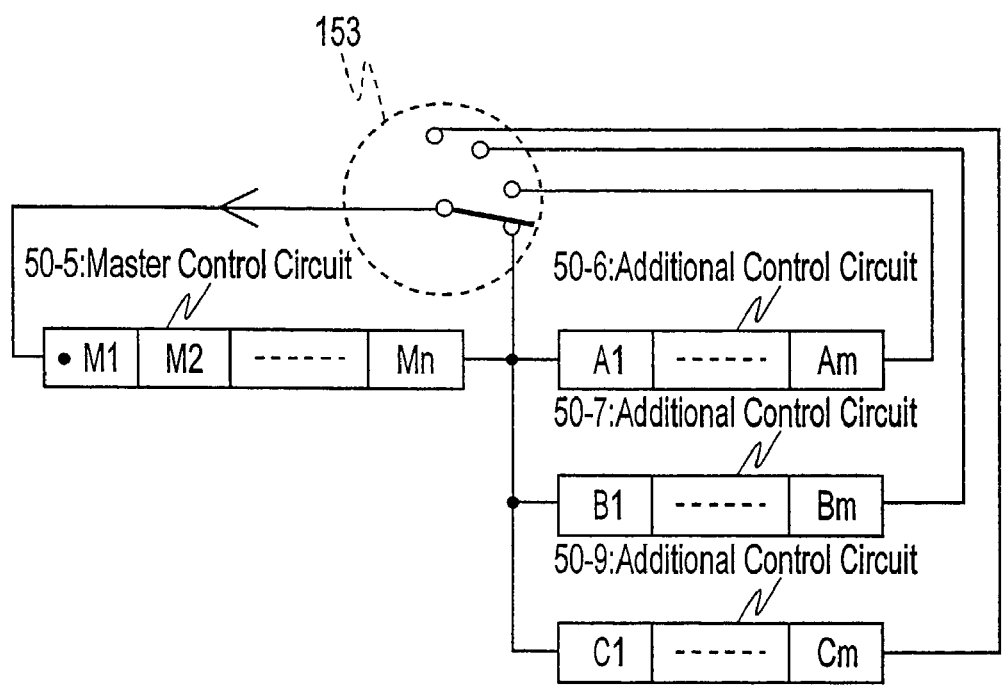
FIG. 24 is a block diagram of a transition signal control unit depicting an example of switching additional control according to an embodiment of the present invention.

FIG. 24 is a block diagram of a transition signal control unit depicting an example of switching additional control.

This transition signal control unit is comprised of a master control circuit 50-5, which is a first control circuit array, and a control circuit device having additional control circuits 50-6, 50-7 and 50-9, which are a plurality of second control circuit arrays. And only the master control circuit 50-5 is controlled using the switch (e.g. rotary switch) 153, which can be switched by control of a control circuit, which is not illustrated, or the master control circuit 50-5, to which one of the additional control circuits 50-6, 50-7 and 50-9 is added, is controlled.

In this transition signal control unit, a ring with a flexible combination can be created depending on how the switch 153, such as a rotary switch, is used.

(Changing Machine Cycle)

Figure 25:
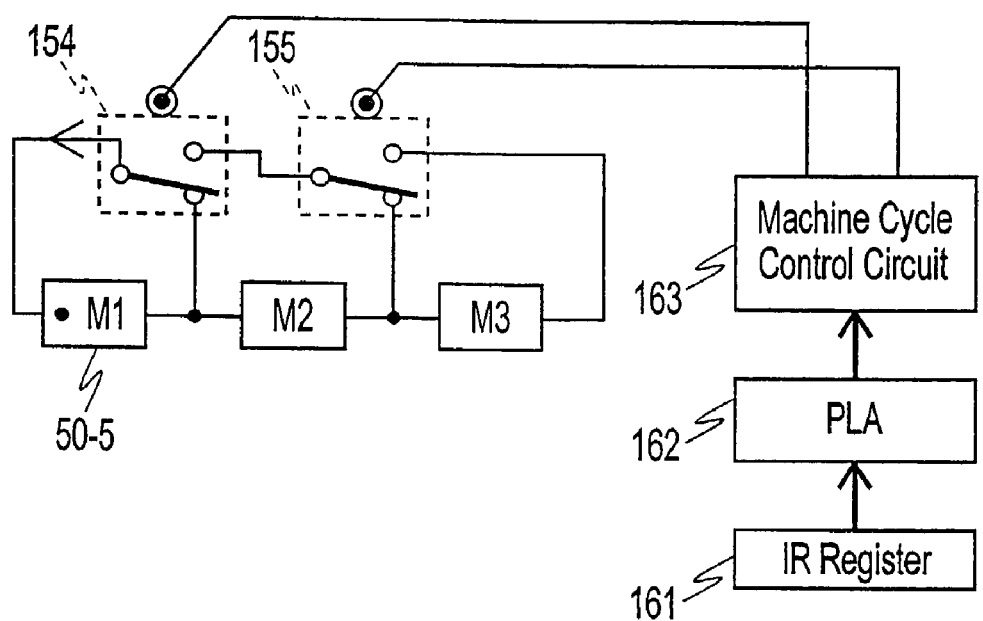
FIG. 25 is a block diagram of a transition signal control unit depicting an example of changing the machine cycle according to an embodiment of the present invention.

FIG. 25 is a block diagram of a transition signal control unit depicting an example of changing the machine cycle.

FIG. 25 shows a system where a machine cycle is different depending on the instructions of the CISC processor, for example, and the machine cycles, corresponding to these instructions, are dynamically switched and added, and is a concrete example of additional control.

This transition signal control unit has a master control circuit 50-5, which is a control circuit array. The master control circuit 50-5 is comprised of cascade-connected three stages of transition signal control circuits M1 to M3, and this number of stages of the transition signal control circuits M1 to M3 is switched by a switch (e.g. two switches, 154 and 155). The switches 154 and 155 are switched by the control of an IR register 161, PLA 162, which is a decoder logic circuit, and a machine cycle control circuit 163, so that the machine cycle reaches the maximum 3 cycles (corresponding to M1, M2 and M3), depending on the instructions.

Now the operation will be described. For example, an instruction is transferred to the IR register 161 in the CISC processor, and this instruction is decoded by the PLA 162. When the number of machine cycles is clarified by the result of decoding, the machine cycle control circuit 163 sends the control signal to the switches 154 and 155, and switches the switch so as to become a predetermined machine cycle. The switching must be completed at least by the last time when processing of the transition signal control circuit M1 ends.

Here, it is an issue whether the transition signal control circuit M1 itself can be a ring, and the transition signal control circuit M1 is established as a ring although a token does not transit. In this case, the next instruction is input to the IR register 161 at least within the transition signal control circuit M1, and as a result, control for dynamically switching the machine cycle is required.

In this way, in the transition signal control unit in FIG. 25, a dynamic change of the machine cycle in the CISC processor can be appropriately implemented as an application example.

(Adding Interrupt Control)

FIG. 26 is a block diagram of a transition signal control unit depicting an example of adding interrupt control as an additional control.

In this transition signal control unit, a synchronous circuit 60 is connected between a master control circuit 505 to create the machine cycle and a state ring 50-2, which is a ring control circuit. To the transition signal control circuit Mn in the last stage of the master control circuit 50-5, a control circuit device having one or more of the second control circuit arrays (e.g. a control circuit device comprised of one interrupt control circuit 50-10, where m stages of transition signal control circuits W1–Wm are cascade connected), is connected, and whether the interrupt control circuit 50-10 is added or not to the master control circuit 50-5 is switched determined by the switch 150.

The control signal for controlling the switch 150 is generated by the interrupt controller 171, which has an interrupt factor identification circuit. To this interrupt controller 171, an interrupt vector selection circuit 172 for selecting interrupt vectors 1 to 4, an IR queue 173 which is a register for storing a predetermined amount of pre-fetched instruction codes, a multiplexer 174 (hereafter "MPX") which is a signal selection means, a 2 input OR gate 175 for switching MPX, an IR register 176, and a 2 input OR gate 177 for supplying clock signals to the IR register 176 are connected.

In a system for executing interrupt processing in FIG. 26, the vector Q(T1), which is output from the state ring 50-2, is received by the synchronous circuit 60, and the vector S, which is a synchronous signal, is sent to the master control circuit 50-5 and interrupt control circuit 50-10. As a result, a processor having n number of machine cycles, which is comprised of k number of states, creates a ring normally in the master control circuit 50-5 only, but during an interrupt, the processor along with the interrupt control circuit 5-10, creates rings (50-5 and 50-9) for executing interrupt processing. Interrupt control is added by the switch 150, and the switch 150 is controlled by the interrupt controller 171.

When an external interrupt is generated, for example, the interrupt controller 171 accepts the interrupt only when the CPU, which is not illustrated, sends interrupt permission, switches the switch 150 to the transition signal control circuit Mn at the last stage in the master control circuit 50-5, and adds the interrupt control circuit 50-10. Here it is preferable to switch the switch 150 when the token is in the transition signal control circuit M1 in the first stage of the master control circuit 50-5.

In such an interrupt control, the interrupt factor identification circuit in the interrupt controller 171 identifies the factor of the interrupt, sends the identification signal to the interrupt vector selection circuit 172, and sends the corresponding interrupt vector to the MPX 174. Since an interrupt state is already active, the instruction from the IR queue 173 is not selected, and this interrupt vector is sent to the IR register 176, and as a result, the corresponding interrupt processing starts. The interrupt processing has not yet been completed, but if the interrupt vector is executed and interrupt processing is started, the interrupt controller 171 switches the switch 150 to disconnect the interrupt control circuit 50-10. It is preferable to execute this disconnection at the end of interrupt control (e.g. the transition signal control circuit Wm in the last stage).

Now an example of timing using inter-ring synchronization in FIG. 26 will be described. When an interrupt vector is executed in the transition signal control circuit Wp (one of W1–Wm) in the interrupt control circuit 50-10, the signal, which the interrupt factor identification circuit in the interrupt controller 171 sends to the interrupt vector selection circuit 172, is output at the timing WpT1. By this, the MPX 174 is switched at the timing WpT2, which is provided via the OR gate 175, and is returned to the original state at the timing WpT3, which is provided via the OR gate 175. During this time, the IR register 176 latches the interrupt vector at the timing WpT2, which is provided via the OR gate 177.

After interrupt ends, the IR register 176 latches a new instruction by the latch signal IRLatch, which is provided via the OR gate 177. Here, the interrupt controller 171 controls the switch 150 based on the control by the control B in FIG. 4, for example, so a pulse is sent each time the switch 150 is switched.

(DMA Controller)

The ring control technology of the present embodiment applies to a DMA controller.

Using the ring control technology of the present invention, the DMA controller of the present embodiment comprises a transition signal control circuit where a loop holding a token is created using a plurality of Muller C elements with inverter and gate circuits, wherein the transition signal control circuit uses a device request signal DevReq to be input as a clock signal, and one of the plurality of Muller C elements with inverter included in the transition signal control circuit transfers the token being held to the subsequent circuit according to the input of the device request signal DevReq or device response signal DevGrant.

Such DMA controllers can acquire various characteristics, when the plural of the transition signal control circuits connected each other.

The convenient constrictions are especially described below.

A DMA controller comprises one or a plurality of DMA channels for holding information for transferring data, an address generation circuit for generating address signals, and a timing/control circuit for generating control signals at a predetermined timing, so as to transfer data among a central processing unit and a plurality of devices connected to a data bus, wherein the timing/control circuit further comprises a transition signal control circuit where a loop for holding a token is created using a plurality of Muller C elements with inverter and gate circuits; and the transition signal control circuit uses the device request signal DevReq to be input as a clock signal, and one of the plurality of Muller C elements with inverter included in the transition signal control circuit transfers the token being held to the subsequent circuit according to the input of the device request signal DevReq or the device response signal DevGrant.

The DMA controller comprises a control circuit group constituted by connecting a plurality of the transition signal control circuits; and a logic circuit for executing the logic processing of a vector Q(D) corresponding to the output signal Q to be output from the control circuit group and generating the control signals, wherein the second control signal DevReq is input to the control circuit group based on the control start information from the central processing unit, and the vector Q(D) is output from the control circuit group, and is input to the logic circuit.

The DMA controller, wherein the transition signal control circuit can input the request signal ReqIn, response signal AckIn, and second control signal DevReq, and output the request signal ReqOut, response signal AckOut, first control signal DevGrant and output signal Q, and if the request signal ReqIn is input when the second control signal DevReq is not input and a token is not held, the transition signal control circuit receives the request signal ReqIn as a token and outputs the token as the request signal ReqOut, and if the second control signal DevReq is input, the transition signal control circuit outputs the first control signal DevGrant without outputting the request signal ReqOut and holds the token.

The DMA controller, comprising a control circuit group constituted by connecting a plurality of the transition signal control circuits, wherein the control circuit group has a plurality of the transition signal control circuits which are connected in a ring shape so that the output of the request signal ReqOut of the transition signal control circuit in the previous stage becomes the input of the request signal ReqIn of the transition signal control circuit in the subsequent stage, and the output of the response signal AckOut of the transition signal control circuit in the subsequent stage becomes the input of the response signal AckIn of the transition signal control circuit in the previous stage; and one of a plurality of the transition signal control circuits holds the token by setting an initial value of the Muller C element with inverter.

An application example of the ring control technology of the present embodiment involves implementing separate functions by the ring control circuit at timing other than the timing of the CPU. The ring control of the present embodiment is essentially suitable for control to repeatedly execute the same processing, and DMA and cache memory, for example, are based on such control.

Figure 27:
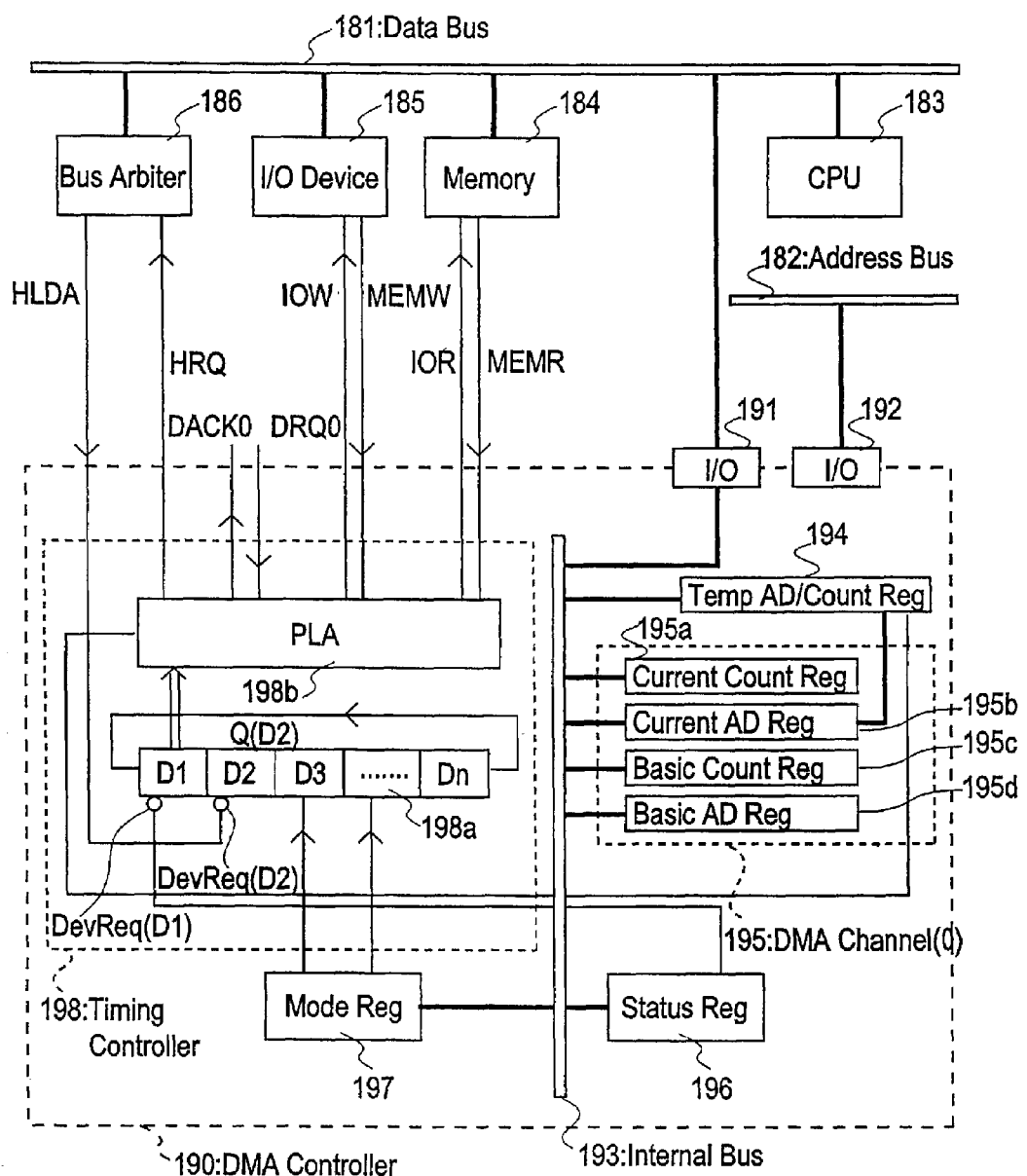
FIG. 27 is a block diagram of an asynchronous DMA controller according to an embodiment of the present invention.

FIG. 27 is a block diagram depicting an asynchronous DMA controller, where the ring control circuit (e.g. DMA ring) is at the center of control.

In FIG. 27, the DMA controller is comprised of a data bus 181, and an address bus 182, and to this data bus 181, a CPU 183, a memory 184, an I/O device 185, a bus arbiter 186, which performs bus arbitration control, and a DMA controller 190 are connected. The DMA controller 190 is connected to the data bus 181 via the I/O interface 191, and is connected to the address bus 182 via the I/O interface 192.

The I/O interface 191 of the DMA controller 190 is connected to the internal bus 193. A temporary address/count register (Temp AD/Count Reg) 194, for example, which is an address generator, is connected to the internal bus 193, and this register 194 is connected to the I/O interface 192. Also four DMA channels (0) to (3), for example, including the DMA channel (0) 195, the status register (Status Reg) 196, and the mode register (Mode Reg) 197, are connected to the internal bus 193.

The DMA channel (0) 195 is for holding such data transfer information as an address (AD) and count value, and is comprised of the current count register (Current Count Reg) 195a for holding the current count value, the current address register (Current AD Reg) 195b for holding the current address (AD), the basic count register (Basic Count Reg) 195c for holding the count value to be the base, and the basic address register (Basic AD Reg) 195d for holding an address (AD) to be the base. During the data transfer of the DMA, the content of the temporal address/count register 194 is incremented/decremented, and when processing ends, the value at this point is held in the current address register 195b.

The timing/control section 198, which is a timing/control circuit, is connected to the status register 196 and the mode register 197, and this timing/control section 198 is connected to the memory 184, the I/O device 185, and the bus arbiter 186. The timing/control section 198 is comprised of a ring control circuit (e.g. DMA ring comprised of n-stages of cascade-connected transition signal control circuits D1 to Dn) 198a, and the logic circuit (e.g. PLA) 198b, which is connected to the output side of the ring control circuit 198a.

Now the general operation of the DMA controller 190 using the DMA ring 198a will be described. When the CPU 183 writes the control start information to the status register 196, this information sets the device request signal DevReq terminal of the transition signal control circuit D1 in the first stage of the DMA ring 198a to "L". As a result, the token transits to the transition signal control circuit D2 in the second stage. If the token exists in the transition signal control circuit D2, the vector Q(D2) is output from this transition signal control circuit D2 to the PLA 198b, and the bus use request signal HRQ is output from the PLA 198b to the bus arbiter 186, so as to request permission to use the data bus 181 to the bus arbiter 186.

In this case, the CPU 183 is not directly held (bus release), since the bus arbiter 186 is used. Until the bus arbiter 186 responds with an acceptance of the request with the response signal HLDA, the response signal HLDA is applied to the device request signal DevReq terminal of the transition signal control circuit D2, so the token does not transit to the transition signal control circuit D3 in the third stage. Control hereafter is determined by the mode register 197 and the status register 196, which supply signals to the device request signal DevReq terminal of each transition signal control circuit D3, . . . .

In the case of a data transfer from the memory 184 to the I/O device 185, or a data transfer from the I/O device 185 to the memory 184, the token transits through a transition signal control circuit which is in charge of control other than the target control, and the token remains in the transition signal control circuit which is in charge of the target control, where the required control is executed.

For example, when the transition signal control circuit D3 in the third stage transfers data from the memory 184 to the I/O device 185 using the DMA channel (0) 195, the signal DRQ0 from the I/O device 185 is received by the PLA 198b, the signal DACK0 is returned from the PLA 198b at the point when preparation thereof is ready, the data is read from the I/O device 185 by the signal IOR, and is written to the memory 184 by the signal MEMW. During this time, the temporal address/count register 194 sends the necessary address to the address bus 182. When the transfer of one word completes, the temporal address/count register 194 counts down and prepares for the next transfer.

In the transition signal control circuit Dn in the last stage of the DMA ring 198*a*, for example, it is judged whether the count values of the temporal address/count register 194 became 0, and if not, repeated processing starts again. If the count values of the temporal address/count register 194 is 0, then this state is written in the status register 196, and the DMA transfer ends. The I/O device 185 detects the DMA transfer end status, and interrupts the CPU 183.

In this way, the DMA controller is configured using the ring control circuit (e.g. the DMA ring 198*a*), so accurate DMA control can be implemented. By configuring the ring control circuit using a cache ring, a cache memory can also be controlled.

(Transition Signal Control Processor)

(1) Configuration

Figure 28:
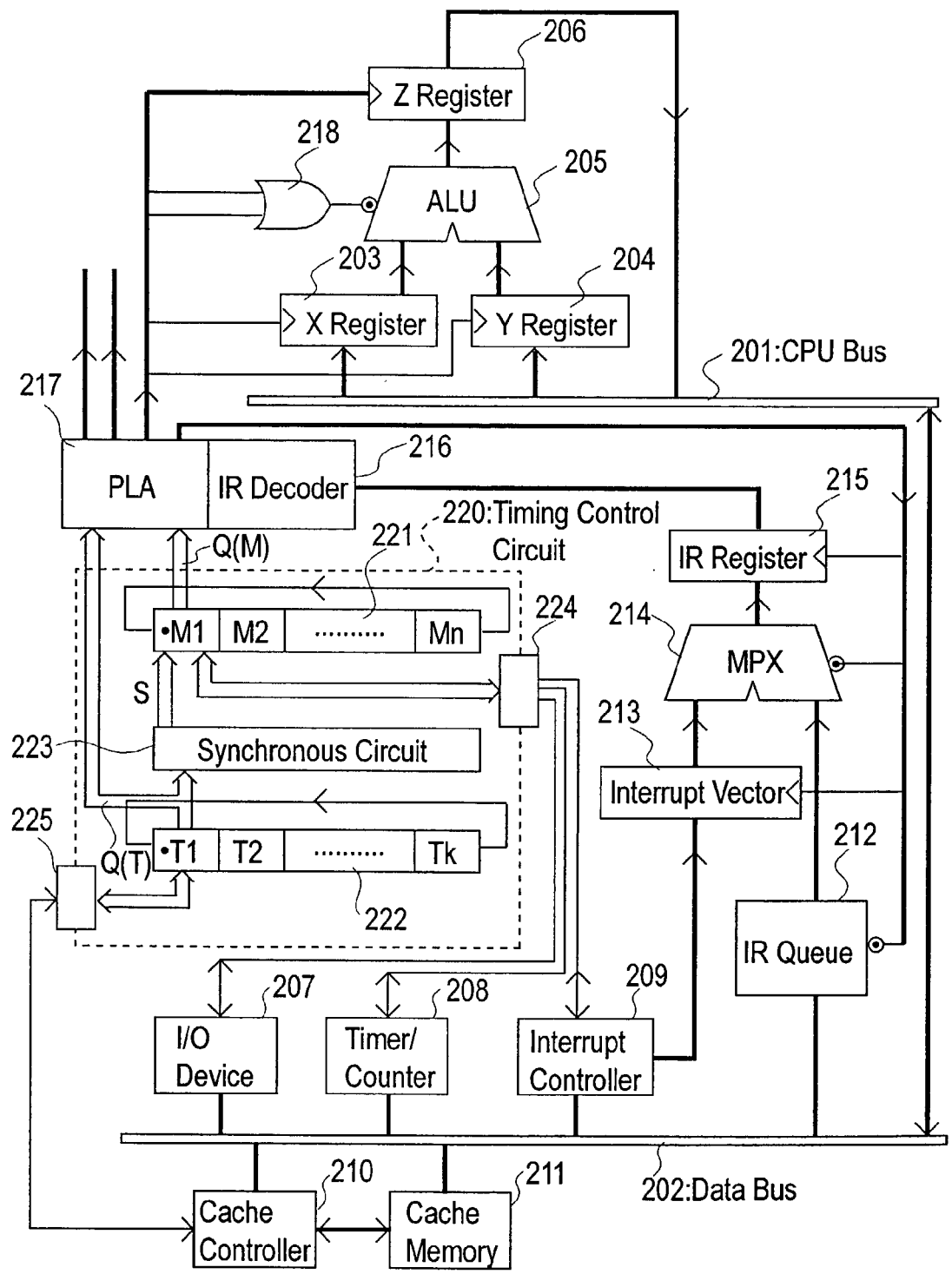
FIG. 28 is a block diagram of a transition signal control processor according to an embodiment of the present invention.

FIG. 28 is a block diagram depicting a transition signal control processor using the transition signal control unit in FIG. 1. In FIG. 28, circuits related to addresses are omitted to simplify descriptions.

This transition signal control processor does not look very different from an ordinary clock synchronous processor, except that it uses the ring control circuit of the present embodiment for the timing/control circuit 220. However, in the timing/control circuit 220 of the present embodiment, asynchronous control is directly applied to the device, so the control is considerably different from the control of a conventional clock synchronous processor.

The transition signal control processor in FIG. 28 has the CPU bus 201 and the data bus 202. In the CPU bus 201, an X register 203 and a Y register 204 are connected, and an arithmetic unit (e.g. ALU) 205 is connected to the output side thereof. The output side of the ALU 205 is connected to the CPU bus 201 via the Z register 206. The operation of the ALU 205 is switched by the control signal, which is provided via the 2 input OR gate 218. The X register 203 and the Y register 204 for storing data to be the control target, which will be supplied to the ALU 205, and the Z register 206 for storing the operation results of the ALU 205 constitute the internal registers.

A data bus 202 is connected to the CPU bus 201, and an I/O device 207, time/counter 208, interrupt controller 209, cache controller 210, cache memory 211 and IR queue 212 are connected to this data bus 202. An interrupt vector register 213 is connected to the interrupt controller 209, and an MPX 214 is connected between the interrupt vector register 213 and IR queue 212. An IR register 215 is connected to the output side of the MPX 214, an IR decoder 216 is connected to the output side of the IR register 215, and the logic circuit (e.g. PLA) 217 is connected to the IR 216. The internal device is controlled by the control signal, which is output from the PLA 217.

A timing/control circuit 220, which is a characteristic of the present embodiment, is connected to the PLA 217. The timing/control circuit 220 is comprised of a machine ring 221, which is a first ring control circuit, and a state ring 222, which is a second ring control circuit, where the machine ring 221 and the state ring 222 are synchronized by a synchronous circuit 223. The machine ring 221 is further comprised of n-stages of transition signal control circuits M1 to Mn, where the transition signal control circuit M1 in the first stage is connected to the PLA 217, for example, and is also connected to the I/O device 207, timer/counter 208 and interrupt controller 209 via the device interface 224. The state ring 222 is further comprised of k stages of transition signal control circuits T1 to Tk, where the transition signal control circuit T1 at the first stage is connected to the synchronous circuit 213 and PLA 217, for example, and is also connected to the cache controller 210 via the device interface 225.

(2) Operation

The operation content of the ALU 205 is set via the OR gate 218 by the control signal which is output from the PLA 217. The data provided from the CPU bus 201 is stored in the X register 203 and the Y register 204, the stored data is operated by the ALU 205, and the operation result thereof is stored in the Z register 206. The data for the X register 203, Y register 204 and Z register 206 is input/output via the CPU bus 201.

The IR code, which is hit by the cache memory 211 under the control of the cache controller 210, is stored in the IR queue 212 via the data bus 202. When an interrupt is valid, the interrupt vector of the interrupt vector register 213 is selected by the MPX 214. Normally, however, the instruction code is output from the beginning of the IR queue 212, and is stored in the IR register 215 via the MPX 214. The stored instruction code is decoded by the IR decoder 216, timing is created by the adjacent PLA 217, and an internal control signal group for controlling the entire processor is generated. The timing/control circuit 220 supplies various types of timing to this PLA 217.

The timing/control circuit 220 is comprised of the machine ring 221, state ring 222 and synchronous circuit 223, but in order to create more detailed timing or to secure a sufficient pulse width for the timing, a set of new ring control circuits for supplying synchronous signals and a synchronous circuit, based on this output, is added to the state ring 222.

This timing/control circuit 220 supplies the vector Q(M), which is output from the machine ring 221, and the vector Q(T), which is output from the state ring 222, to the PLA 217. By this, any set of timing can be created. Here, T=(T1, T2, . . . , Tk); M=(M1, M2, . . . , Mn); Q(T)=(Q1(T1), Q2(T2), . . . , Qk(Tk)); and Q(M)=(Q1(M1), Q2(M2), . . . , Qn(Mn)).

The vector Q(T), which is output from the state ring 222, is not only supplied to the PLA 217, but also to the synchronous circuit 223. The vector S (=S1, S2, . . . , Sn), which is output from the synchronous circuit 223, is supplied to the machine ring 221. The major configuration of this timing/control circuit 220 is about the same as the configuration in FIG. 1(A).

The timing/control circuit 220 of the present embodiment has the device interfaces 224 and 225, in addition to the timing/control circuit in FIG. 1(A). These are interfaces for controlling devices maintaining inter-ring synchronization, which is the control method described in FIG. 9 to FIG. 11. The device interface 224 places the I/O device 207, timer/counter 208, and interrupt controller 209 under the control of the machine ring 221, and the cache controller 210 is placed under the control of the device interface 225. This is because the cache controller 210 operates relatively faster than other devices.

The state created by the state ring 212 becomes a part of the machine cycle, so if this operation is slow, the efficiency of the entire transition signal control processor drops. In the state ring 212, the token transits at high-speed, and the cache controller 210 does not always have a speed to match this. In this case, a new ring to supply synchronous signals to the state ring 222 may be created.

(3) Effects

The transition signal control processor of the present embodiment is comprised of the timing/control circuit 220, so the processor can be operated asynchronously. Compared with a conventional clock synchronous processor, internal devices can be directly controlled by the machine ring 221 and the state ring 222, which are used for the timing/control circuit 220.

What is claimed is:

1. A transition signal control unit, comprising a transition signal control circuit in which a loop for holding a token is created by a plurality of Muller C elements each with an inverter, and gate circuits,
   wherein said transition signal control circuit uses a device request signal DevReq to be input as a clock signal, and
   one of said plurality of Muller C elements with an inverter included in said transition signal control circuit transfers a token being held to a subsequent circuit according to input of the device request signal DevReq or a device response signal DevGrant,
   wherein said transition signal control circuit has input thereto a request signal ReqIn, a response signal AckIn, and a second control signal DevReq, and outputs a request signal ReqOut, a response signal AckOut, a first control signal DevGrant, and an output signal Q, and
   if said request signal ReqIn is input when said second control signal DevReq is not input and the token is not held, said transition signal control circuit receives said request signal ReqIn as a token and outputs said token as said request signal ReqOut, and if said second control signal DevReq is input, said transition signal control circuit does not output said request signal ReqOut but outputs said first control signal DevGrant, and holds said token.

2. A transition signal control unit, comprising a transition signal control circuit in which a loon for holding a token is created by a plurality of Muller C elements each with an inverter, and gate circuits,
   wherein said transition signal control circuit uses a device request signal DevReq to be input as a clock signal, and
   one of said plurality of Muller C elements with an inverter included in said transition signal control circuit transfers a token being held to a subsequent circuit according to input of the device request signal DevReq or a device response signal DevGrant,
   the transition signal control unit further comprising:
   a first control circuit group constituted by connecting a plurality of said transition signal control circuits;
   a second control circuit group constituted by connecting another plurality of said transition signal control circuits; and
   a synchronous circuit which synchronizes said first control circuit group and said second control circuit group.

3. The transition signal control unit according to claim 2, wherein the plurality of said transition signal control circuits are connected in a ring shape in said first control circuit groups and the another plurality of said transition signal control circuits are connected in a ring shape in said second control circuit group.

4. The transition signal control unit according to claim 2, wherein said synchronous circuit synchronizes said first control circuit group and said second control circuit group by inputting a vector Q(T), which is output from said second control circuit group, and outputting a vector S at a predetermined timing, and inputting said vector S to said first control circuit group.

5. The transition signal control unit according to claim 2, wherein said first control circuit group is constituted by connecting said plurality of transition signal control circuits in a ring shape so that a request signal ReqOut output from a transition signal control circuit in a previous stage is input as a request signal ReqIn to a transition signal control circuit in a subsequent stage, and a response signal AckOut output from said transition signal control circuit in the subsequent stage is input as a response signal AckIn to said transition signal control circuit in the previous stage; and
   one of said plurality of transition signal control circuits holds a token by setting an initial value of the corresponding Muller C element with an inverter.

6. The transition signal control unit according to claim 2, further comprising a gate circuit which has input thereto a device request signal DevReq(D) to be output from a control target device, and a vector S to be output from said synchronous circuit, said gate circuit being controlled by said device request signal DevReq(D) for opening and closing, so as to output said vector S to said first control circuit group as a second control signal DevReq in an open status, and to block said vector S in a close status.

7. The transition signal control unit according to claim 6, wherein transition of said control target device is controlled by using a first control signal DevGrant, which is output from said first control circuit group, as a device response signal DevGrant(D) of said control target device.

8. The transition signal control unit according to claim 6, wherein said synchronous circuit further comprises a circuit for executing initial control for inhibiting the output of the vector S immediately after reset.

9. The transition signal control unit according to claim 2, wherein said synchronous circuit further comprises a circuit which outputs an inhibiting signal Inh(M) for detecting a case when a token does not transit from a response signal AckOut for confirming transition of a token to be output from said first control circuit group, and a vector Q(T) to be output from said second control circuit group.

10. The transition signal control unit according to claim 2, comprising:
    a first gate circuit which has input thereto a vector Q(S) corresponding to an output signal Q to be output from said second control circuit group and a device request signal DevReq(D) to be output from a control target device, wherein open/close of the first pate circuit is controlled by the vector Q(S) to be output from said second control circuit group for opening and closing, so that said device request signal DevReq(D) is output and then input to said first control circuit group as a second control signal DevReq in an open status, and said device request signal DevReq(D) is blocked in close status; and
    a second gate circuit which has input thereto a first control signal DevGrant to be output from said first control circuit group and a second control signal DevGrant to be output from said second control circuit group, and is controlled by the second control signal DevGrant to be output from said second control circuit group for opening and closing, so that the first control signal DevGrant to be output from said first control circuit group is output and then input to said control target device as the device response signal DevGrant in an open status, and the first control signal DevGrant to be output from said first control circuit group is blocked in a close status.

11. The transition signal control unit according to claim 2, wherein said synchronous circuit inputs a request signal ReqOut to be output from a transition signal control circuit in a last stage of said first control circuit group to a transition signal control circuit in a first stage of said second control circuit group as the request signal ReqIn only when the token in said first control circuit group reaches the transition signal control circuit in the last stage of said first control circuit group for the first time, then blocks input of said request signal ReqIn to the transition signal control circuit in the first stage of said second control circuit group until the token, which is input to the transition signal control circuit in the first stage of said second control circuit group, reaches a transition signal control circuit in a last stage of said second control circuit group.

12. A transition signal control unit, comprising a transition signal control circuit in which a loon for holding a token is created by a plurality of Muller C elements each with an inverter, and gate circuits,
   wherein said transition signal control circuit uses a device request signal DevReq to be input as a clock signal, and
   one of said plurality of Muller C elements with an inverter included in said transition signal control circuit transfers a token being held to a subsequent circuit according to input of the device request signal DevReq or a device response signal DevGrant,
   the transition signal control unit further comprising:
   a control circuit group constituted by connecting a plurality of said transition signal control circuits;
   a cyclic shift register having an output signal Q2 that sequentially shifts and cycles as synchronized with a clock signal; and
   a synchronous circuit which outputs a vector S at a predetermined timing based on a vector Q(Sh) which corresponds to said output signal Q2 to be output from said cyclic shift register, and a response signal AckOut to be output from said control circuit group;
   wherein said control circuit group and said cyclic shift register are synchronized by the vector S to be output from said synchronous circuit to said control circuit group as a second control signal DevReq, and by the response signal AckOut to be output from said control circuit group to said synchronous circuit.

13. The transition signal control unit according to claim 12, wherein said synchronous circuit further comprises a circuit for outputting an inhibiting signal Inh(M) which detects a case when a token does not transit, from the response signal AckOut for confirming transition of a token to be output from said control circuit group, and the vector Q(Sh) to be output from the cyclic shift register.

14. A transition signal control unit, comprising a transition signal control circuit in which a loop for holding a token is created by a plurality of Muller C elements each with an inverter, and gate circuits,
   wherein said transition signal control circuit uses a device request signal DevReq to be input as a clock signal, and
   one of said plurality of Muller C elements with an inverter included in said transition signal control circuit transfers a token being held to a subsequent circuit according to input of the device request signal DevReq or a device response signal DevGrant,
   the transition signal control unit further comprising a counter with reset having input thereto an output signal Q to be output from said transition signal control circuit as a clock, and outputting a count output signal Qc,
   wherein a logic circuit to be a control target is controlled using the output signal Q to be output from said transition signal control circuit or the count output signal Qc to be output from said counter with reset.

15. A transition signal control unit, comprising a transition signal control circuit in which a loon for holding a token is created by a plurality of Muller C elements each with an inverter, and gate circuits,
   wherein said transition signal control circuit uses a device request signal DevReq to be input as a clock signal, and
   one of said plurality of Muller C elements with an inverter included in said transition signal control circuit transfers a token being held to a subsequent circuit according to input of the device request signal DevReq or a device response signal DevGrant,
   the transition signal control unit comprising:
   a counter with reset having input thereto a first control signal DevGrant to be output from said transition signal control circuit, and outputting a count output signal Qc; and
   delay inversion means for delaying the first control signal DevGrant to be output from said transition signal control circuit for a predetermined time, inverting the first control signal DevGrant to generate said second control signal DevReq, and inputting said second control signal DevReq to said transition signal control circuit,
   wherein a logic circuit to be a control target is controlled using the first control signal DevGrant to be output from said transition signal control circuit or the count output signal Qc to be output from said counter with reset.

16. A transition signal control unit, comprising a transition signal control circuit in which a loop for holding a token is created by a plurality of Muller C elements each with an inverter, and gate circuits,
   wherein said transition signal control circuit uses a device request signal DevReq to be input as a clock signal, and
   one of said plurality of Muller C elements with an inverter included in said transition signal control circuit transfers a token being held to a subsequent circuit according to input of the device request signal DevReq or a device response signal DevGrant,
   the transition signal control unit comprising:
   a first control circuit group constituted by connecting a first plurality of said transition signal control circuits;
   a second control circuit group constituted by connecting a second plurality of said transition signal control circuits;
   a third control circuit group constituted by connecting a third plurality of said transition signal control circuits are connected;
   a first gate circuit; and
   a second gate circuit,
   wherein said second control circuit group inputs the request signal ReqOut to be output from a transition signal control circuit in a last stage of said first control circuit group to a transition signal control circuit in a first stage of the second control circuit group as a request signal ReqIn, and inputs the response signal AckOut to be output from a transition signal control circuit in the first stage of said first control circuit group to a transition signal control circuit in a last stage of the second control circuit group as a response signal AckIn;
   said third control circuit group inputs the request signal ReqOut to be output from the transition signal control circuit in the last stage of said first control circuit group to a transition signal control circuit in a first stage of the third control circuit group as the request signal ReqIn, and inputs the response signal AckOut to be output from the transition signal control circuit in the first stage of said first control circuit group to a transition signal control circuit in a last stage of the third control circuit group as the response signal AckIn;

said first gate circuit has input thereto the response signal AckOut to be output from the transition signal control circuit in the first stage of said second control circuit group and a response signal AckOut to be output from a transition signal control circuit in a first stage of said third control circuit group, determines an AND of these two inputs, and outputs a result of said AND to the transition signal control circuit in the last stage of said first control circuit group as the response signal AckIn; and said second gate circuit has input thereto a request signal ReqOut to be output from the transition signal control circuit in the last stage of said second control circuit group and a request signal ReqOut to be output from the transition signal control circuit in the last stage of said third control circuit group, determines a second AND of these a corresponding inputs, and outputs a result of said second AND to the transition signal control circuit in the first stage of said first control circuit group as the request signal ReqIn.

17. A transition signal control unit, comprising a transition signal control circuit in which a loop for holding a token is created by a plurality of Muller C elements each with an inverter, and gate circuits, wherein said transition signal control circuit uses a device request signal DevReq to be input as a clock signal, and one of said plurality of Muller C elements with an inverter included in said transition signal control circuit transfers a token being held to a subsequent circuit according to input of the device request signal DevReq or a device response signal DevGrant, the transition signal control unit comprising:

a first control circuit group constituted by connecting a plurality of said transition signal control circuits;

a second control circuit group constituted by connecting another plurality of said transition signal control circuits; and a switch for switching between a first connecting state and a second connecting state, wherein in the first connecting state an output terminal for a request signal ReqOut and an input terminal for a response signal AckIn of a transition signal control circuit in a last stage of said first control circuit group, and an input terminal for a request signal ReqIn and an output terminal for a response signal AckOut of the transition signal control circuit in a first stage of said first control circuit group are connected, and in the second connecting state the output terminal for the request signal ReqOut and the input terminal for the response signal AckIn of the transition signal control circuit in the last stage of said first control circuit group, and an input terminal for a request signal ReqIn and an output terminal for a response signal AckOut of a transition signal control circuit in a first stage of said second control circuit group are connected, and an output terminal for a request signal ReqOut and an input terminal for a response signal AckIn of a transition signal control circuit in a last stage of said second control circuit group, and the input terminal for the request signal ReqIn and the output terminal for the response signal AckOut of the transition signal control circuit in the first stage of said first control circuit group are connected.

18. A transition signal control unit, comprising a transition signal control circuit in which a loop for holding a token is created by a plurality of Muller C elements each with an inverter, and gate circuits, wherein said transition signal control circuit uses a device request signal DevReq to be input as a clock signal, and one of said plurality of Muller C elements with an inverter included in said transition signal control circuit transfers a token being held to a subsequent circuit according to input of the device request signal DevReq or a device response signal DevGrant, the transition signal control unit comprising:

a control circuit group constituted by connecting a plurality of said transition signal control circuits; and a switch for switching an input terminal for a request signal ReqIn and an output terminal for a response signal AckOut of a transition signal control circuit in a first stage of said control circuit group, and an output terminal for a request signal ReqOut and an input terminal for a response signal AckIn of a transition signal control circuit in one stage of the plurality of said transition signal control circuits, so as to be a predetermined machine cycle based on a control signal.

19. A DMA (direct memory access) controller which comprises one or a plurality of DMA channels for holding information for transferring data, an address generation circuit for generating address signals, and a timing and control circuit for generating control signals at a predetermined timing, so as to transfer data among a central processing unit and a plurality of devices connected to a data bus, wherein said timing and control circuit further comprises a transition signal control circuit where a loon for holding a token is created using a plurality of Muller C elements each with an inverter, and gate circuits; and said transition signal control circuit uses a device request signal DevReq to be input as a clock signal, and one of said plurality of Muller C elements with an inverter included in said transition signal control circuit transfers the token being held to a subsequent circuit according to input of the device request signal DevReq or a device response signal DevGrant, the DMA controller comprising:

a control circuit group constituted by connecting a plurality of said transition signal control circuits; and a logic circuit for executing logic processing of a vector Q(D) corresponding to an output signal Q to be output from said control circuit group and generating said control signals, wherein a second control signal DevReq is input to said control circuit group based on control start information from said central processing unit, and said vector Q(D) is output from said control circuit group to said logic circuit.

20. A DMA (direct memory access) controller which comprises one or a plurality of DMA channels for holding information for transferring data, an address generation circuit for generating address signals, and a timing and control circuit for generating control signals at a predetermined timing, so as to transfer data among a central processing unit and a plurality of devices connected to a data bus, wherein said timing and control circuit further comprises a transition signal control circuit where a loop for holding a token is created using a plurality of Muller C elements each with an inverter, and gate circuits; and said transition signal control circuit uses a device request signal DevReq to be input as a clock signal, and one of said plurality of Muller C elements with an inverter included in said transition signal control circuit transfers the token being held to a subsequent circuit according to input of the device request signal DevReq or a device response signal DevGrant, wherein said transition signal control circuit has input thereto a request signal ReqIn, a response signal AckIn, and a second control signal DevReq, and outputs a request signal ReqOut, a response signal AckOut, a first control signal DevGrant and an output signal Q, and if said request signal ReqIn is input when said second control signal DevReq is not input and a token is not held, said transition signal control circuit receives said request signal ReqIn as a token and outputs said token as said request signal ReqOut, and if said second control signal DevReq is input, said transition signal control circuit outputs said first control signal DevGrant without outputting said request signal ReqOut and holds said token.

21. A DMA (direct memory access) controller which comprises one or a plurality of DMA channels for holding information for transferring data, an address generation circuit for generating address signals, and a timing and control circuit for generating control signals at a predetermined timing, so as to transfer data among a central processing unit and a plurality of devices connected to a data bus, wherein said timing and control circuit further comprises a transition signal control circuit where a loon for holding a token is created using a plurality of Muller C elements each with an inverter, and gate circuits; and said transition signal control circuit uses a device request signal DevReq to be input as a clock signal, and one of said plurality of Muller C elements with an inverter included in said transition signal control circuit transfers the token being held to a subsequent circuit according to input of the device request signal DevReq or a device response signal DevGrant, the DMA controller comprising a control circuit group constituted by connecting a plurality of said transition signal control circuits in a ring shape so that output of a request signal ReqOut from a transition signal control circuit in a previous stage is input as a request signal ReqIn to a transition signal control circuit in a subsequent stage, and output of a response signal AckOut from said transition signal control circuit in the subsequent stage is input as a response signal AckIn to said transition signal control circuit in the previous stage; and one of a plurality of said transition signal control circuits holds the token by setting an initial value of a corresponding Muller C element with an inverter.

* * * * *